(12) United States Patent
Hernandez Londono et al.

(10) Patent No.: US 9,678,963 B2
(45) Date of Patent: Jun. 13, 2017

(54) METHODS AND APPARATUS FOR POINT CLOUD DATA PROCESSING

(71) Applicant: Trimble AB, Danderyd (SE)

(72) Inventors: Jorge Hernandez Londono, Versailles (FR); Thomas Chaperon, Arcueil (FR); Guillaume Tremblay, Neuilly Plaisance (FR)

(73) Assignee: Trimble AB, Danderyd (SE)

( * ) Notice: Subject to any disclaimer, the term of this patent is extended or adjusted under 35 U.S.C. 154(b) by 377 days.

(21) Appl. No.: 14/468,875

(22) Filed: Aug. 26, 2014

(65) Prior Publication Data

US 2015/0046456 A1    Feb. 12, 2015

Related U.S. Application Data

(63) Continuation of application No. PCT/IB2013/000329, filed on Feb. 26, 2013.
(Continued)

(51) Int. Cl.
*G06F 17/30* (2006.01)
*G06T 15/10* (2011.01)

(52) U.S. Cl.
CPC ...... *G06F 17/3007* (2013.01); *G06F 17/3028* (2013.01); *G06F 17/30091* (2013.01);
(Continued)

(58) Field of Classification Search
CPC .......... G06F 17/3007; G06F 17/30091; G06F 17/30126
(Continued)

(56) References Cited

U.S. PATENT DOCUMENTS

| | | | |
|---|---|---|---|
| 2002/0191844 A1* | 12/2002 | Lee ...................... | G06K 9/4652 382/166 |
| 2008/0088626 A1* | 4/2008 | Habe ...................... | G06T 9/001 345/427 |
| 2010/0131234 A1* | 5/2010 | Stewart ..................... | B02C 4/32 702/152 |

FOREIGN PATENT DOCUMENTS

WO     02/088907 A2    11/2002

OTHER PUBLICATIONS

Li, Y. et al., "2D-3D Fusion for Layer Decomposition of Urban Facades," IEEE International Conference on Computer Vision (ICCV 2011), pp. 882-889.
(Continued)

*Primary Examiner* — Rehana Perveen
*Assistant Examiner* — Loc Tran
(74) *Attorney, Agent, or Firm* — Kilpatrick Townsend & Stockton LLP

(57) ABSTRACT

Methods and apparatus are provided for processing data representing three-dimensional points organized in a data structure wherein each point has multiple components, the data is organized in a respective layer per component, each layer is segmented in cells of a two-dimensional grid, the cells are arranged such that the components of a given point are contained in corresponding cells of multiple layers, the cells are grouped in patches by layer, and the patches are arranged such that the components of an array of points is represented by corresponding patches of multiple layers. At least one first criterion and at least one second criterion are obtained. Data are retrieved from cells of patches meeting the at least one first criterion and from layers meeting the at least one second criterion. The retrieved data are processed to obtain a derivative data set.

6 Claims, 55 Drawing Sheets

Related U.S. Application Data

(60) Provisional application No. 61/710,718, filed on Oct. 6, 2012, provisional application No. 61/605,244, filed on Mar. 1, 2012.

(52) U.S. Cl.
CPC .. *G06F 17/30126* (2013.01); *G06F 17/30153* (2013.01); *G06T 15/10* (2013.01); *G06T 2215/16* (2013.01)

(58) Field of Classification Search
USPC ........................................ 707/737, 736, 741
See application file for complete search history.

(56) References Cited

OTHER PUBLICATIONS

Lu, S. et al., "Combinative Representation of TLS Point Cloud and 3D Virtual Reality for Cultural Heritage Preservation Planning," The International Archives of the Photogrammetry, Remote Sensing and Spatial Information Sciences, vol. XXXVII, Part B2, Beijing 2008, pp. 1077-1080.

International Search Report of the International Searching Authority for Application No. PCT/IB2013/000329, mailed on Mar. 6, 2014, 4 pages.

\* cited by examiner

| | | | | | |
|---|---|---|---|---|---|
| (R, VA, HA, I)$_{0,0}$ | | ⋮ | | ⋮ | (R, VA, HA, I)$_{N,0}$ |
| (R, VA, HA, I)$_{0,1}$ | | | | | |
| ⋮ | | ⋮ | | ⋮ | |
| ⋮ | | | | | |
| ⋮ | | | | | |
| (R, VA, HA, I)$_{0,M}$ | | | | | (R, VA, HA, I)$_{N,M}$ |

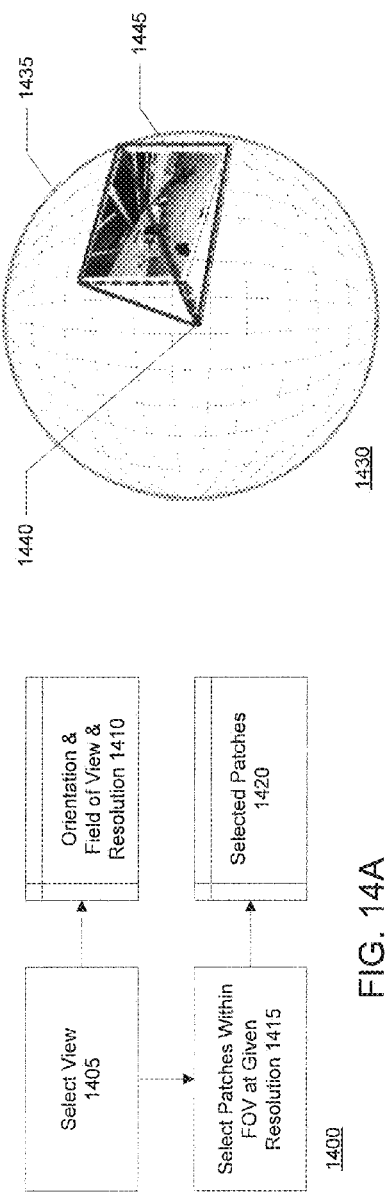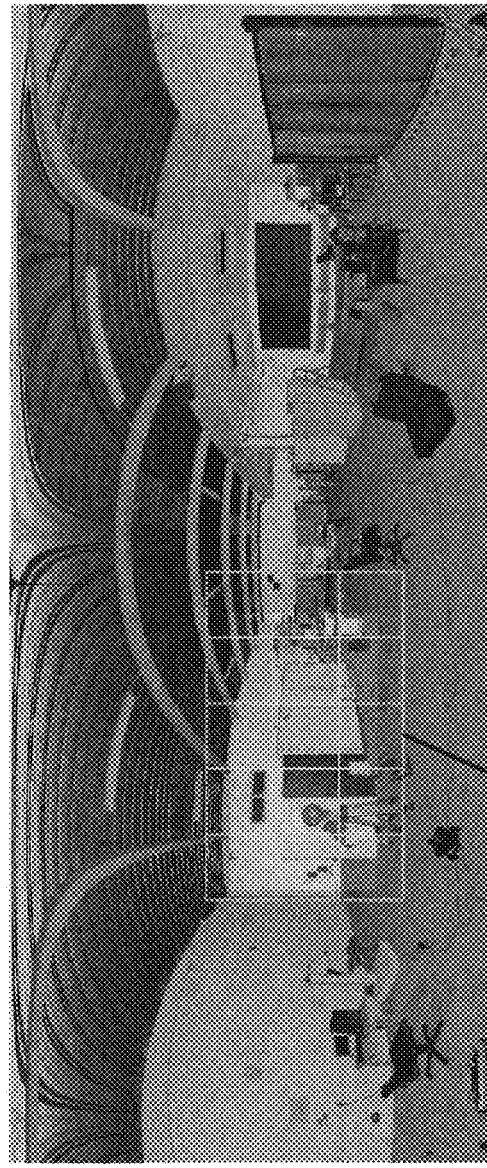

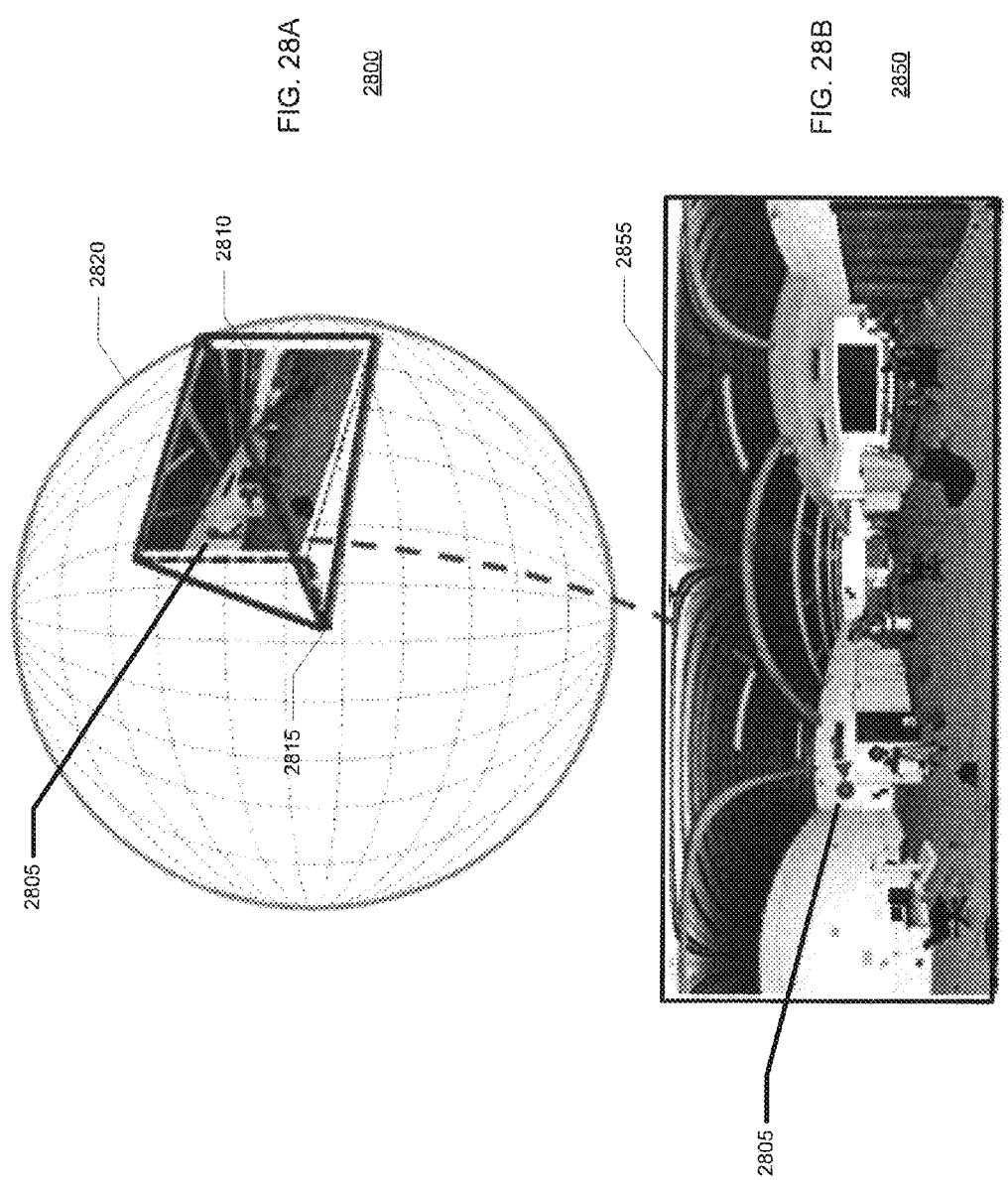

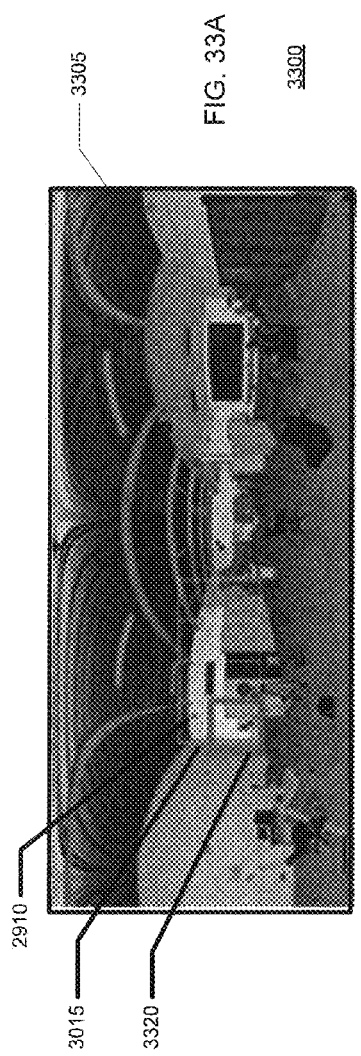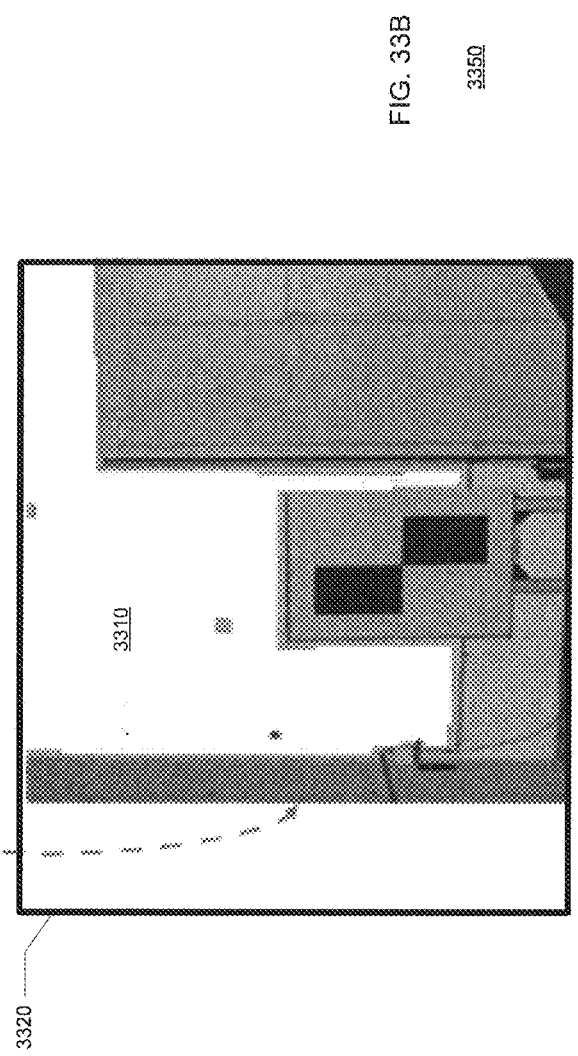

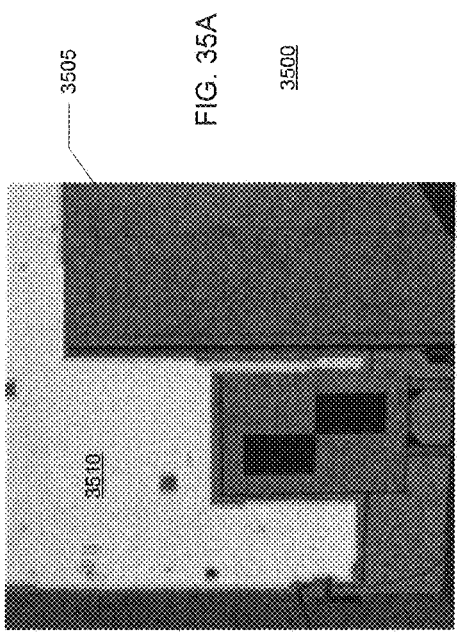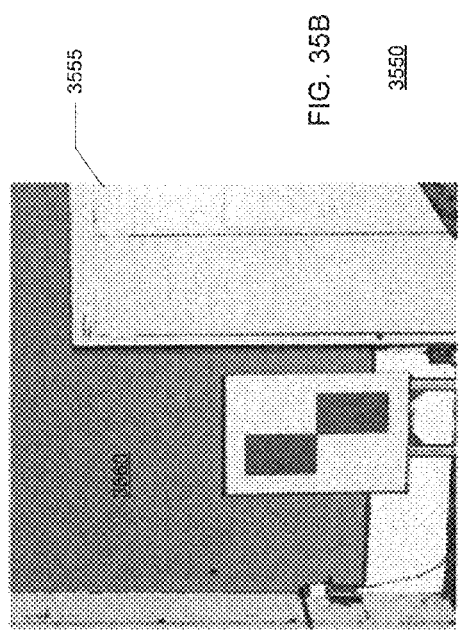

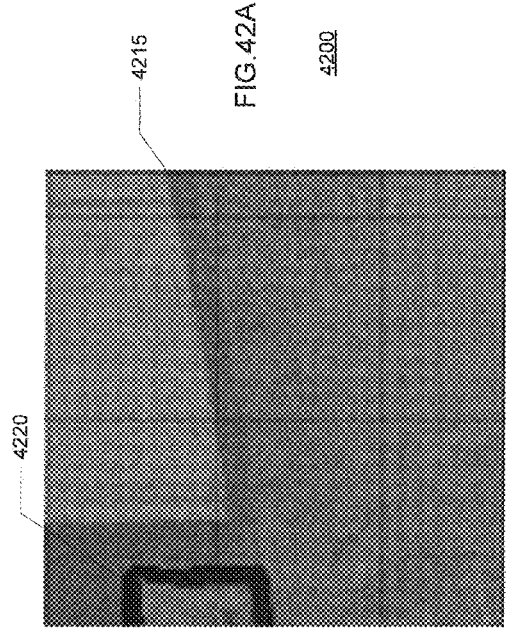
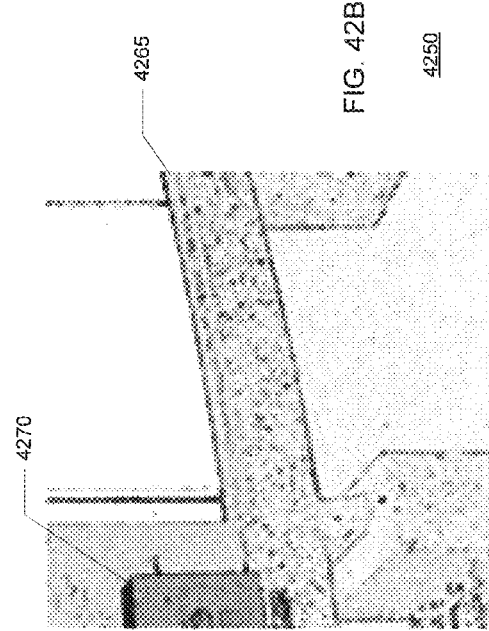
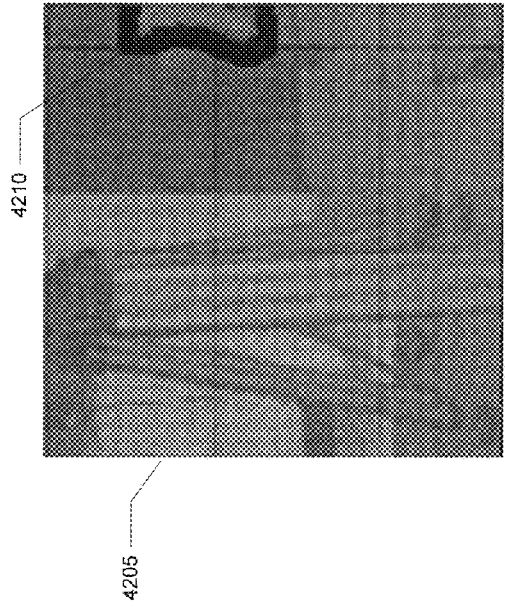
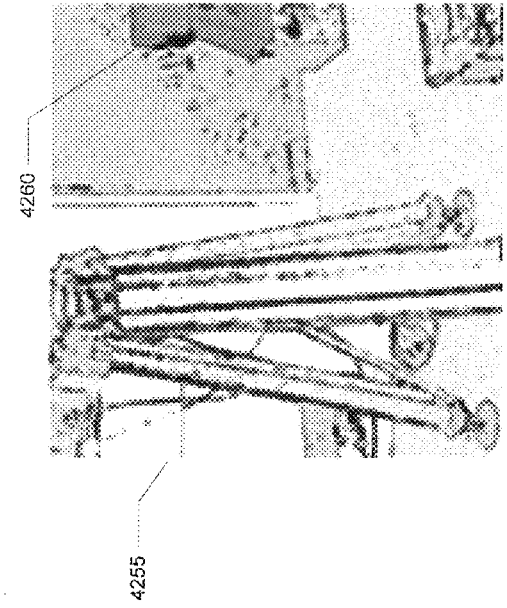
FIG. 42A
FIG. 42B

METHODS AND APPARATUS FOR POINT CLOUD DATA PROCESSING

CROSS-REFERENCES TO RELATED APPLICATIONS

This application is a continuation of International Application No. PCT/IB2013/000329, filed Feb. 26, 2013, which claims priority to Provisional Application for U.S. Patent 61/605,244, filed 1 Mar. 2012; and to Provisional Application for U.S. Patent 61/710,718, filed 6 Oct. 2012, the entire contents of each of which are incorporated herein by reference in their entirety for all purposes.

FIELD OF THE INVENTION

The present invention relates to processing of large data files, particularly data representing spatial measurements of a cloud of points.

BACKGROUND

High-speed scanners are commercially available which generate a high-density cloud of point measurements. Such scanners typically have a rotating element which scans a measurement beam about a first axis, mounted on a support which rotates about an orthogonal axis. Each point measurement typically includes a horizontal angle, a vertical angle, a range and a signal intensity. Scanners of this general type include the Trimble Cx Scanner and the Trimble Fx Scanner available from Trimble Navigation Limited of Sunnyvale, Calif., USA.

A single stationary scan involves operating the scanner at a selected location to obtain a set of point measurements for that location. A project involves performing such a scan at each of multiple locations to obtain data representing a cloud of points for a three-dimensional environment of interest.

A user may perform, for example, some fifty scans per day with such a scanner. A typical project can include 200 to 2000 or more scans. Each scan typically includes between 50-150 million point measurements. A single project of 200 scans each having 100 million point measurements, for example, would produce data representing some 20 gigapoints. Projects of 7000 scans are already known, and even larger projects are expected in future.

The huge size of these data sets raises a number of issues. First, is how to store and transfer the data from the project site where the data is collected to an office environment where the data are needed. A common method is to store the data on a physical storage medium, such as a hard drive, and to ship this medium by post or courier. Streaming of such large data sets is generally impractical.

Second, is how to process the data. Special processing algorithms, such as are used to extract useful information from the raw point-measurement data, are slow due to the large quantity of data to be manipulated and the sequential structure of the acquired data set.

Third, is how to present the data so they can be visualized. Visualization is needed in the field for quality assurance so the scanner operator can assure the collected data set is good, as well as in the office where the data are used.

Improved methods and apparatus for managing and processing such point cloud data are needed to address one or more of these and other issues.

SUMMARY

Some embodiments of the invention provide a method of processing at least one set of data representing three-dimensional points organized in a data structure. For each set, each three-dimensional point has multiple components, the data is organized in a respective layer per component, each layer is segmented in cells of a two-dimensional grid, the cells are arranged such that the components of a given point are contained in corresponding cells of multiple layers, the cells are grouped in patches by layer, and the patches are arranged such that the components of an array of points is represented by corresponding patches of multiple layers. The method comprises obtaining at least one first criterion, obtaining at least one second criterion, retrieving data from cells of patches meeting the at least one first criterion of layers meeting the at least one second criterion, processing the retrieved data to obtain a derivative data set, and storing the derivative data set.

In some embodiments the layers comprise complete layers and preview layers, wherein each preview layer has cells containing data from a subset of the cells of a complete layer.

Some embodiments provide a viewer method in which obtaining the at least one first criterion comprises identifying patches corresponding to a display region, obtaining the at least one second criterion comprises selecting a layer whose cells contain intensity values for the three-dimensional points, retrieving data comprises retrieving intensity values from cells of the identified patches of the selected layer, processing the retrieved data to obtain a derivative data set comprises preparing from the retrieved intensity values an array of two-dimensional pixel data, and storing the derivative data set comprises providing the array of two-dimensional pixel data to a device for display as an array of two-dimensional pixels over the display region.

Some embodiments provide a point-picking method in which obtaining the at least one first criterion comprises displaying intensity values of cells of a preview layer as a two-dimensional array of pixels, obtaining coordinates of a first selected location in the two-dimensional array, identifying a cell of the preview layer corresponding to the first selected location as a first selected cell, identifying a patch of a complete layer which contains the first selected cell, obtaining the at least one second criterion comprises selecting complete layers containing range data, horizontal angle data and vertical angle data, retrieving data comprises retrieving patches from the selected complete layers which contain a range value, a horizontal angle value and a vertical angle value of the three-dimensional point corresponding to the first selected cell, processing the retrieved data to obtain a derivative data set comprises computing first Cartesian coordinates of the three-dimensional point corresponding to the first selected cell from the range value, the horizontal angle value and the vertical angle value of the three-dimensional point corresponding to the first selected cell, and storing the derivative data set comprises storing the first Cartesian coordinates as a first selected point.

Some embodiments provide for computing distance between such picked points. Some embodiments provide for computing an angle between lines defined by such picked points.

Some embodiments provide for retrieving all points within a polygon. Some embodiments provide for retrieving points associated with a picked point within a polygon meeting at least one selection criterion. Some embodiments provide for retrieving points within a polygon meeting at least one selection criterion.

Some embodiments provide for determining normals of points. Some embodiments provide for using normals of points and/or other characteristics to identify points associated with a feature of an environment so as to segment a data set by objects. Some embodiments provide for identifying coincident points from multiple data sets.

Some embodiments provide apparatus for carrying out one or more of the methods. Some embodiments provide a computer program of instructions adapted to enable a processor to perform one or more of the methods. Some embodiments provide a computer program product comprising a tangible medium on which is embodied a set of instructions adapted to enable a processor to perform one or more of the methods.

BRIEF DESCRIPTION OF THE DRAWINGS

These and other aspects of the invention are described below with reference to the drawing figures, in which:

FIG. 4 illustrates a manner of populating the grid structure of FIG. 3;

FIG. 14A shows a viewer process in accordance with some embodiments of the invention;

FIG. 14B shows an example of a two-dimensional view projection of three-dimensional points in accordance with some embodiments of the invention;

FIG. 14C shows a two-dimensional display of the view projection of FIG. 14B;

FIG. 28A shows an example of picking a point in a two-dimensional display representing three-dimensional points in accordance with some embodiments of the invention;

FIG. 28B shows a representation of the selected point of FIG. 28A in a two-dimensional display from a different station than that of FIG. 28A;

FIG. 33A shows the view of FIG. 30 with one patch of the region outlined;

FIG. 33B shows an enlarged view of the outlined patch of FIG. 33A;

FIG. 35A shows an enlarged view of the outlined patch of FIG. 33A;

FIG. 35B shows a refinement of the patch of FIG. 35A;

FIG. 42A is an enlarged view of the patches of FIG. 41 showing boundaries of the object of FIG. 39;

FIG. 42B is an enlarged view of the patches of FIG. 41 showing highlighted the objected of FIG. 39;

DETAILED DESCRIPTION

Figure 1:
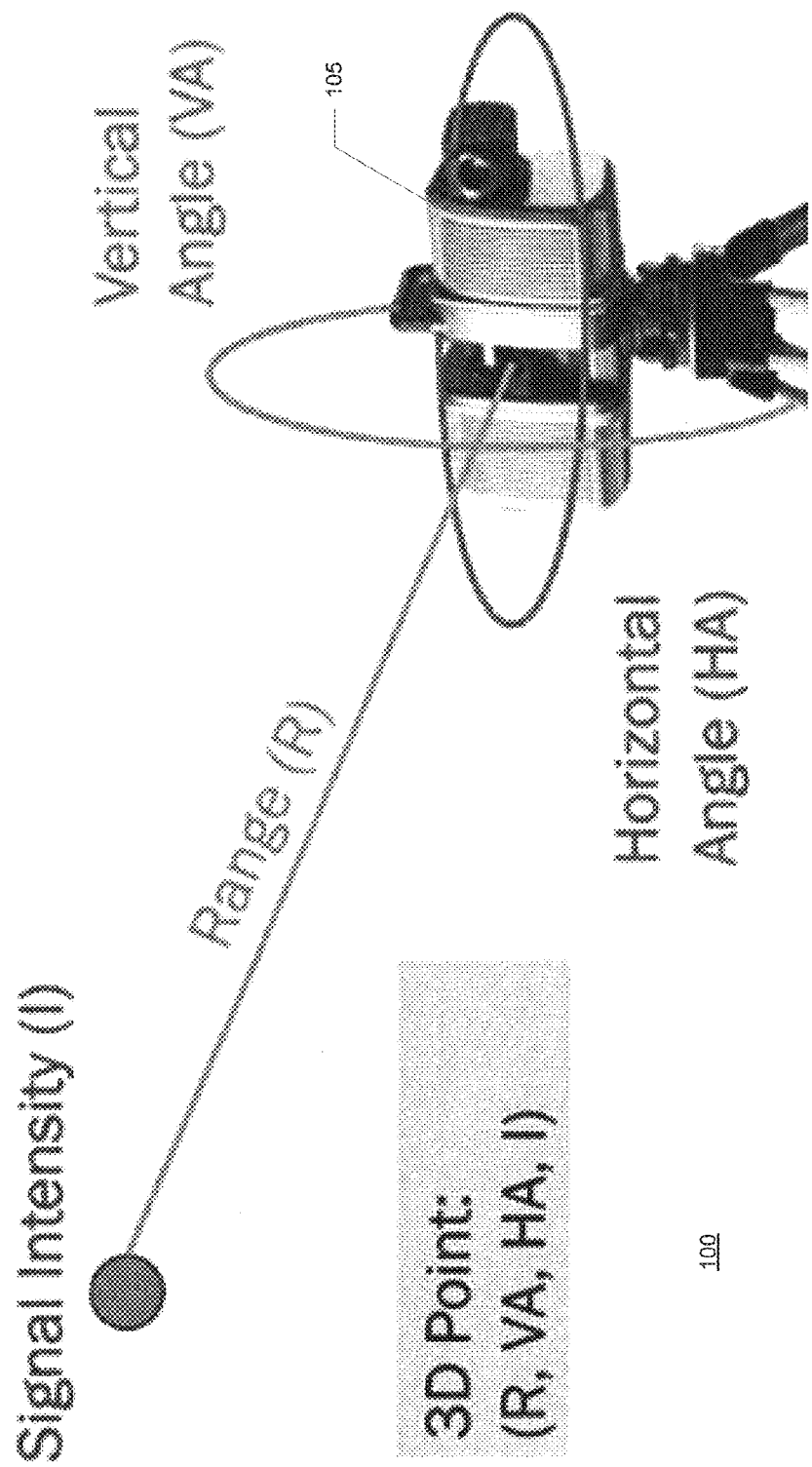
FIG. 1 illustrates acquisition of three-dimensional point measurements with a scanner.

FIG. 1 illustrates at 100 how three-dimensional point measurements are acquired with a scanner, such as a Trimble Cx or a Trimble Fx scanner. For each point, a scanner 105 measures a horizontal angle (HA), a vertical angle (VA), a range (R), and a signal intensity (I), such that each 3D point is represented by the measurement set (R, VA, HA, I).

The data set acquired from a scan with such a scanner is typically too large to store in the scanner's random-access memory (RAM) and therefore is not practical to use as a single data structure.

Figure 2:
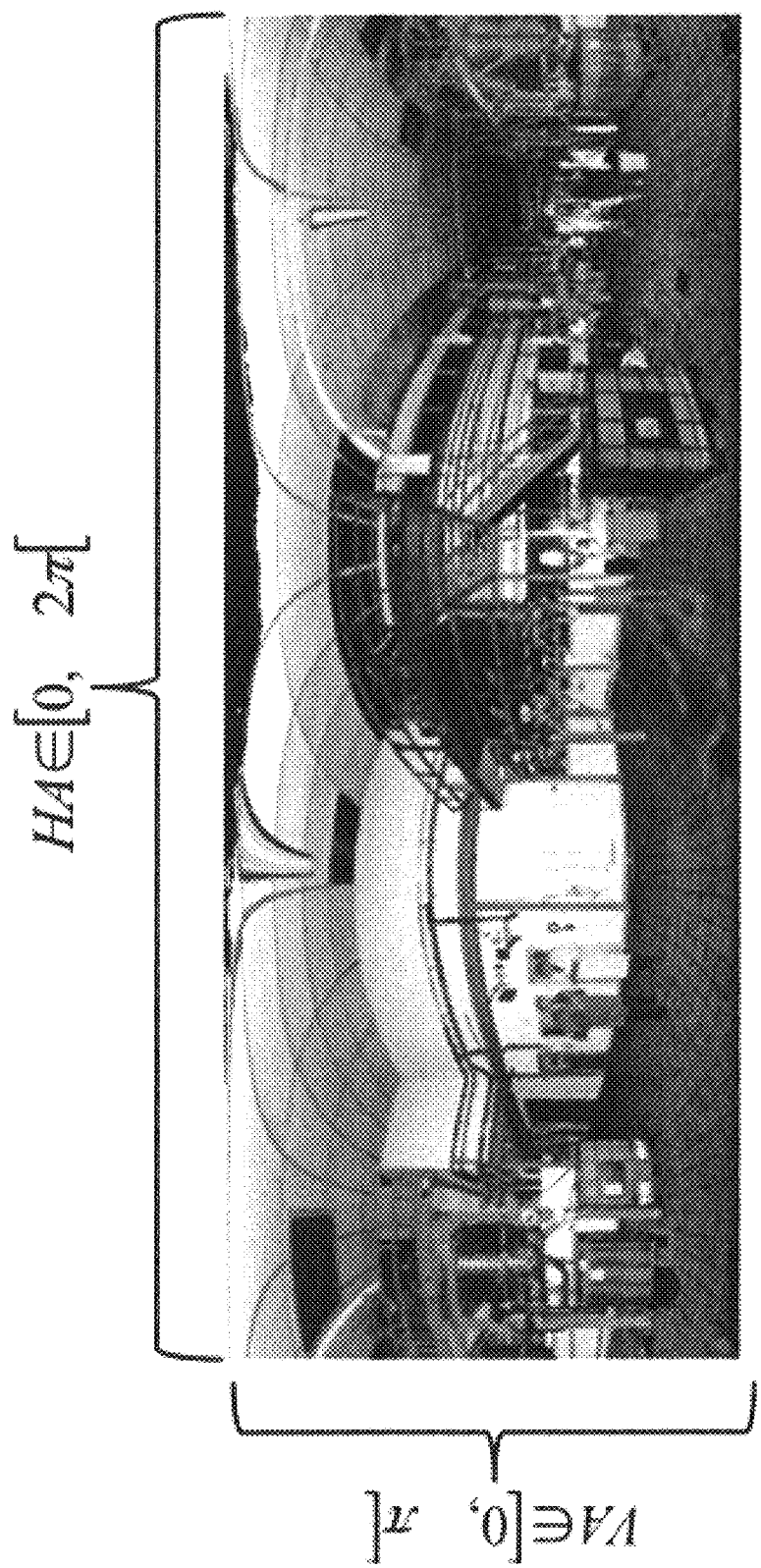
FIG. 2 illustrates scanner data displayed as a cloud of points.

FIG. 2 illustrates at 200 an example of scanner data displayed as a cloud of 3D points in a 2D grid structure having a vertical axis $VA \in [0,\pi]$ and a horizontal axis $HA \in [0,2\pi]$.

Figure 3:
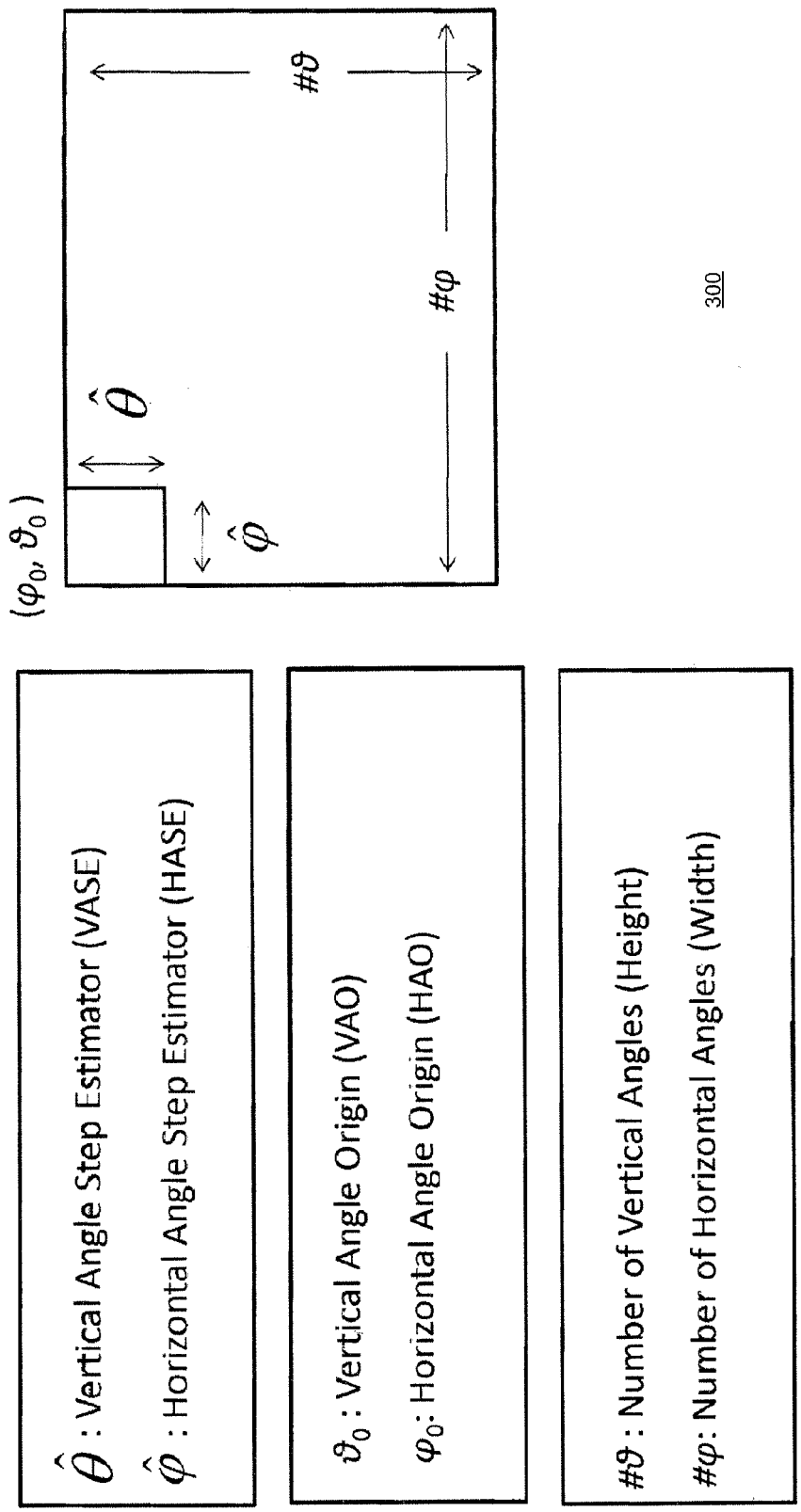
FIG. 3 illustrates the organization of a two-dimensional grid structure.

FIG. 3 illustrates at 300 the organization of a 2D grid structure. In this example, the grid structure is defined by a set of grid parameters suited for a scanner:

$\hat{\theta}$ Vertical Angle Step Estimator (VASE)
$\hat{\phi}$ Horizontal Angle Step Estimator (HASE)
$\theta_0$ Vertical Angle Origin (VAO)
$\phi_0$ Horizontal Angle Origin (HAO)
$\theta$ Number of Vertical Angles (Height)
$\phi$ Number of Horizontal Angles (Width)

FIG. 4 illustrates at 300 a manner of populating the grid structure of FIG. 3. Cells are arranged in rows ($VA_0$, $VA_1$, $VA_2$, ... $VA_M$) and columns ($HA_0$, $HA_1$, $HA_2$, ... $HA_N$). Each cell contains a set of point data, e.g., cell $HA_0$, $VA_0$ contains point data (R, VA, HA, I)$_{0,0}$ and cell $HA_M$, $VA_N$ contains point data (R, VA, HA, I)$_{M,N}$.

Populating the grid structure as shown in FIG. 4 has several drawbacks. First, the entire data set of a scan is embodied in a single data structure which can be cumbersome to compress, store, decompress and process. Second, it can be difficult and time-consuming to identify or select aspects of interest in the data set, since it is structured as a single entity. Third, if the data set is not segmented it will not fit in the RAM available in current scanners. Fourth, the compression rate is not good because the data is heterogeneous. Fifth, data access is inefficient because the whole scan data set must be manipulated to access even one byte of data.

Figure 5:
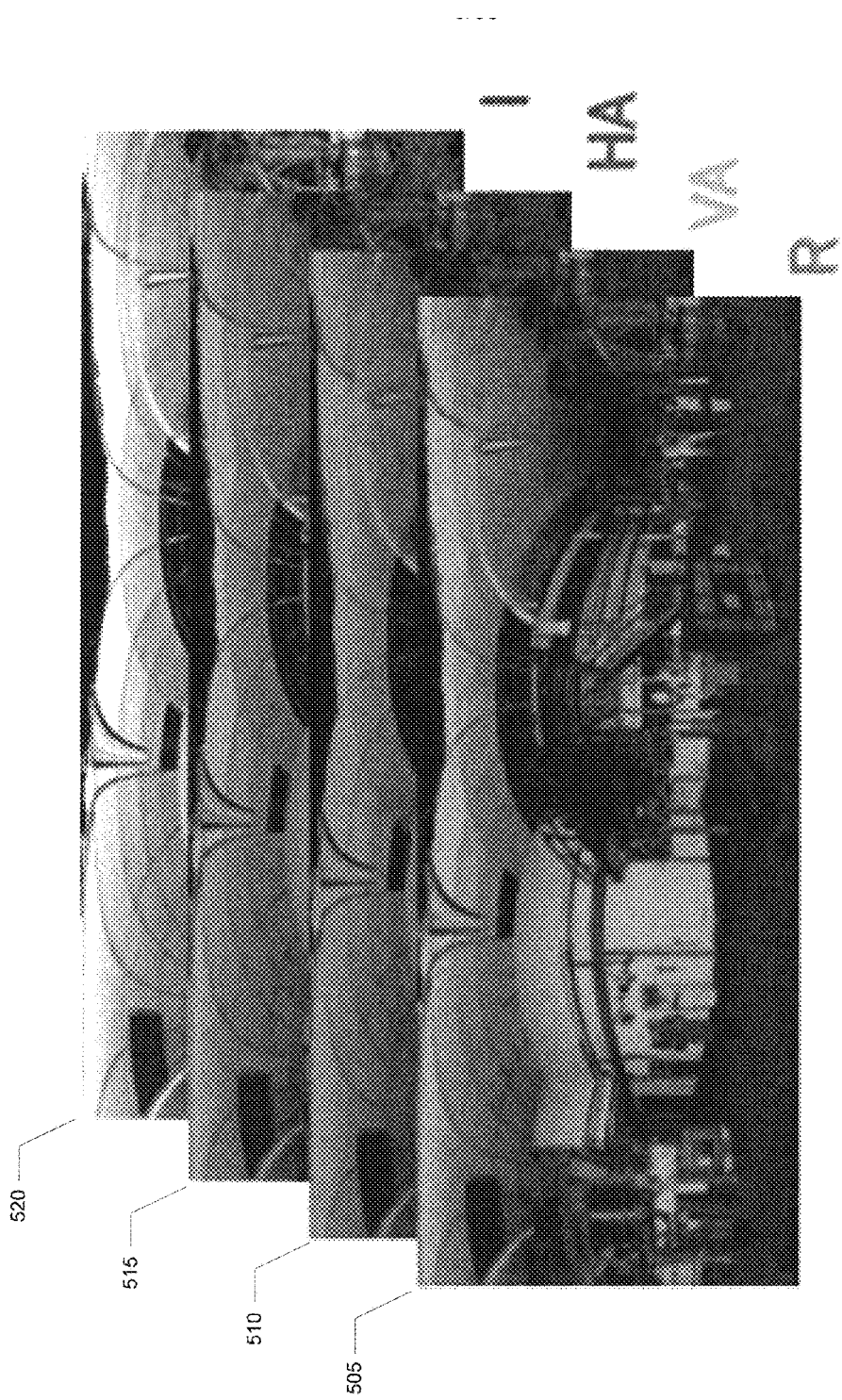
FIG. 5 illustrates a layer organization.

FIG. 5 illustrates at 500 a layer organization in accordance with some embodiments of the invention. In this organization the data set uses a 2D grid as in FIG. 4 with cells arranged in rows and columns, but the data is separated into layers by component. For example, a layer 505 contains the range data R, a layer 510 contains the vertical angle data VA, a layer 515 contains the horizontal angle data HA, and a layer 520 contains the intensity data I.

Thus, data representing 3D points can be readily stored using a 2.5D structure (2D grid with a data element per cell) in multiple layers.

For example, distance and intensity data are stored in separate layers, and the vertical angle and horizontal angle data are assumed to be the center of the cell (an approximation).

Figure 6:
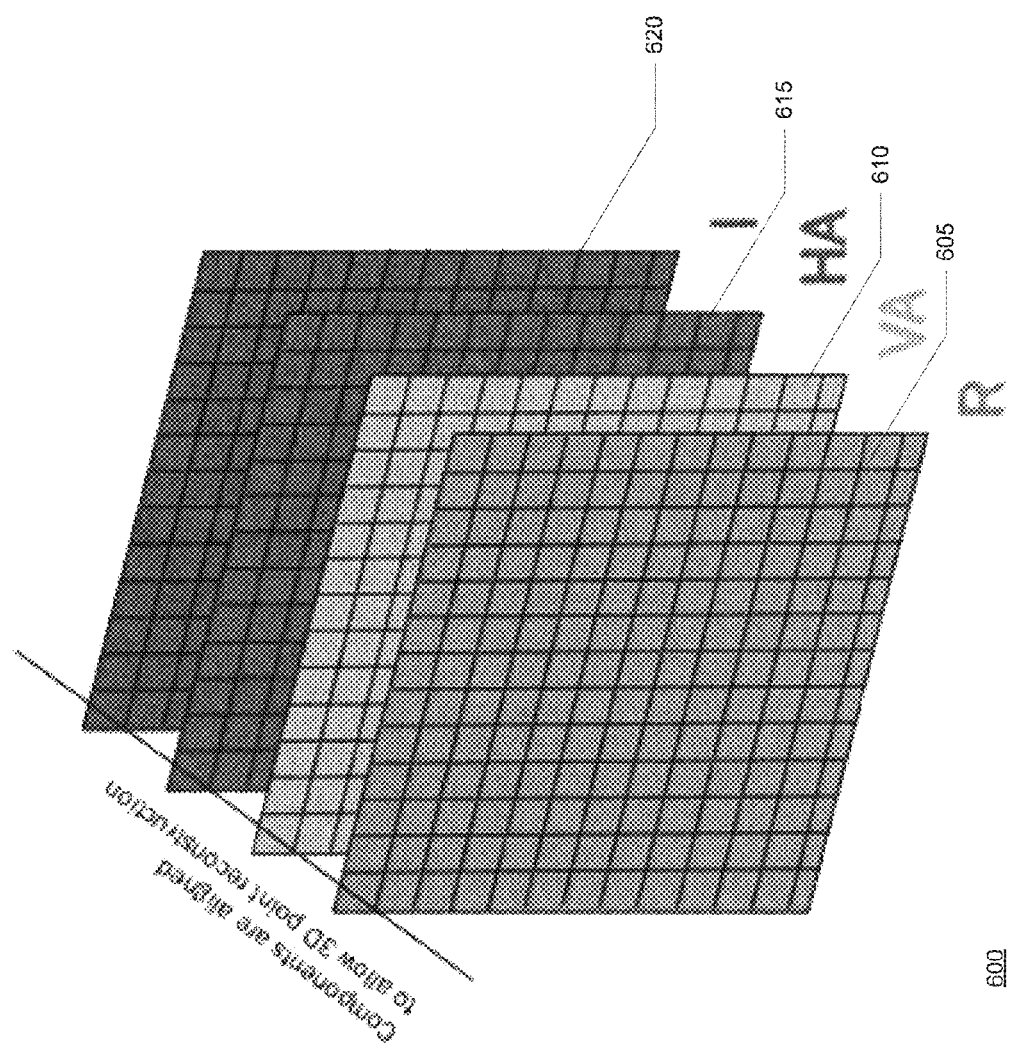
FIG. 6 shows another view of the layer organization of FIG. 5.

FIG. 6 shows at 600 another view of the layer organization of FIG. 5, in which the cells of each layer are aligned with cells of the other layers corresponding to a given point. That is, a cell of grid 605 contains the ranging data R for a given point, and the corresponding cell of grids 610, 615, 620 contain respectively the vertical angle data VA, horizontal angle data HA, and intensity data I for the given point. Though the layers are separated by component, the data for a given point is readily retrieved from the corresponding cells in the component layers. Each layer can have, for example four bytes per cell for range, four bytes for VA, four bytes for HA, one or two bytes for intensity, and typically three bytes for color information, but using multiple layers allows any number of bytes per point.

Figure 7:
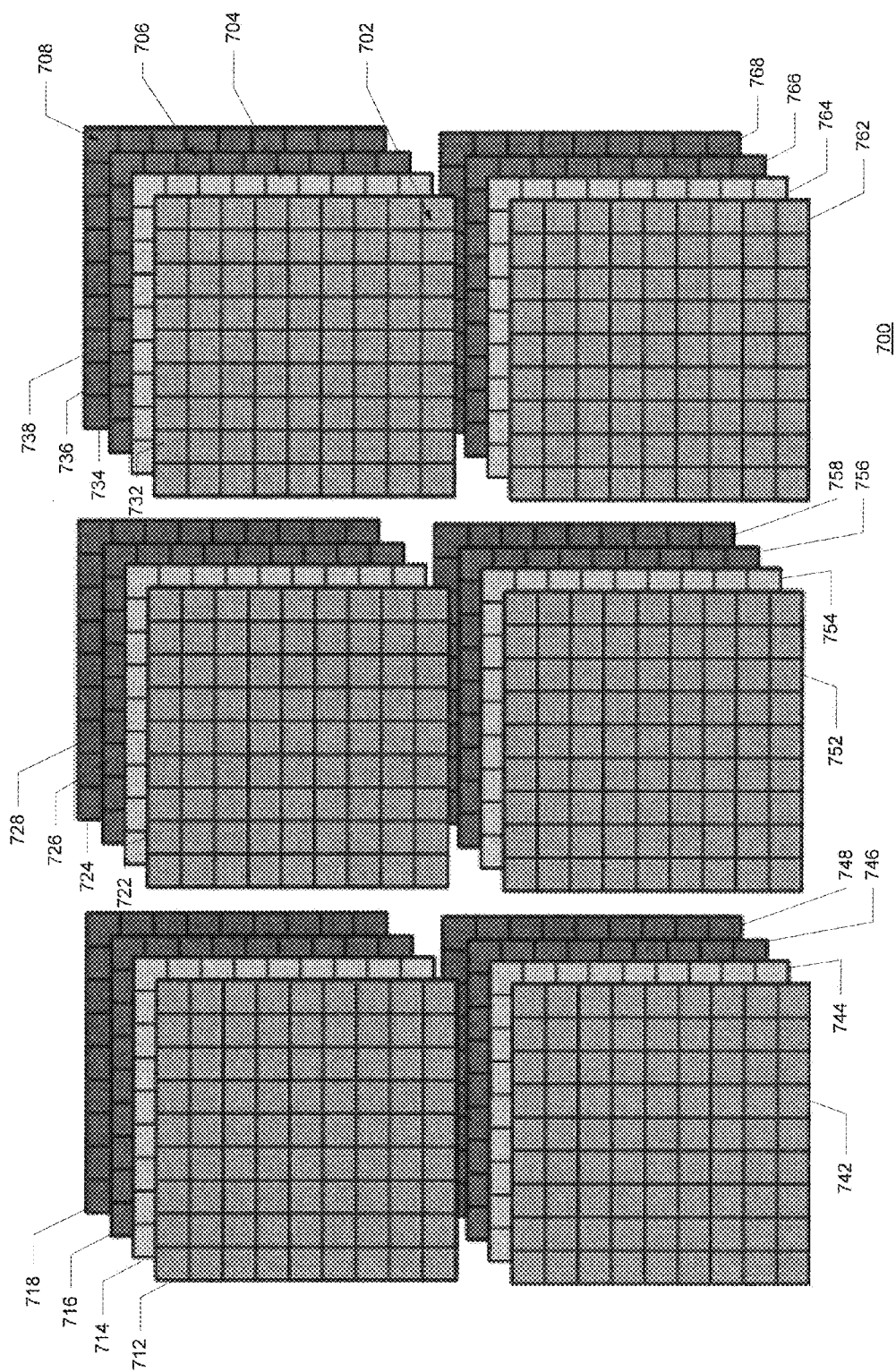
FIG. 7 illustrates a segmentation of a layered grid into patches of cells.

FIG. 7 illustrates at 700 a segmentation of the layered grid into patches of cells in accordance with some embodiments of the invention. In this example, the point data is separated into four layers: 702, 704, 706 and 708. For convenience of illustration, each layer is segmented into six patches, though the segmentation is preferably divided to achieve a patch size selected for ease of processing and transmission and manipulation, such as 512×512 cells or any other selected size. In this example, layer 702 is segmented into patches 712, 722, 732, 742, 752 and 762; layer 704 is segmented into patches 714, 724, 734, 744, 754 and 764; layer 706 is segmented into patches 716, 726, 736, 746, 756 and 766; and layer 708 is segmented into patches 718, 728, 738, 748, 758 and 768.

Segmenting the layered grid into patches has a number of advantages. The patches are small relative to the size of the overall data set, and thus facilitate efficiency of, storage and retrieval, and transmission over a communication channel. Patch size is a tradeoff between higher compression ratio for larger patches and more efficient data handling and transfer and decompression of patches containing the points of interest. If a particular patch or group of patches is of interest, it is possible to retrieve and decompress only those patches, rather than the entire data set. Patches are suited to parallel processing, allowing more flexible and efficient use of processing resources. The patches can be of a selected resolution, such as 512×512 cells per patch.

The layered grid structure is extensible as desired by adding more layers. A layer can be added for each desired additional parameter. Additional parameters can include, for example, a time stamp, a quality indicator, color data such as RGB information, a second distance measurement and/or other parameters. Derived patches can be, for example, user selected points, normals (a computed value representing a normal to the tangent of a surface at each point), discontinuities, or defined by any other desired parameter. Some embodiments of the invention provide one or more layers containing raw data (such as data from a scanner) and one or more layers containing data processed and/or filtered from other layers, such as a segmentation of points by object in different layers.

Figure 8:
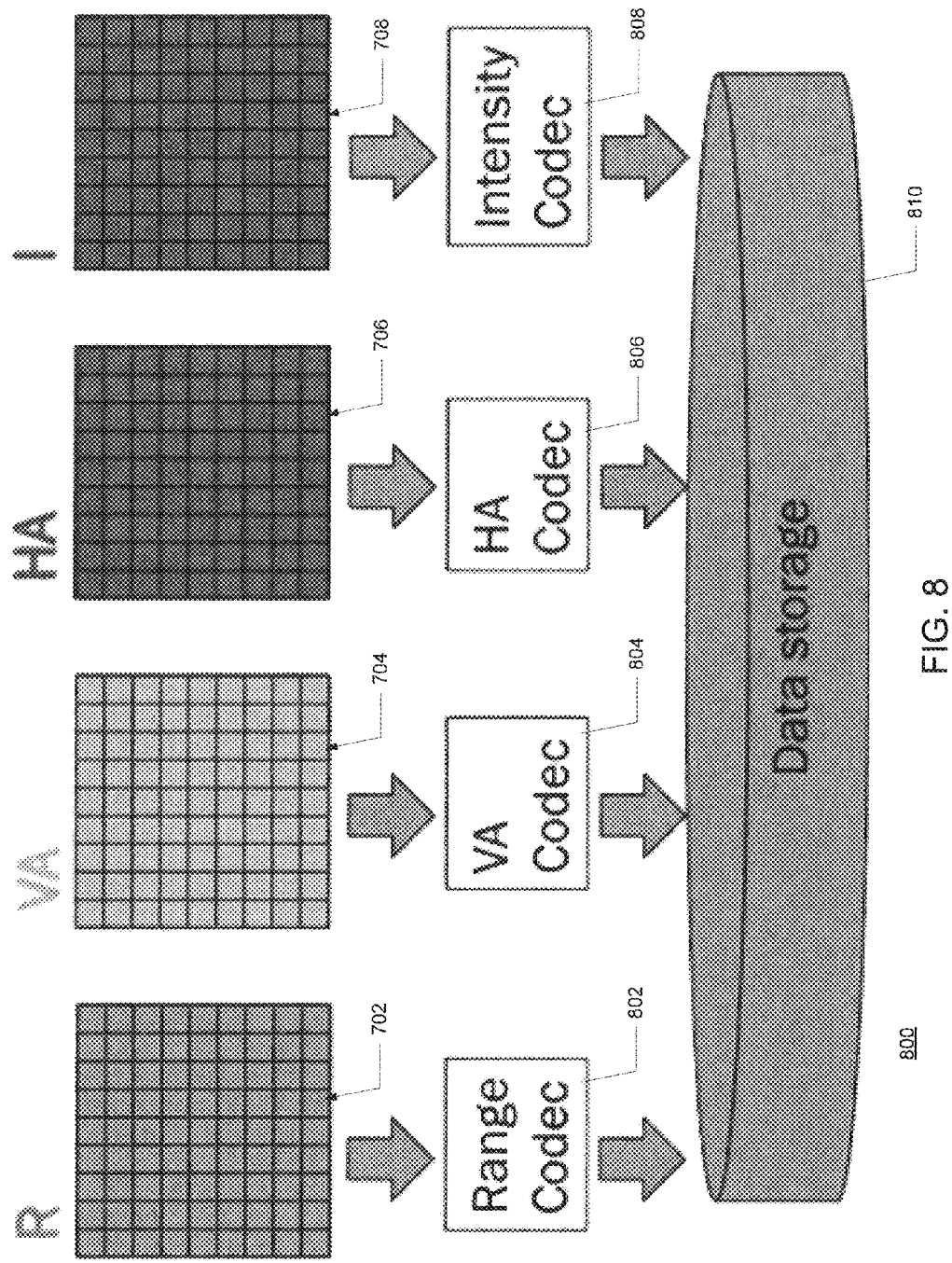
FIG. 8 shows patch compression using for each layer a codec suited to the component data of the layer.

FIG. 8 shows at 800 an example of patch compression using for each layer 702, 704, 706, 708 a coding/decoding algorithm (codec) suited to the component data of the layer. For example, a codec 802 suited to range data is used to compress the range data patches of layer 702, a codec 804 suited to angle data is used to compress the angle data patches of layer 704, a codec 806 suited to angle data is used to compress the angle data patches of layer 706, and a codec 808 suited to intensity data is used to compress the intensity data patches of layer 708. Compressed patches are stored in a data store 810. Transformations include quantifications determined by measurement accuracy and/or precision of the information. The sequence includes transformation, quantification, encoding.

Figure 9:
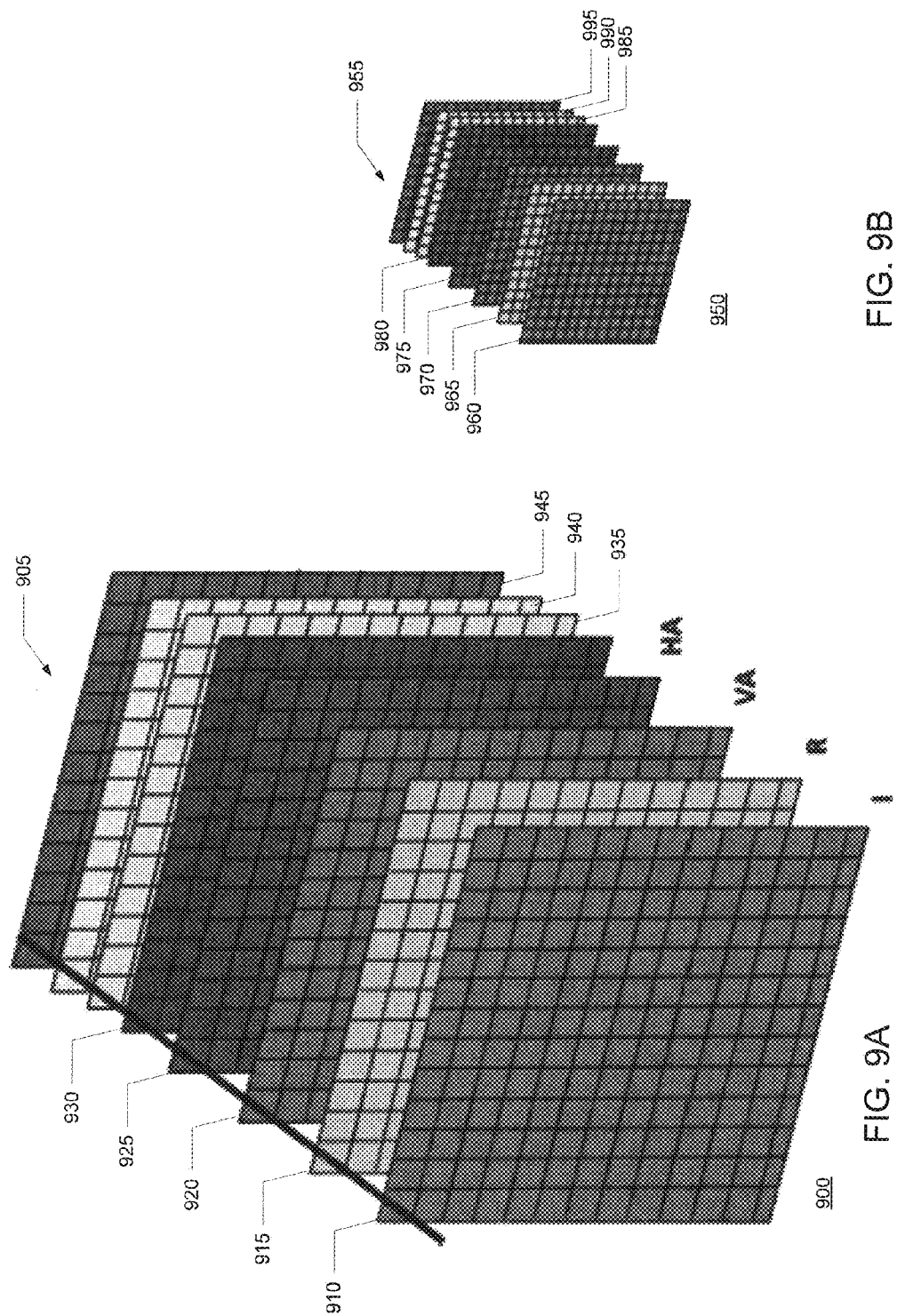
FIG. 9A shows the concept of multiple layers of a grid of cells.
FIG. 9B shows the concept of preview layers.

FIG. 9A shows at 900 the concept of multiple layers of a grid of cells. A data set 905 comprises a layer 910 with cells containing intensity (I) data of respective points, a layer 915 with cells containing range (R) data of the points, a layer 920 with cells containing vertical-angle (VA) data of the points, a layer 925 with cells containing horizontal-angle (HA) data of the points, and possible additional layers 930, 935, 940, 945 each having cells containing another type of information about the points. Such information can be measured, such as color or temperature, or derived, such as a normal of a point or an association of the point with a grouping of points representing an object as explained below.

FIG. 9B shows at 950 the concept of preview layers. Because the data set 905 of FIG. 9A can be quite large and cumbersome to manipulate for display and processing purposes, it is convenient to use preview layers with a reduced data set which can be manipulated more quickly and which are related to the full data set. Any or all layers of data set 905 are down-sampled to produce a corresponding preview data set 955. For example, each n-th cell of layers 910, 915, 920, 925, 930, 935, 940, 945 of data set 905 is extracted to generate a respective preview layer 960, 965, 970, 975, 980, 985, 990, 995 of data set 955 having 1/n of the cells of data set 905. The utility of the preview layers will be seen from the processing examples given below.

The data of each data set can be stored in a relational database such as an Oracle database, or can be stored in a file-based data access format.

Figure 10:
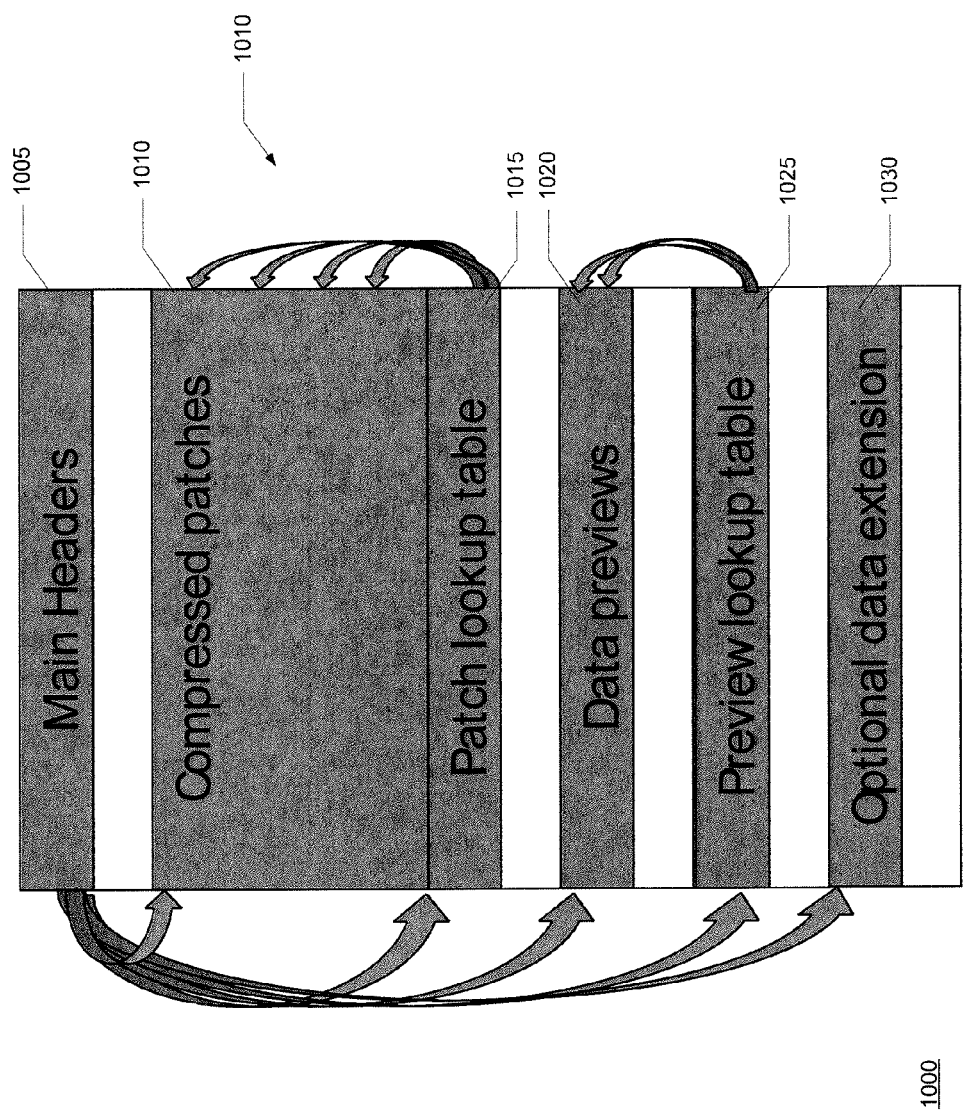
FIG. 10 shows an example of a file-based data access structure.

FIG. 10 shows at 1000 an example of a file-based data access structure 1010. Main headers 1005 contain pointers to compressed patches 1010, patch lookup tables 1015, data previews 1020, a preview lookup table 1025, and optionally one or more data extensions 1030. Patch lookup table 1015 contains pointers to respective patches within compressed patches 1010. Preview lookup table 1025 contains pointers to respective data previews within data previews 1020.

Figure 11:
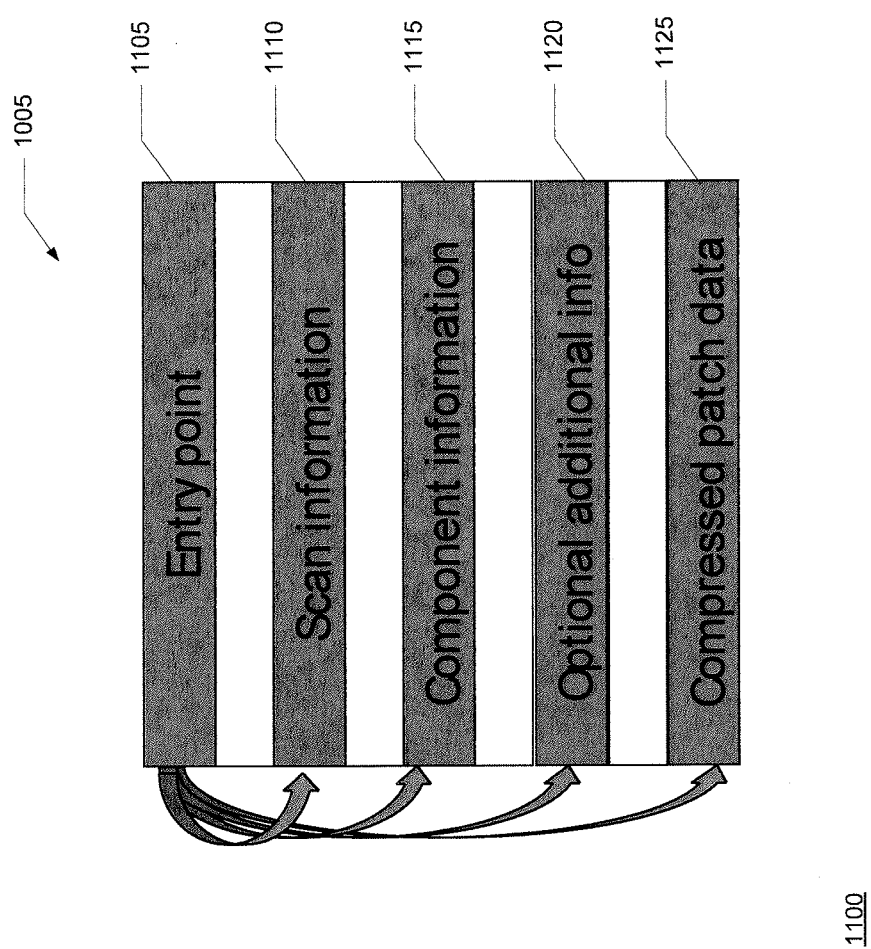
FIG. 11 shows an example of a header structure.

FIG. 11 shows at 1100 an example of main headers 1005. An entry point structure 1105 contains pointers to access scan information 1110, component information 1115, optional additional information 1120, and compressed patch data 1125.

Figure 12:
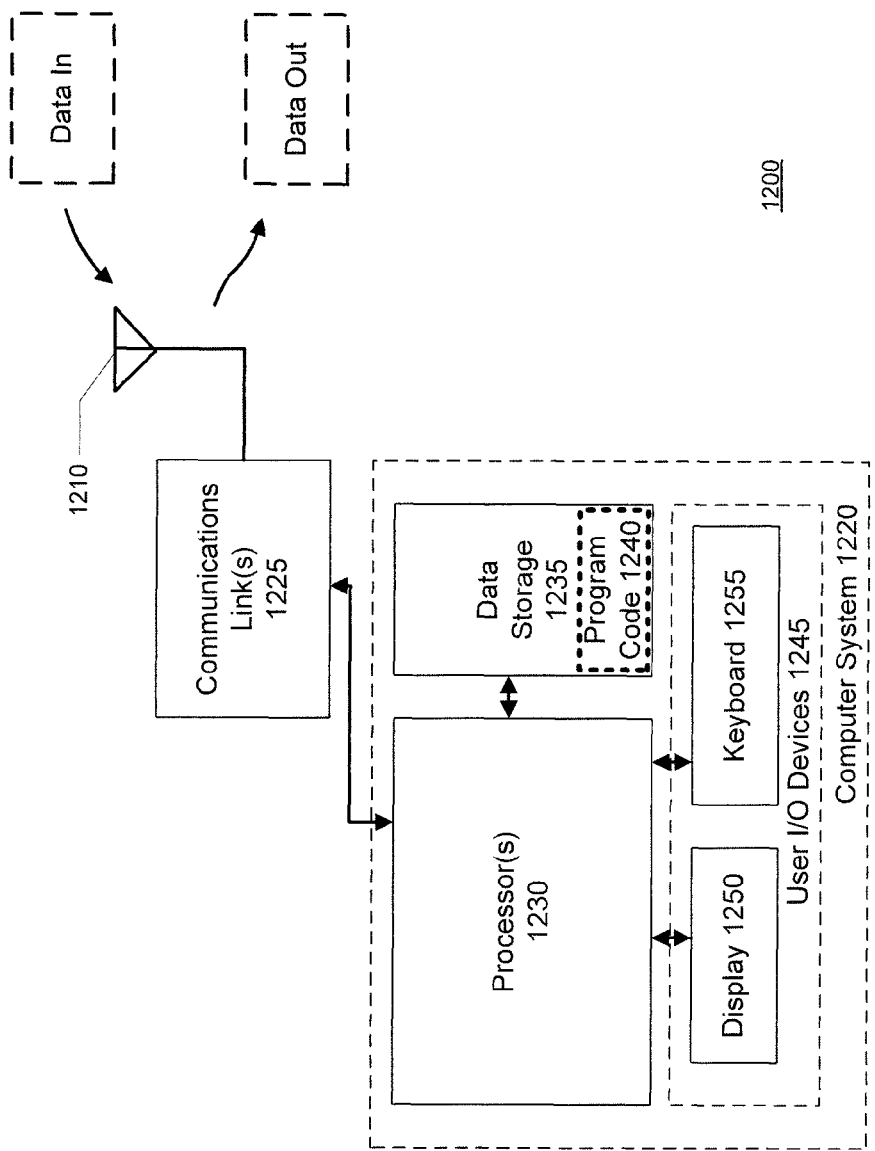
FIG. 12 schematically illustrates elements of a computer system for processing data in accordance with some embodiments of the invention.

FIG. 12 shows at 1200 schematic diagram of a computer system for processing data sets in accordance with some embodiments of the invention. Computer system 1220 includes one or more processors 1230, one or more data storage elements 1235, program code 1240 with instructions for controlling the processor(s) 1230, and user input/output devices 1245 which may include one or more output devices 1250 such as a display or speaker or printer and one or more devices 1255 for receiving user input such as a keyboard or touch pad or mouse or microphone. Examples of processing methods in accordance with some embodiments of the invention are described below.

Processing Scan Data Sets

Figure 13:
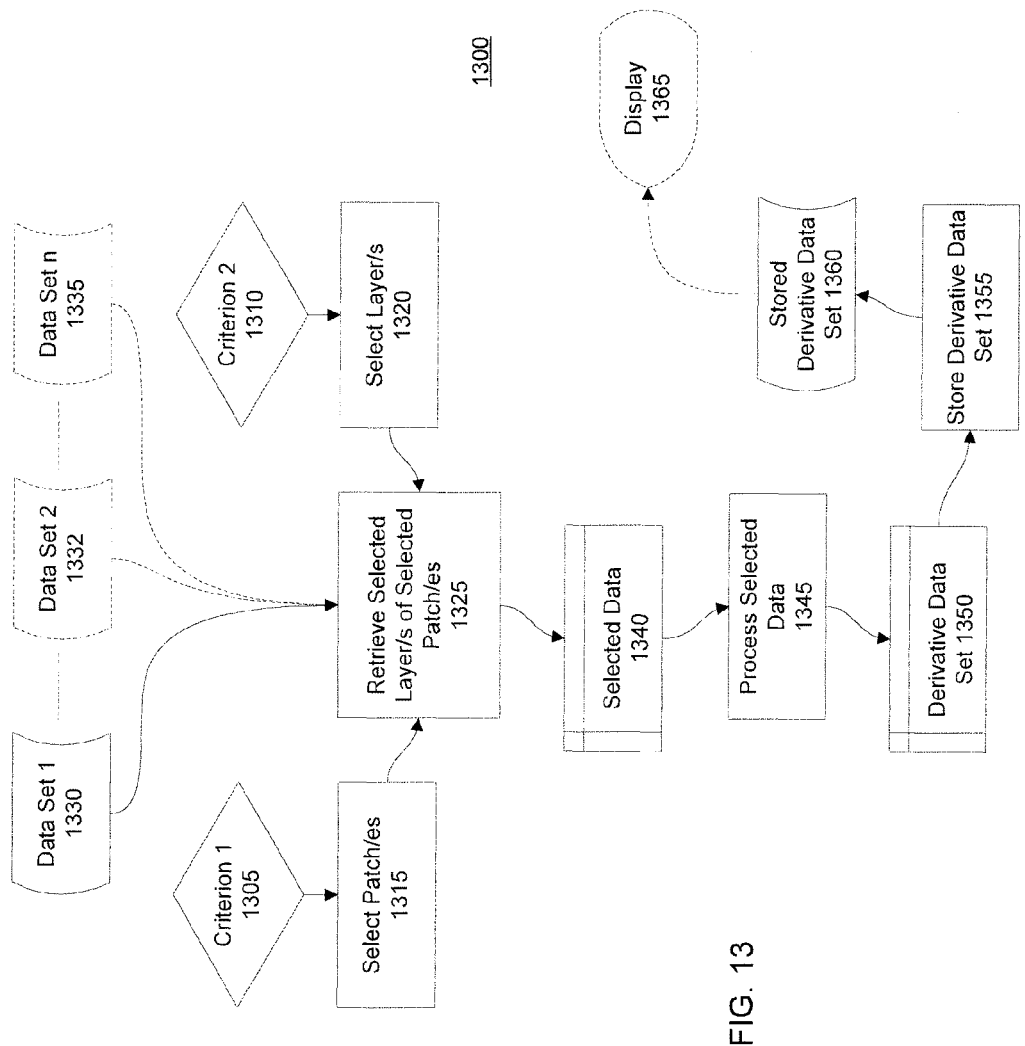
FIG. 13 shows a generic process in accordance with some embodiments of the invention.

FIG. 13 shows at 1300 a process in accordance with some embodiments of the invention. A first criterion 1305 and a second criterion 1310 are obtained, for example, from direct user input, from indirect user input through selection of a menu item or desired process template, from a previous process, from default settings, or from any other suitable source. First criterion 1310 serves as an input to step 1315, defining at least one patch to be selected. Second criterion 1310 serves as an input to step 1320, defining at least one layer to be selected. Step 1325 retrieves the selected patch or patches from the selected layer or layers of at least one of data sets 1330 . . . 1335 to obtain selected data 1340.

Each data set represents, for example, data obtained by a scanner located at a respective station. The data of each set represents three-dimensional points organized in a data structure wherein, for each set, each three-dimensional point has multiple components, the data is organized in a respective layer per component, each layer is segmented in cells of a two-dimensional grid, the cells are arranged such that the components of a given point are contained in corresponding cells of multiple layers, the cells are grouped in patches by layer, and the patches are arranged such that the components of an array of points is represented by corresponding patches of multiple layers.

Selected data 1340 are processed at step 1345 to obtain derivative data 1350. Derivative data 1350 are stored at step 1355 as stored data 1360, the storage of which may be temporary (e.g., video random access memory (RAM)) or semi-permanent (e.g., magnetic disk or electronically-erasable programmable read-only memory (EEPROM)) or permanent (e.g., read-only memory (ROM) or digital video disk (DVD)). The stored derived data 1360 is used, for example, to drive an optional display 1365 visible to a user and/or as input for a further process. Data 1360 may be stored in the form of one or more derived layers, such as layers 930 . . . 945 of FIG. 9.

Viewing Scan Data

FIG. 14A shows at 1400 a viewer process in accordance with some embodiments of the invention. At step 1405 a view is selected, which defines at 1410 an orientation, a field of view and a resolution. At step 1410 the patches 1415 of a data set are selected which contain data defining points corresponding to the orientation, field of view and resolution. The selected patches are used to create a display for a user.

FIG. 14B shows at 1430 an example of a two-dimensional view projection of three-dimensional point data in accordance with some embodiments of the invention. The point data are in polar coordinates, each point defined by a horizontal angle (HA), a vertical angle (VA), a range (R), and an intensity (I). The notional polar coordinate system is represented by an origin 1435 and a sphere 1440 having latitude and longitude indicators. A two-dimensional display 1445 of such data is presented on a flat-screen display, with the three-dimensional points projected to a two-dimensional surface for visualization by a user. Intensities of the displayed pixels are determined from the intensity values of the point measurement data.

FIG. 14C shows at 1460 a two-dimensional display of the view projection of FIG. 14B. This is an example of a preview layer of intensity data presented, for example, on a display screen. This example includes an overlay of a group of squares 1465 representing patch boundaries of the data set from which the preview layer is downsampled.

Figure 15:
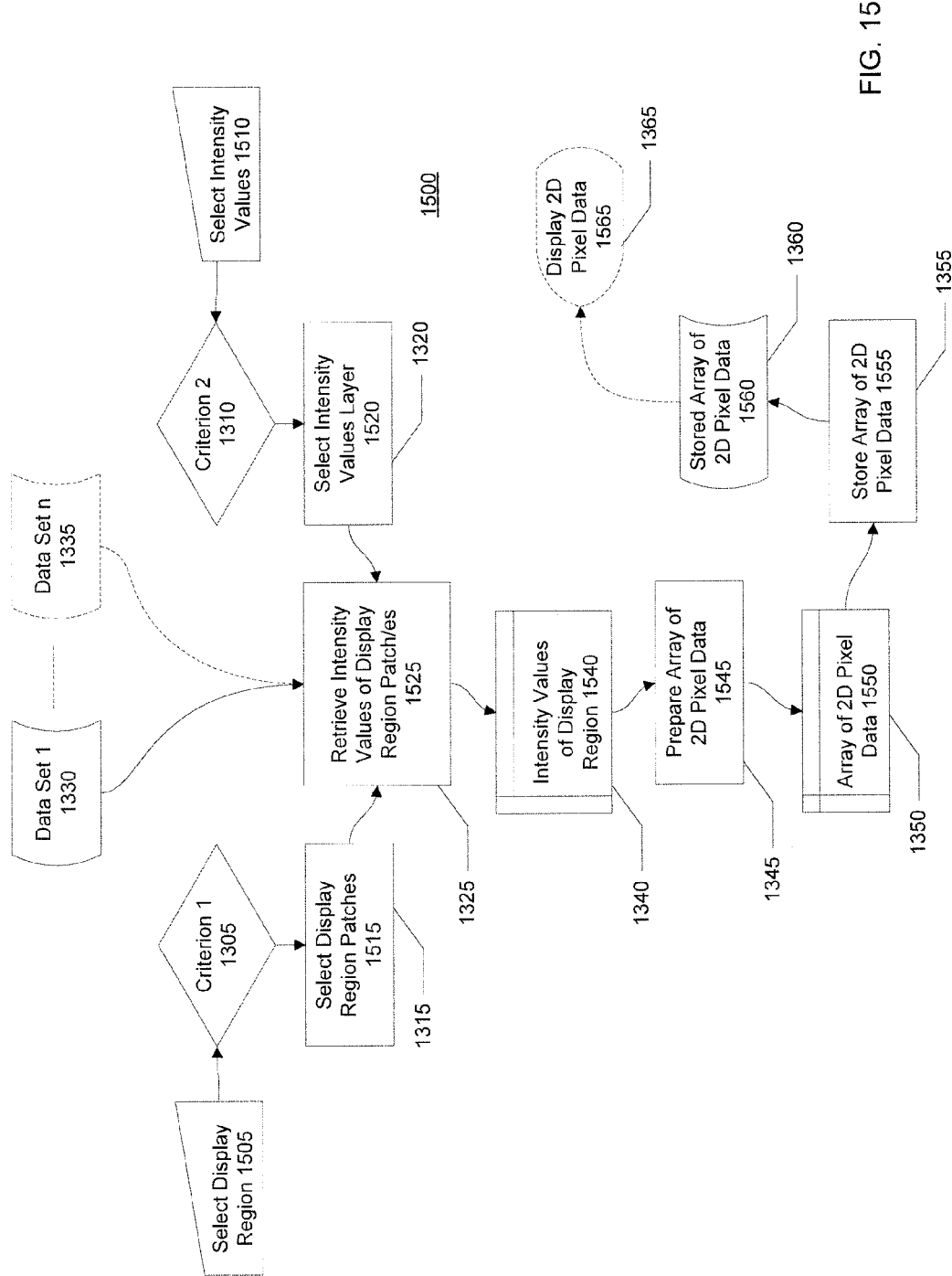
FIG. 15 shows a viewer process in accordance with some embodiments of the invention.

FIG. 15 shows a viewer process 1500 in accordance with some embodiments of the invention. Common reference numerals indicate correspondence of elements of process 1500 with the generic process 1300 of FIG. 13.

A display region 1505 is defined for example as at 1410 by orientation, field of view and resolution; this is taken as the at least one first criterion 1305. Intensity values 1510 define the at least one second criterion 1310. The patches selected at 1515 for the display are thus determined by the selected display region 1505. The layer selected at 1520 is determined by the choice of intensity values, which may be implicitly understood from user input requesting a two-dimensional display.

At step 1525 the intensity values contained in the cells of the patches covering the selected display regions are retrieved as intensity values 1540. At step 1545 an array of two-dimensional pixel data 1550 is prepared from intensity values 1540. At step 1555 the pixel data 1550 are stored as an array 1560 for optional display at 1565. Data 1560 may be stored in the form of one or more derived layers, such as layers 930 . . . 945 of FIG. 9.

Picking a Point

Figure 16C:
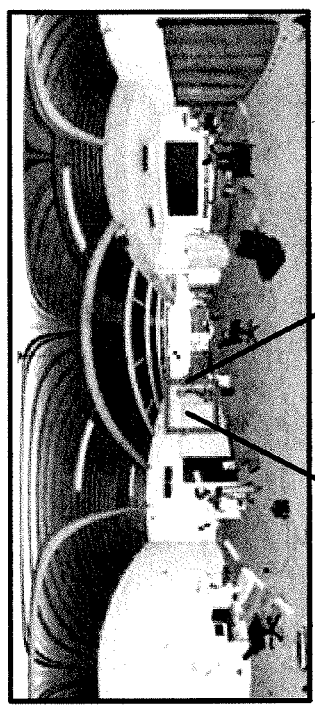
FIG. 16C shows the patch containing the picked point in the display of FIG. 16B.
Figure 16D:
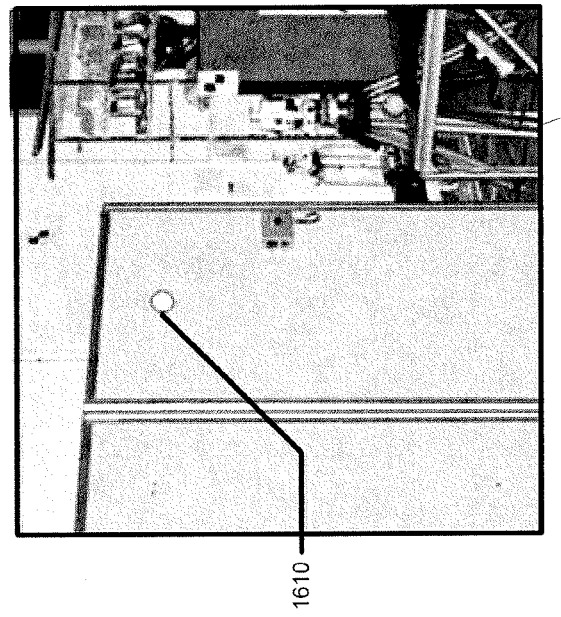
FIG. 16D shows an enlarged view of the patch of FIG. 16C.
Figure 16A:
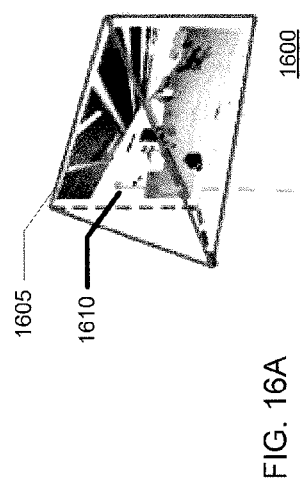
FIG. 16A shows an example of picking a point in accordance with some embodiments of the invention.

FIG. 16A shows at 1600 an example of picking a point in a two-dimensional display 1605 of three-dimensional points in accordance with some embodiments of the invention. A user viewing display 1605 operates an input device, such as a mouse or keyboard or other control element moving a cursor on the display, to select a point 1610 on the display representing a three-dimensional point in space of interest to the user.

Figure 16B:
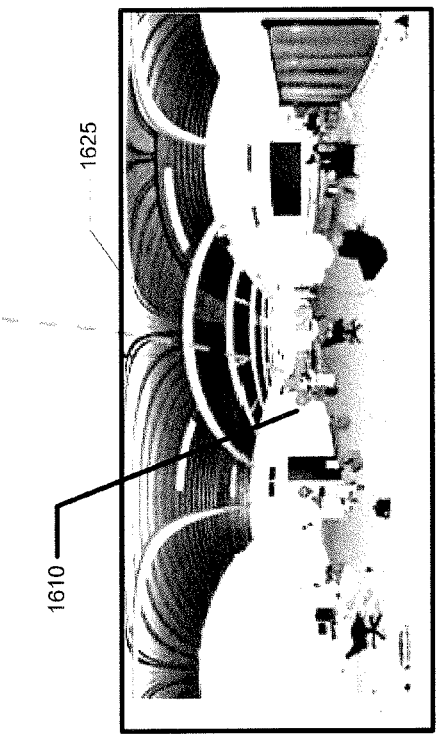
FIG. 16B shows the picked point of FIG. 16A in a two-dimensional display.

FIG. 16B shows at 1620 a two-dimensional display 1625 in which the selected point 1605 of FIG. 16A is highlighted.

FIG. 16C shows at 1640 a two-dimensional display 1645 in which the selected point 1610 is highlighted. Rectangle 1650 indicates the patch which includes the cell with data representing the selected point 1610.

FIG. 16D shows at 1660 an enlarged two-dimensional view of the patch outlined at 1650 of FIG. 16C, which includes the selected point 1610.

Figure 17:
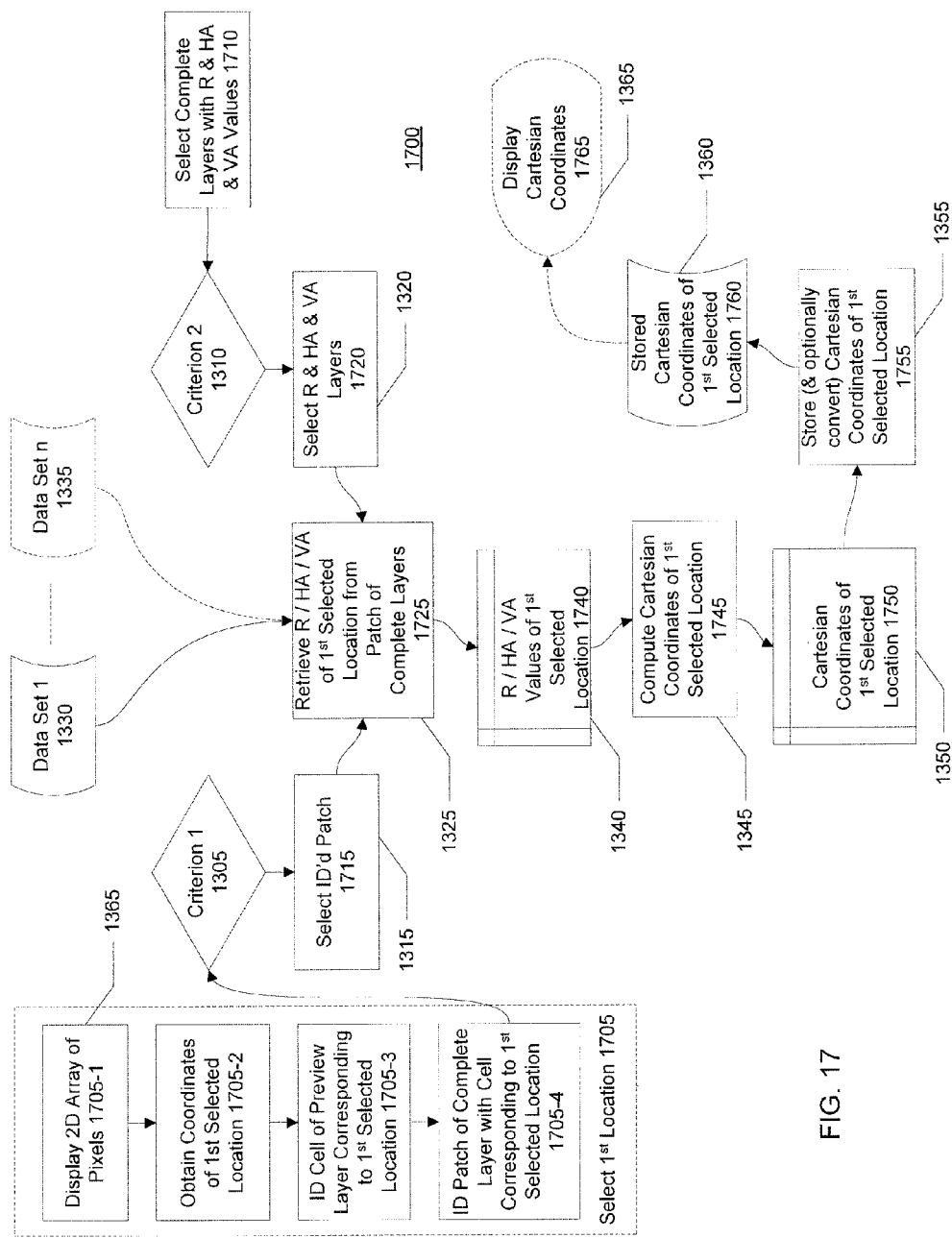
FIG. 17 shows a process for retrieving coordinates of a three-dimensional point in accordance with some embodiments of the invention.

FIG. 17 shows at 1700 a process for retrieving coordinates of a three-dimensional point in accordance with some embodiments of the invention. Common reference numerals indicate correspondence of elements of process 1700 with the generic process 1300 of FIG. 13.

At step 1705 a first location is selected. To do this, a two-dimensional array of pixels is displayed at step 1705-1 such as by performing the process of FIG. 15. The two-dimensional coordinates in the display of a first point selected by a user, such as point 1610, are obtained at step 1705-2. The cell (of the preview layer used to prepare the display) which corresponds to the first location is identified at step 1705-3. The patch containing the identified cell is identified at step 1705-4. The identity of this patch is taken as the at least one first criterion 1305.

Because the three-dimensional coordinates of the first point are to be determined, the layers with cells containing range (R), horizontal angle (HA) and vertical angle (VA) data define the at least one second criterion 1310. The patch selected at 1715 is thus the patch with the cell corresponding to the first point, and the layers selected at 1720 are those having the data needed to determine position of the first point in a three-dimensional coordinate system.

At step 1725 the values contained in the cell corresponding to the user-selected point are retrieved from the respective layers as R, HA and VA values 1740. At step 1745 the R, HA and VA values defining three-dimensional position of the first point are used to compute Cartesian coordinates 1750 of the first point. Step 1755 stores the Cartesian coordinates at 1760 for use in other processes and/or optional display at 1765. Data 1760 may be stored in the form of one or more derived layers, such as layers 930 . . . 945 of FIG. 9, e.g., with one layer per coordinate direction.

Computing Distance Between Picked Points

Figure 18:
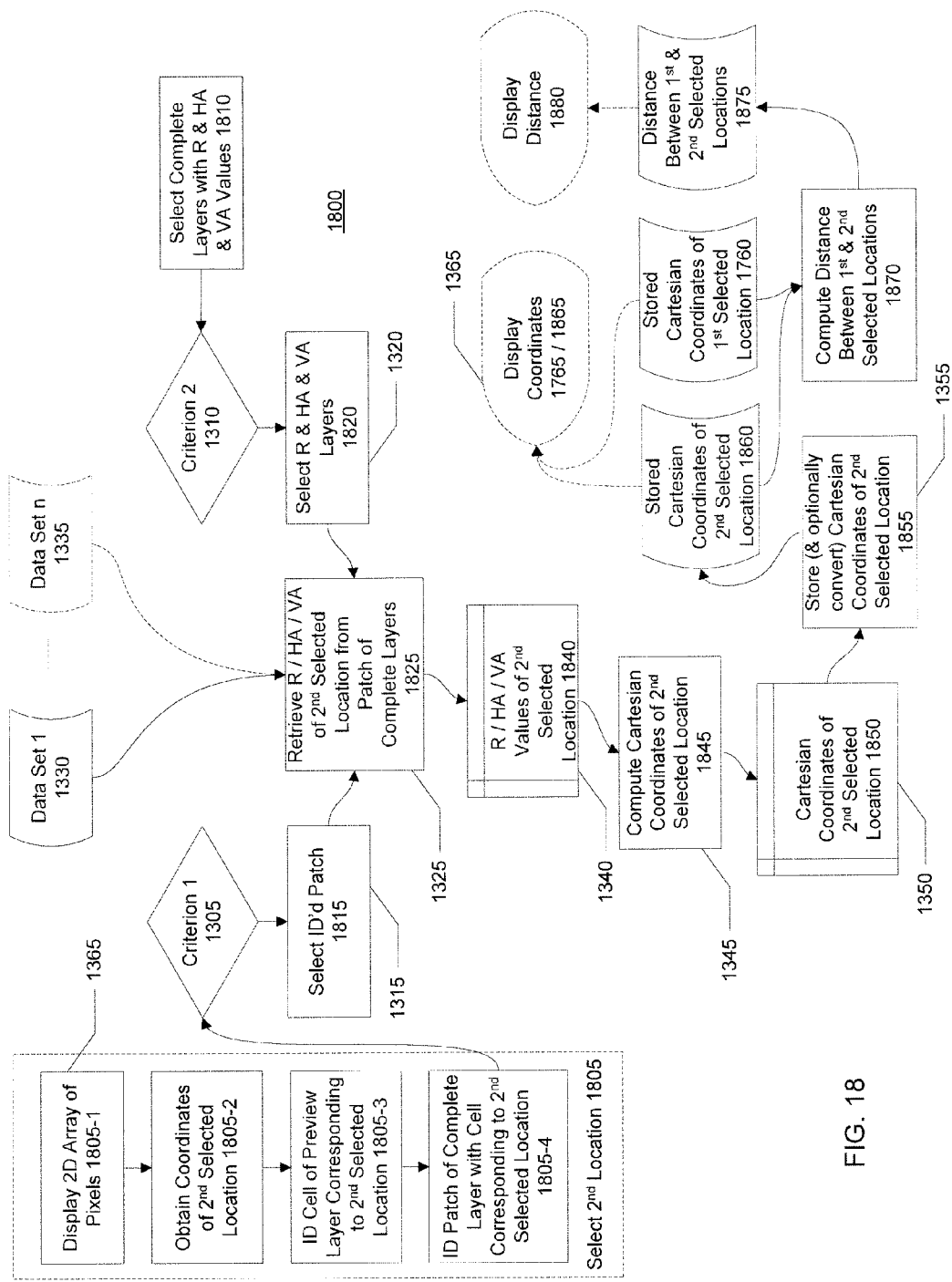
FIG. 18 shows a process for determining distance between two three-dimensional points in accordance with some embodiments of the invention.

FIG. 18 shows at 1800 a process for determining distance between two three-dimensional points in accordance with some embodiments of the invention. Common reference numerals indicate correspondence of elements of process 1800 with the generic process 1300 of FIG. 13.

At step 1805 a second location is selected. To do this, a two-dimensional array of pixels is displayed at step 1805-1 such as by performing the process of FIG. 15. The two-dimensional coordinates in the display of a second point selected by a user, similar to point 1610, are obtained at step 1805-2. The cell (of the preview layer used to prepare the display) which corresponds to the second location is identified at step 1805-3. The patch containing the identified cell is identified at step 1805-4. The identity of this patch is taken as the at least one first criterion 1305.

Because the three-dimensional coordinates of the selected point are to be determined, the layers with cells containing range (R), horizontal angle (HA) and vertical angle (VA) data define the at least one second criterion 1310. The patch selected at 1815 is thus the patch with the cell corresponding to the second point, and the layers selected at 1820 are those having the data needed to determine position of the second point in a three-dimensional coordinate system.

At step 1825 the values contained in the cell corresponding to the second point are retrieved from the respective layers as R, HA and VA values 1840. At step 1845 the R, HA and VA values defining three-dimensional position of the second point are used to compute Cartesian coordinates 1850 of the second point. Step 1855 stores the Cartesian coordinates at 1860 for optional display at 1865. Data 1860 may be stored in the form of one or more derived layers, such as layers 930 . . . 945 of FIG. 9.

At step 1870 the stored Cartesian coordinates 1760 of the first point (e.g., determined from the process of FIG. 17) and the stored Cartesian coordinates 1860 of the second point are used to compute Euclidian distance 1875 between the first point and the second point. The computed distance is stored and/or optionally displayed at 1880.

Computing Angles Between Picked Points

Figure 19:
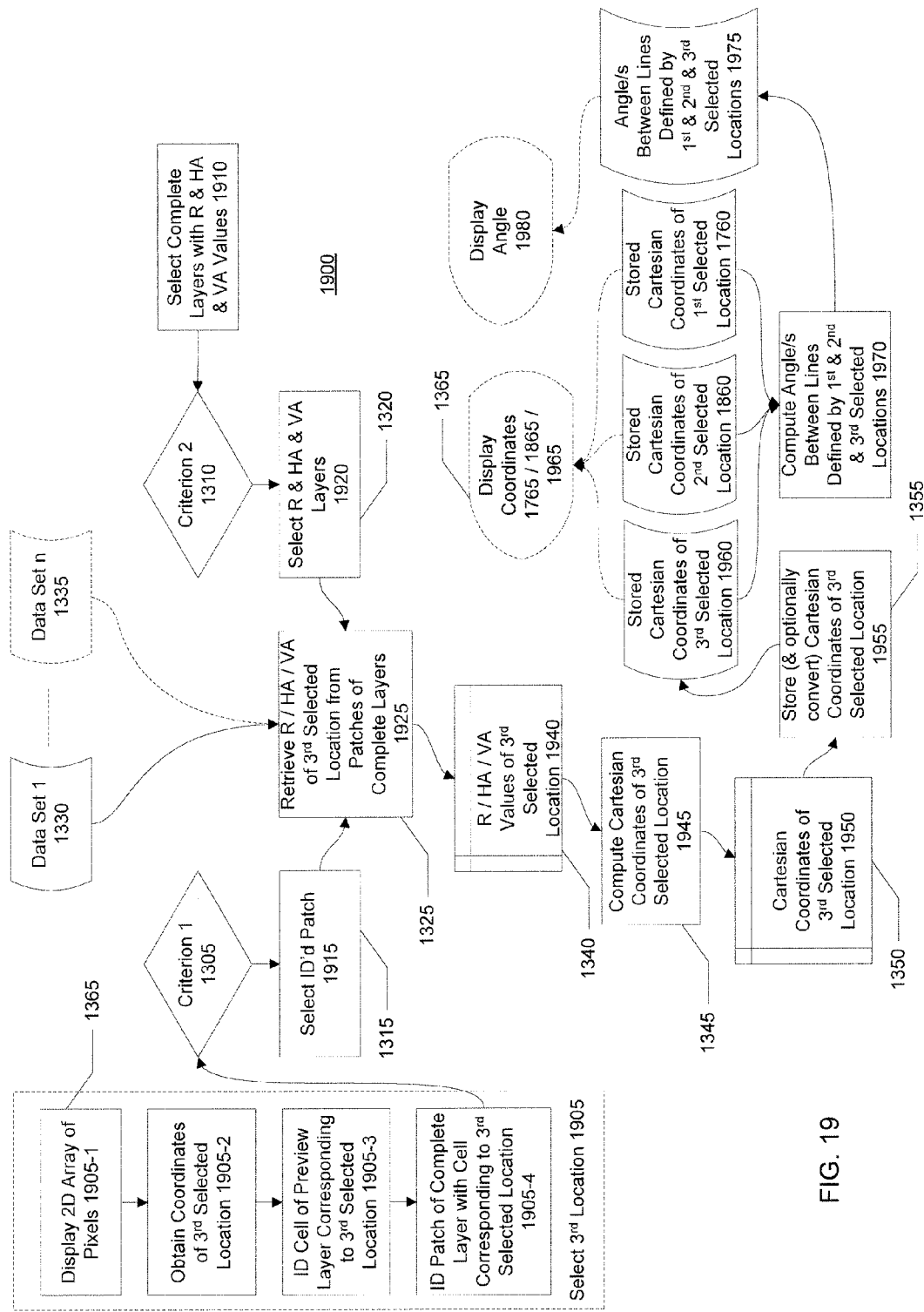
FIG. 19 shows a process for determining an angle between lines defined by three three-dimensional points in accordance with some embodiments of the invention.

FIG. 19 shows a process for determining an angle between lines defined by three three-dimensional points in accordance with some embodiments of the invention. Common reference numerals indicate correspondence of elements of process 1900 with the generic process 1300 of FIG. 13.

At step 1905 a third location is selected. To do this, a two-dimensional array of pixels is displayed at step 1905-1 such as by performing the process of FIG. 15. The two-dimensional coordinates in the display of a third point selected by a user, similar to point 1610, are obtained at step 1905-2. The cell (of the preview layer used to prepare the display) corresponding to the third location is identified at step 1905-3. The patch containing the identified cell is identified at step 1905-4. The identity of this patch is taken as the at least one first criterion 1305.

Because the three-dimensional coordinates of the selected point are to be determined, the layers with cells containing range (R), horizontal angle (HA) and vertical angle (VA) data define the at least one second criterion 1310. The patch selected at 1915 is thus the patch with the cell the third point, and the layers selected at 1920 are those having the data needed to determine position of the third point in a three-dimensional coordinate system.

At step 1925 the values contained in the cell corresponding to the third point are retrieved from the respective layers as R, HA and VA values 1940. At step 1945 the R, HA and VA values defining three-dimensional position of the third point are used to compute Cartesian coordinates 1950 of the third point. Step 1955 stores the Cartesian coordinates at 1960 for optional display at 1965. Data 1960 may be stored in the form of one or more derived layers, such as layers 930 . . . 945 of FIG. 9.

At step 1970 the stored Cartesian coordinates 1760 of the first point (e.g., determined from the process of FIG. 17) and the stored Cartesian coordinates 1860 of the second point (e.g., determined from the process of FIG. 18) and the stored Cartesian coordinates of the third point are used to compute at least one angle between lines defined by the first point, the second point and the third point. At least one computed angle is stored and/or optionally displayed at 1980.

Selecting Points within an Outlined Region

Figure 20:
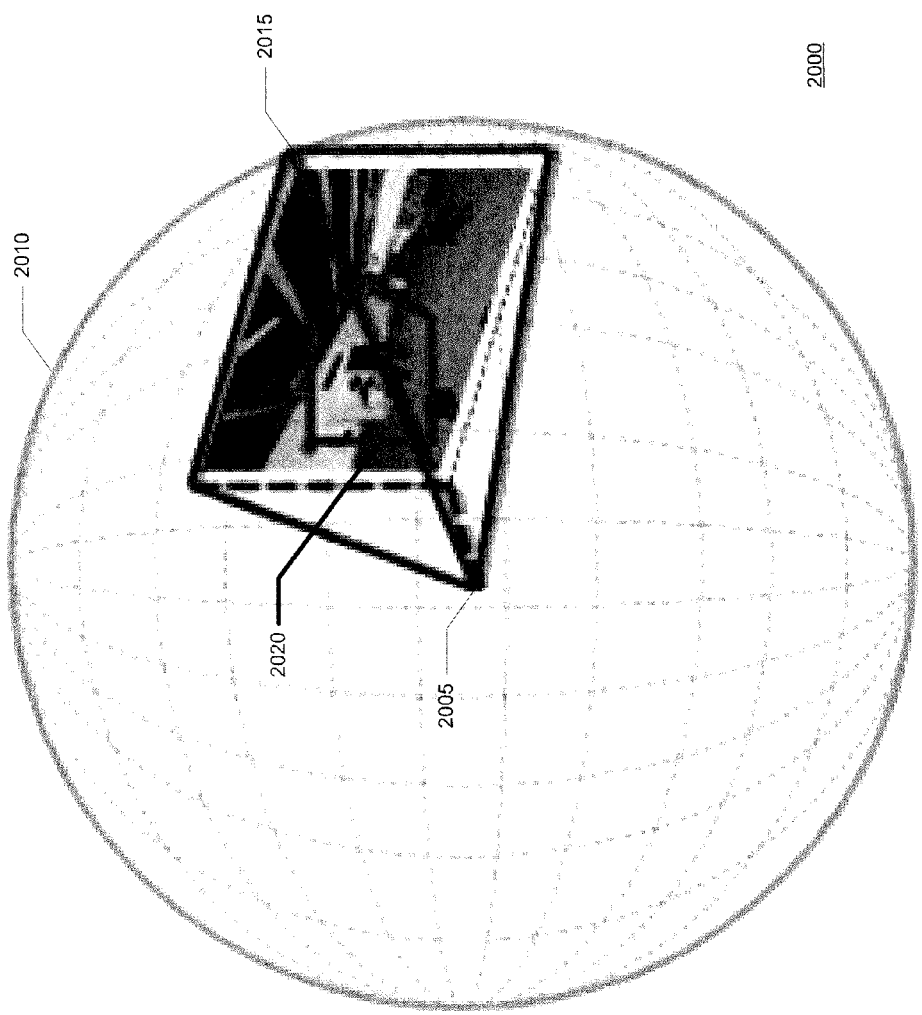
FIG. 20 shows an example of defining a polygon in a two-dimensional view projection of three-dimensional points in accordance with some embodiments of the invention.

FIG. 20 shows at 2000 an example of defining a polygon in a two-dimensional view projection of three-dimensional points, in accordance with some embodiments of the invention. The point data are in polar coordinates, each point defined by values representing a horizontal angle (HA), a vertical angle (VA), a range (R), and intensity (I). The notional polar coordinate system is represented by an origin 2005 and a sphere 2010 having latitude and longitude indicators. A two-dimensional image 2015 of such data is presented on a flat-screen display, with the three-dimensional points projected to a two-dimensional surface for visualization by a user. Intensities of the displayed pixels are determined from the intensity values of the point measurement data. A user who is viewing image 2015 operates an input device, such as a mouse or keyboard or other control element moving a cursor on the display, to select points on the display representing vertices of a polygon 2020 enclosing three-dimensional points in space of interest to the user.

Figure 21:
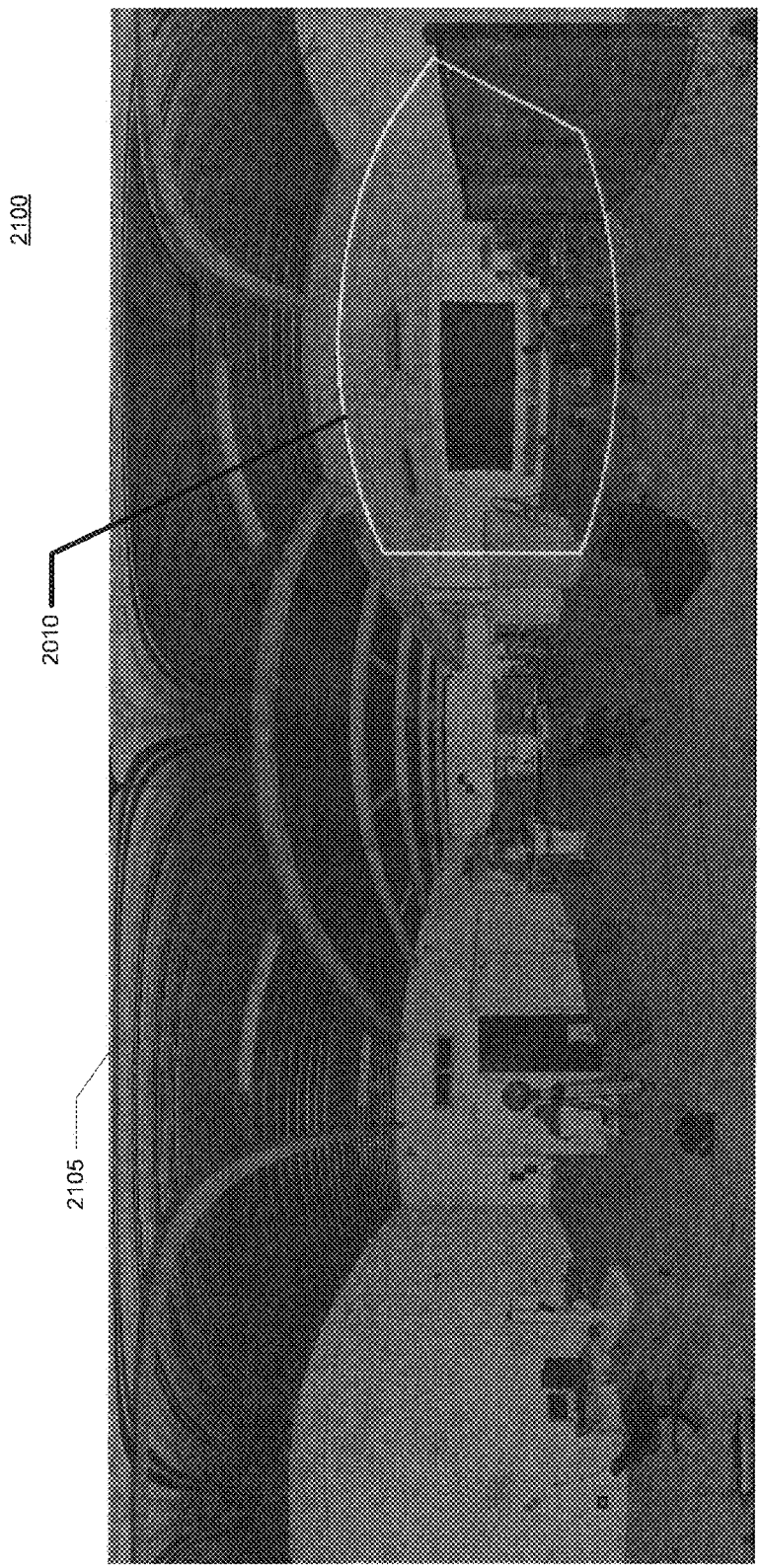
FIG. 21 shows a two-dimensional display of the scene of FIG. 20 from a different station.

FIG. 21 shows at 2100 a two-dimensional display 2105 of the scene of FIG. 20 from a different station. The polygon 2020 of FIG. 20 is represented at 2120 in FIG. 21 with its shape distorted due to the different station view.

Figure 22:
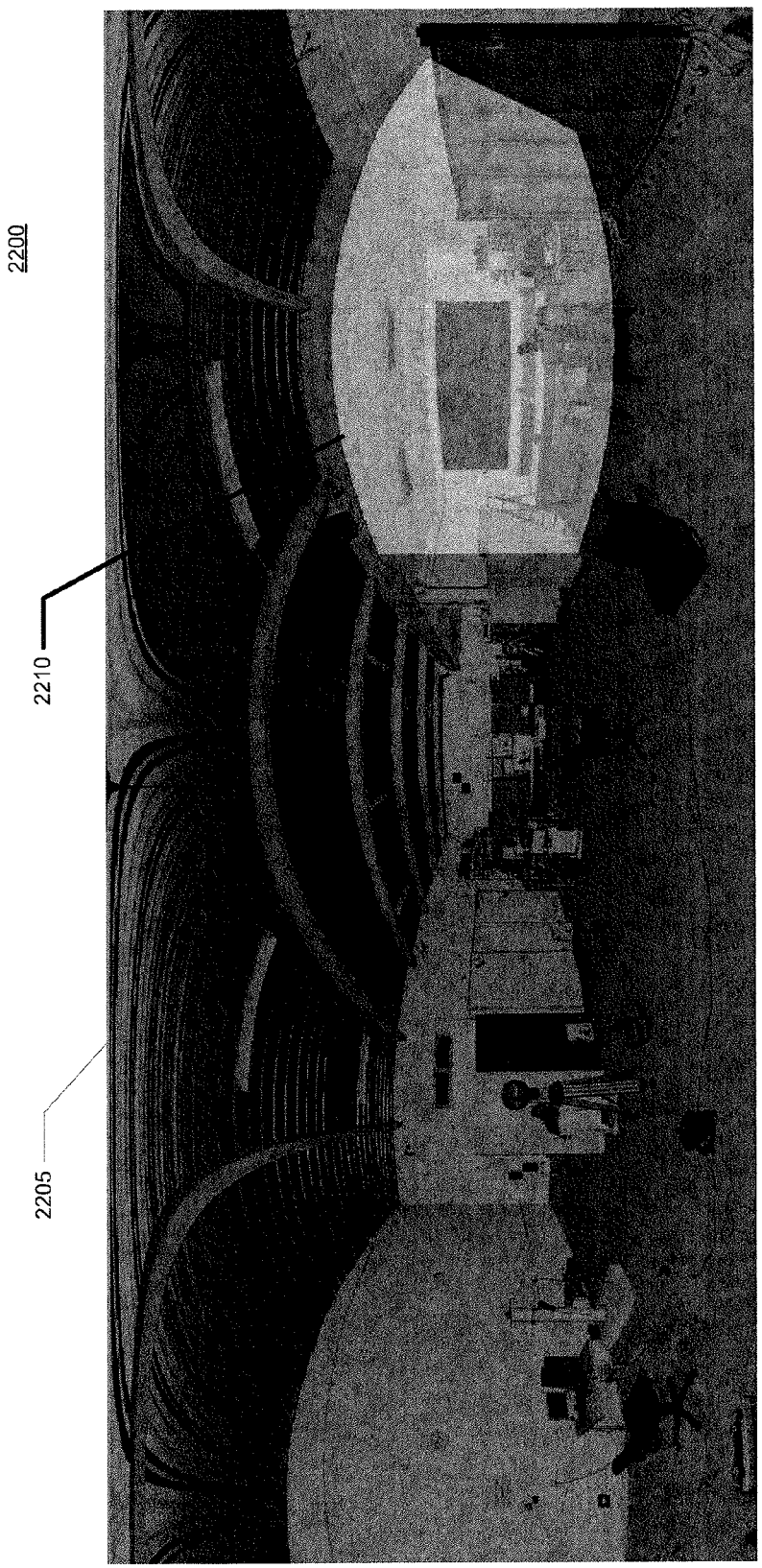
FIG. 22 shows the polygon area in a two-dimensional display of the view projection of FIG. 20.

FIG. 22 shows at 2200 a two-dimensional display 2205 from the same station as that of FIG. 20, with the region bounded by polygon 2020 of FIG. 20 highlighted at 2210.

Figure 23:
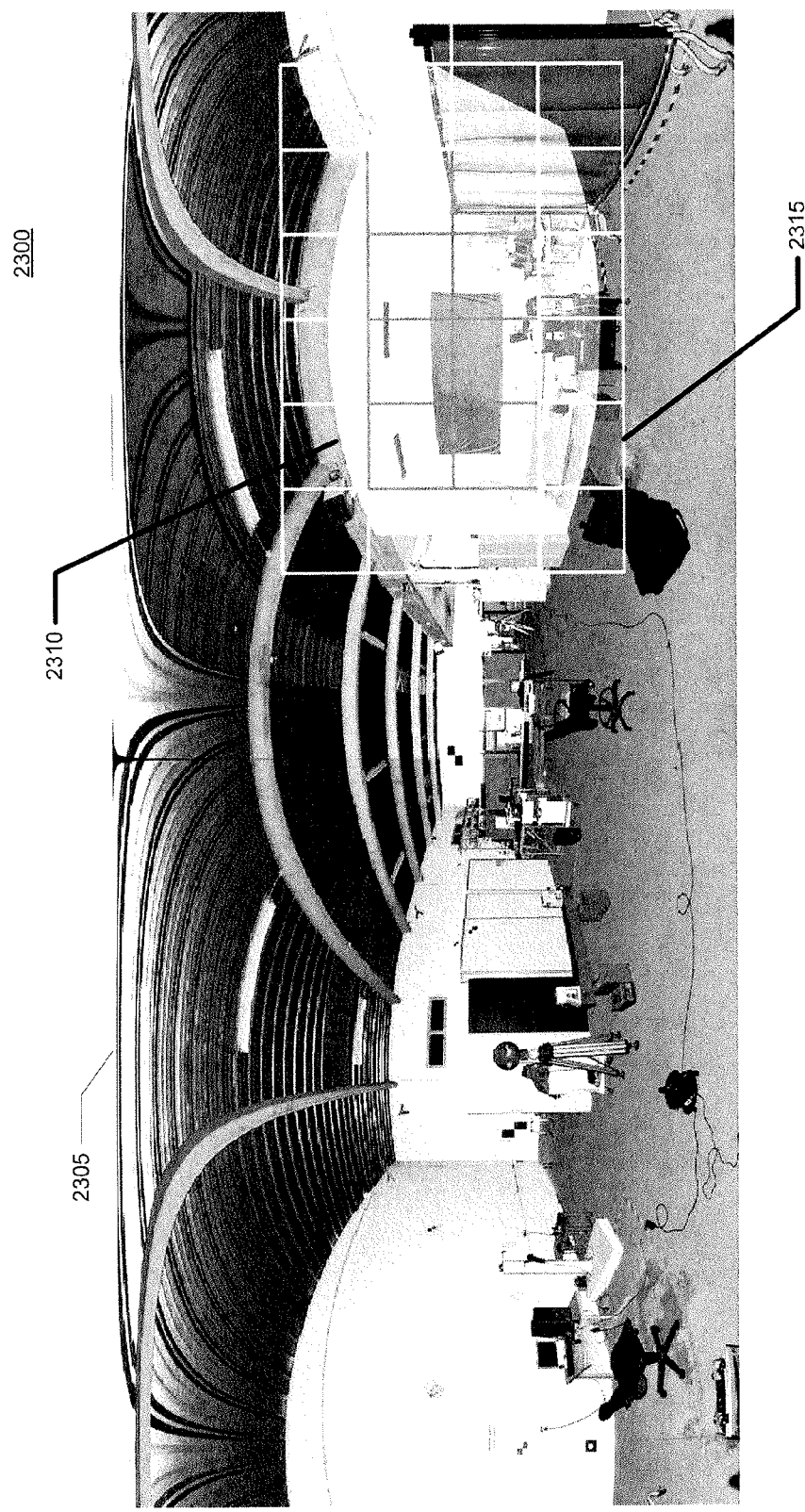
FIG. 23 shows the patches containing the polygon area in a two-dimensional display of the view projection of FIG. 20.

FIG. 23 shows at 2300 a two-dimensional display 2305 from the same station as those of FIG. 20 and FIG. 21, with the region bounded by polygon 2020 of FIG. 20 highlighted at 2310, and with an overlay of rectangles indicating the patches of a data set having cells with point data for the bounded region.

Figure 24:
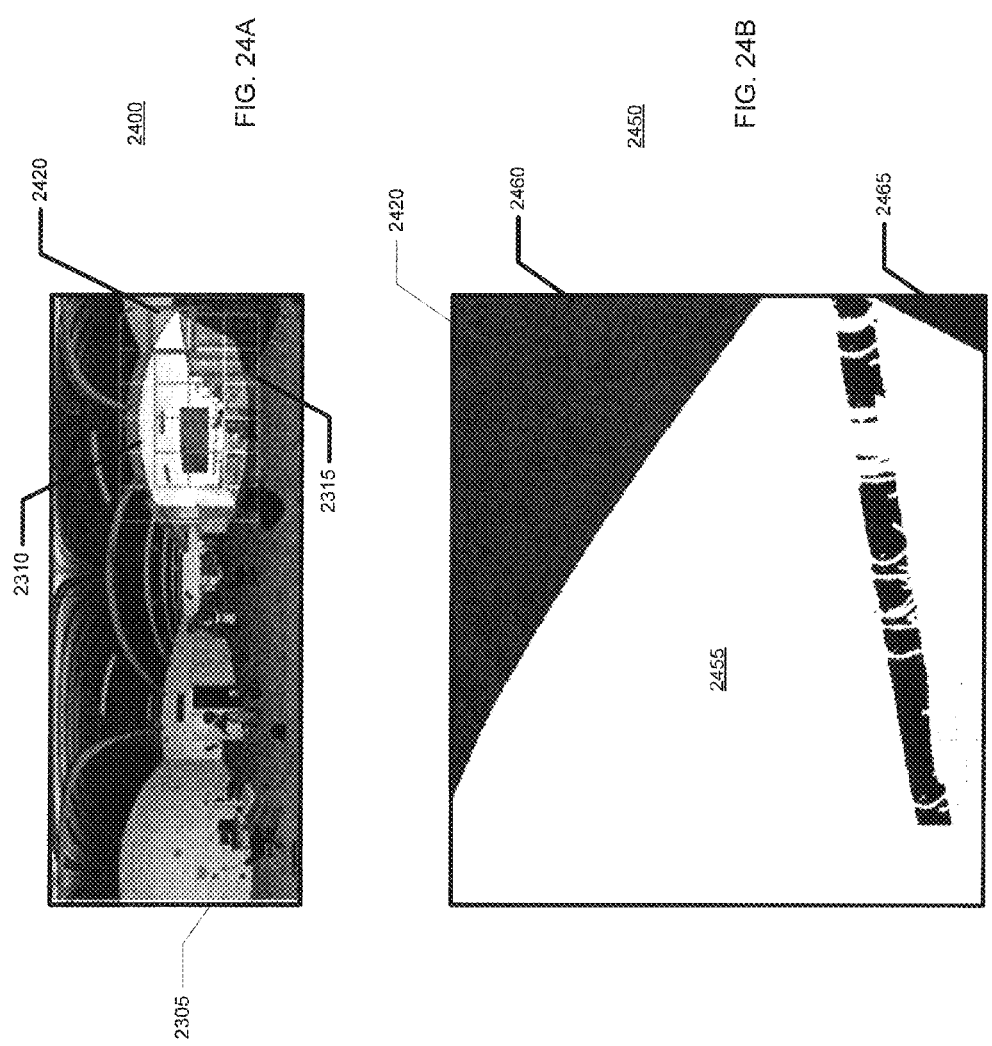
FIG. 24A shows the image of FIG. 23, with indication of a patch at the upper right corner of the polygon region.
FIG. 24B shows an enlarged view of a patch of FIG. 24A.

FIG. 24A shows at 2400 the image of FIG. 23, with a patch at the upper right corner of the highlighted polygon region 2310 indicated at 2420.

FIG. 24B shows at 2450 an enlarged view of patch 2420 of FIG. 24A. The region of patch 2420 within the polygon region 2310 is shown at 2455. The regions of patch 2420 outside the polygon region 2310 are shown at 2460 and 2465.

Figure 25:
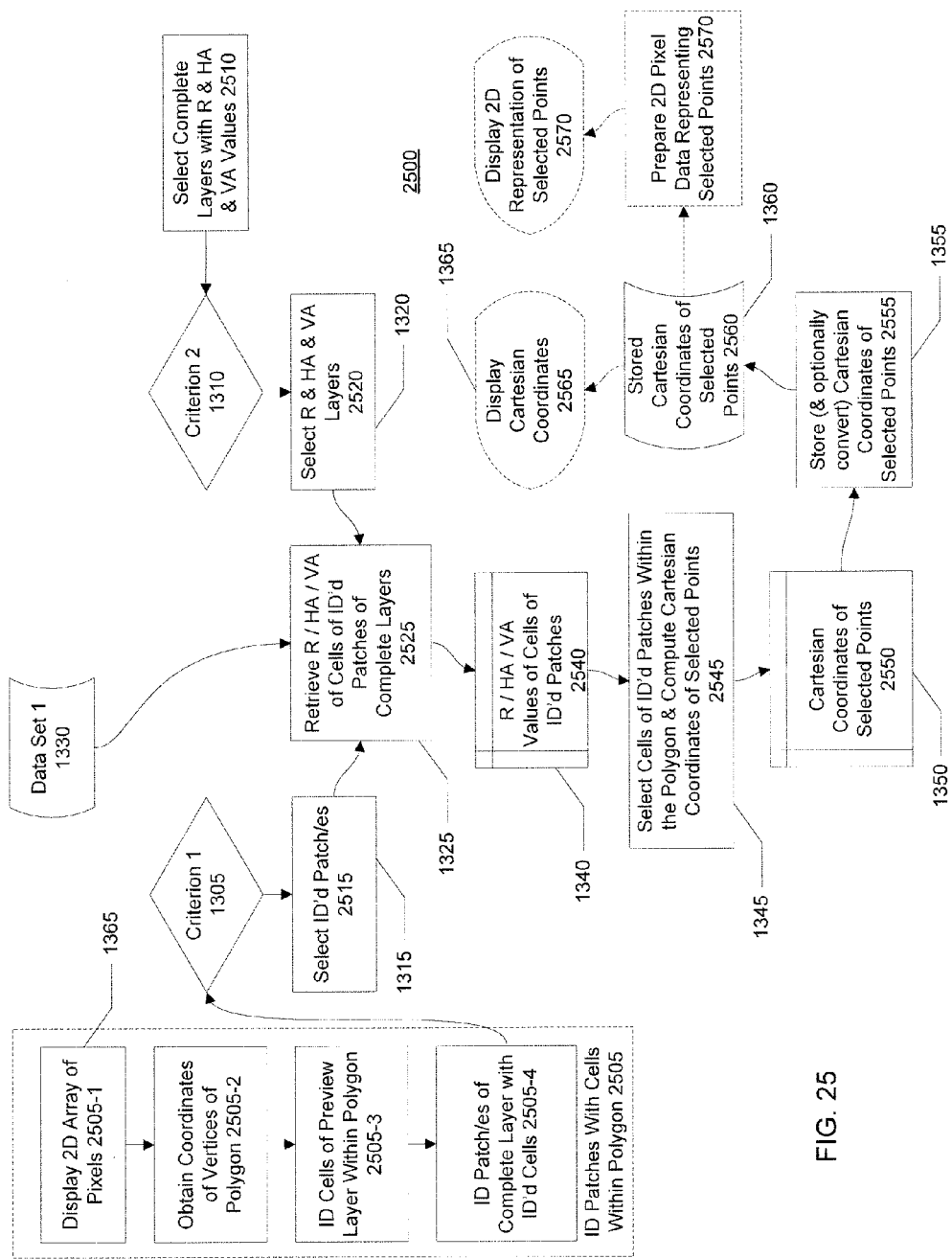
FIG. 25 shows a process for retrieving from a data set the coordinates of three-dimensional points contained within a polygon in accordance with some embodiments of the invention.

FIG. 25 shows at 2500 a process for retrieving from a data set the coordinates of three-dimensional points contained within a polygon in accordance with some embodiments of the invention. Common reference numerals indicate correspondence of elements of process 2500 with the generic process 1300 of FIG. 13.

At step 2505 the patches with cells corresponding to the region within a polygon are identified. To do this, a two-dimensional array of pixels is displayed at step 2505-1 such as by performing the process of FIG. 15. The two-dimensional coordinates in the display of vertices of a polygon drawn by a user, such as polygon 2020, are obtained at step 2505-2. The cells (of the preview layer used to prepare the display) corresponding to points within the polygon region are identified at step 2505-3. The patches of the full data set containing the identified cells are identified at step 2505-4, e.g., the patches indicated at 2315. The identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 2515 are thus the patches with the cells corresponding to points within the polygon, and the layers selected at 2520 are those having the data needed to determine position of these points in a three-dimensional coordinate system.

At step 2525 the values contained in the cells corresponding to points within the user-defined polygon are retrieved from the respective layers as R, HA and VA values 2540. At step 2545 the R, HA and VA values defining three-dimensional positions of the points within the polygon are used to compute Cartesian coordinates 2550 of these points. Step 2555 stores the Cartesian coordinates at 2560 for use in other processes and/or optional display at 2565. Optional step 2570 prepares two-dimensional pixel data representing the points for storage and/or optional display at 2575. Data 2560 may be stored in the form of one or more derived layers, such as layers 930 . . . 945 of FIG. 9.

Figure 26:
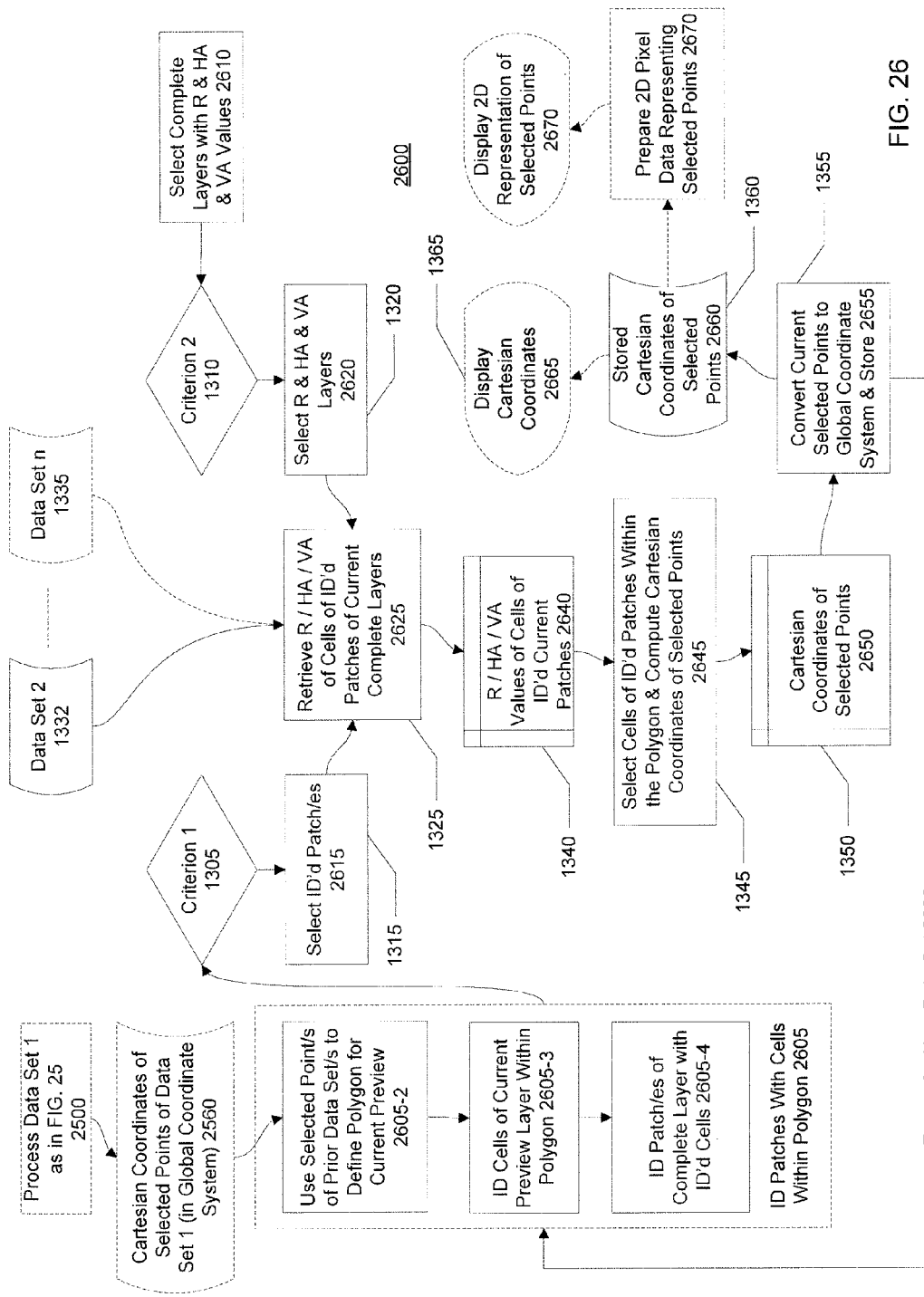
FIG. 26 shows a process for retrieving from multiple data sets the coordinates of three-dimensional points contained within a polygon in accordance with some embodiments of the invention.

Described above with reference to FIG. 25 is a process 2500 for obtaining from a first data set 1330 the Cartesian coordinates 2560 of three-dimensional points contained within a region around a selected point. FIG. 26 shows at 2600 a process for retrieving from one or more further data sets 1332 . . . 1335 the coordinates of three-dimensional points contained within a polygon in accordance with some embodiments of the invention. Common reference numerals indicate correspondence of elements of process 2600 with process 2500 and with the generic process 1300 of FIG. 13.

Referring to the example of FIG. 26, the Cartesian coordinates of points 2560 are used as input for process 2600. At step 2605, the three-dimensional location of at least one of these points is used to define a region of the preview layer of a current data set, e.g., data set 1332.

To do this, a convex hull of locations of selected points of the prior data set is used to define a polygon for the current preview At step 2605-3, the cells of the preview layer of the current data set within the defined region are identified. The patches of the full data set containing the identified cells are identified at step 2605-4. The identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 2615 are thus the patches with cells corresponding to points within the polygon, and the layers selected at 2620 are those having the data needed to determine position of these points in a three-dimensional coordinate system.

At step 2625 the values contained in the cells corresponding to points within the polygon are retrieved from the respective layers as R, HA and VA values 2640. At step 2645 the R, HA and VA values defining three-dimensional positions of the points within the polygon are used to compute Cartesian coordinates 2650 of these points. Step 2655 stores the Cartesian coordinates at 2660 for use in further iterations of process 2600, in other processes and/or for optional display at 2665. Optional step 2670 prepares two-dimensional pixel data representing the points for storage and/or optional display at 2675. Data 2660 may be stored in the form of one or more derived layers, such as layers 930 . . . 945 of FIG. 9.

Process 2600 returns as shown by arrow 2665 to process a subsequent data set, such as data set 1335. The input for this iteration may be determined from the Cartesian coordinates 2560 of process 2500 or from the Cartesian coordinates 2660 of a prior iteration of process 2600. Each iteration of process 2600 retrieves the coordinates of additional points to densify a point cloud in a region of interest.

Pick a Point to Select a Feature ("Magic Wand")

Figure 27B:
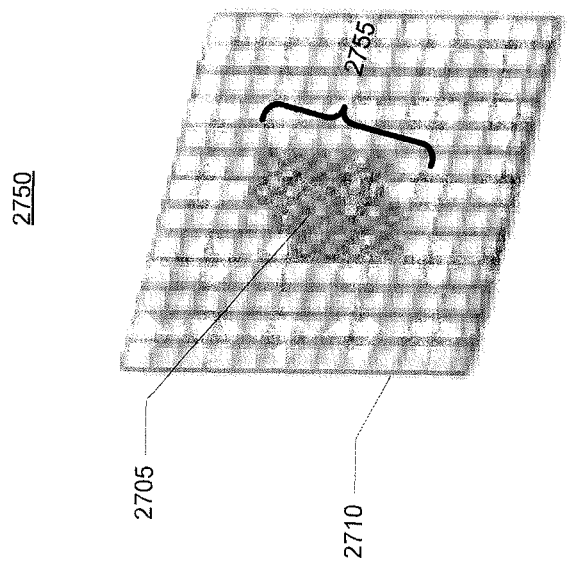
FIG. 27B shows a region of cells around the selected cell of FIG. 27A with point data satisfying at least one criterion in accordance with some embodiments of the invention.
Figure 27A:
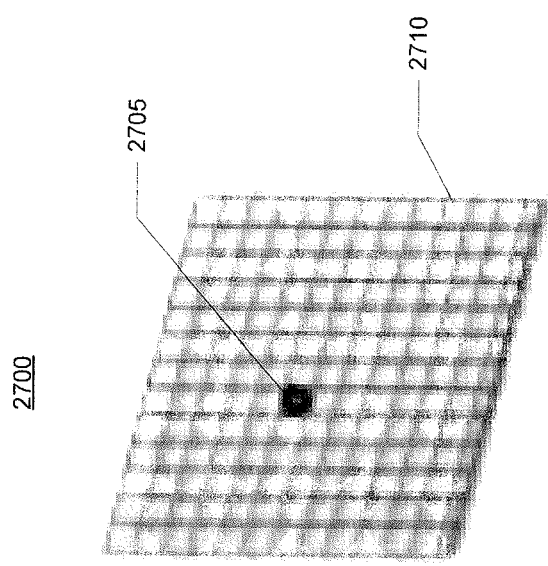
FIG. 27A shows a selected cell of a patch in accordance with some embodiments of the invention.

FIG. 27A shows at 2700 a selected cell 2705 of a patch 2710 in accordance with some embodiments of the invention.

FIG. 27B shows at 2750 a region of cells 2755 around the selected cell 2705 of FIG. 27A. The cells of region 2755 contain point data satisfying at least one criterion in accordance with some embodiments of the invention.

FIG. 28A shows at 2800 an example of picking a point 2805 in a two-dimensional display 2810 representing three-dimensional points in accordance with some embodiments of the invention. The notional polar coordinate system is represented by an origin 2815 and a sphere 2820 having latitude and longitude indicators. A user viewing display 2810 operates an input device, such as a mouse or keyboard or other control element moving a cursor, to select a point 2805 on the image representing a three-dimensional point in space on a feature of interest to the user. In this example, the feature is a planar wall area of a room.

FIG. 28B shows at 2850 a representation of the selected point 2805 in a two-dimensional display from a different station than that of FIG. 28A.

Figure 29:
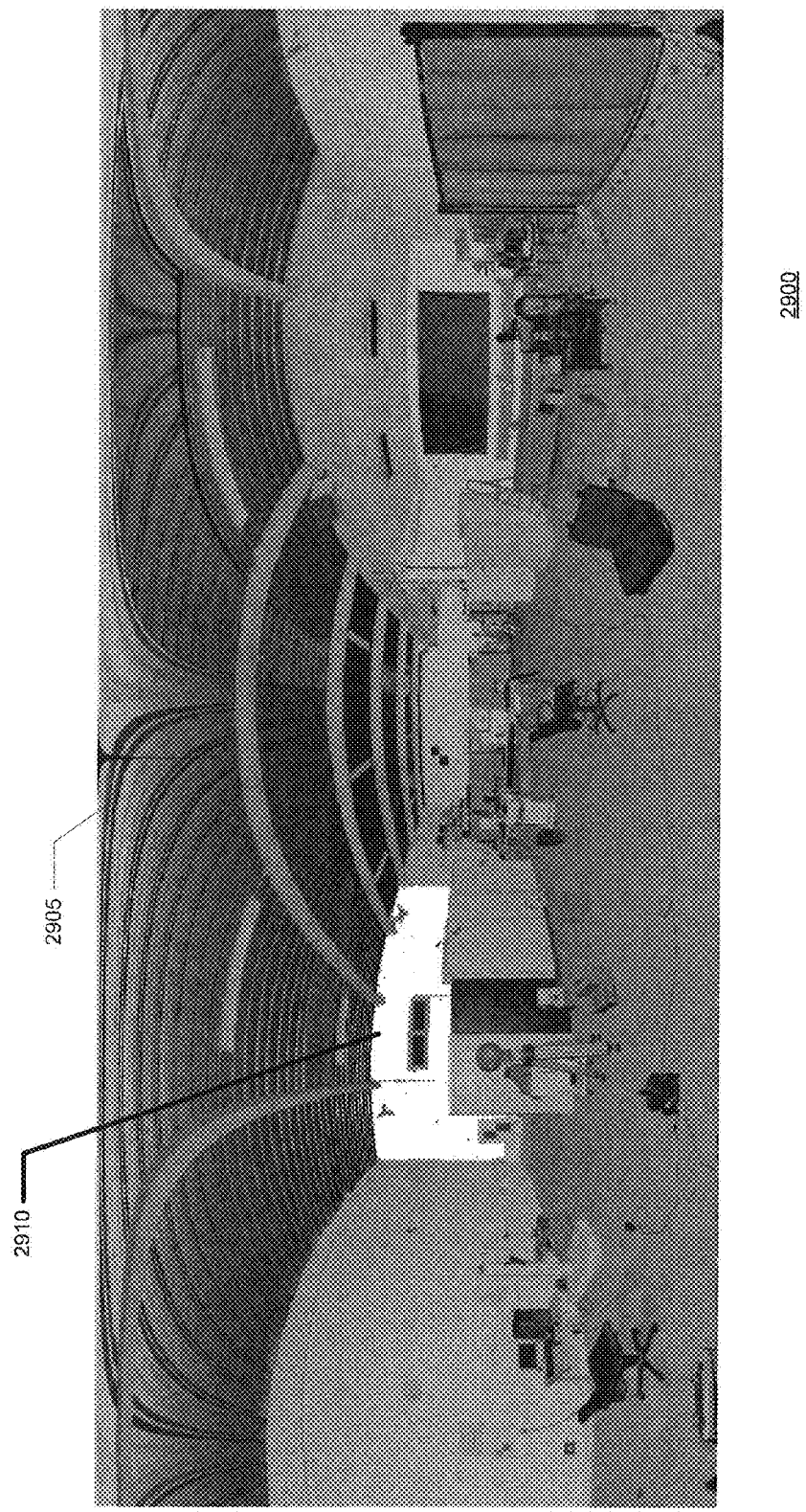
FIG. 29 shows a region of points around the selected point of FIG. 28A and FIG. 28B satisfying at least one criterion in accordance with some embodiments of the invention.

FIG. 29 shows at 2900 a two-dimensional display indicating a region 2910 of points around the selected point of FIG. 28A and FIG. 28B satisfying at least one criterion in accordance with some embodiments of the invention. In this example, the at least one criterion is defined by normal values of the points and/or by intensity boundaries. That is, the points are identified as having characteristics in common with the selected point. For example, normal values of the points within a defined range are associated with a planar surface, and/or intensity values of the points within a defined range are associated with an object.

Figure 30:
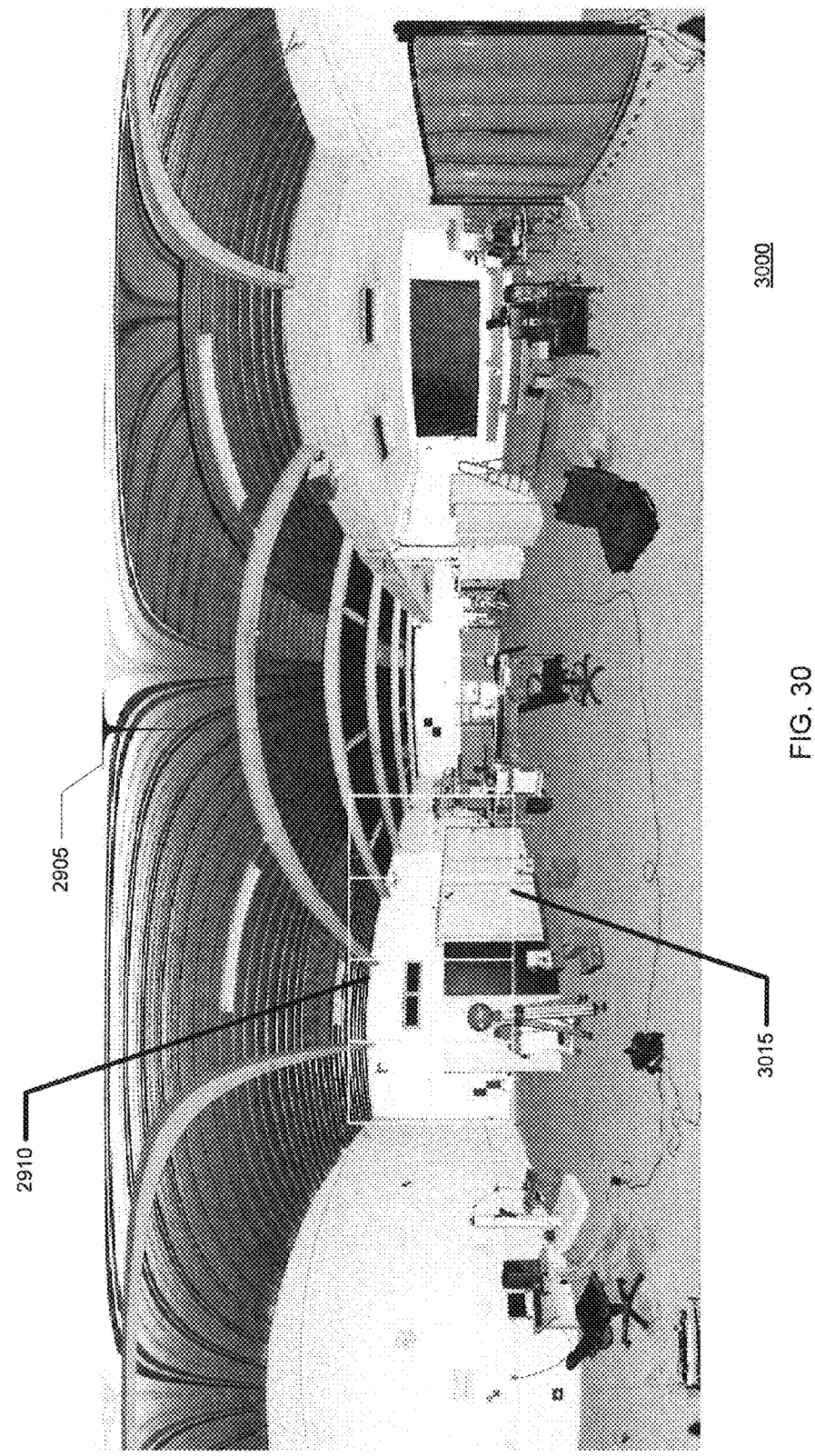
FIG. 30 shows a two-dimensional display with a group of rectangles representing patches containing the points of the region of FIG. 29.

FIG. 30 shows at 3000 a two-dimensional display with a group of rectangles 3015 representing the patches containing the points of region 2910.

Figure 31:
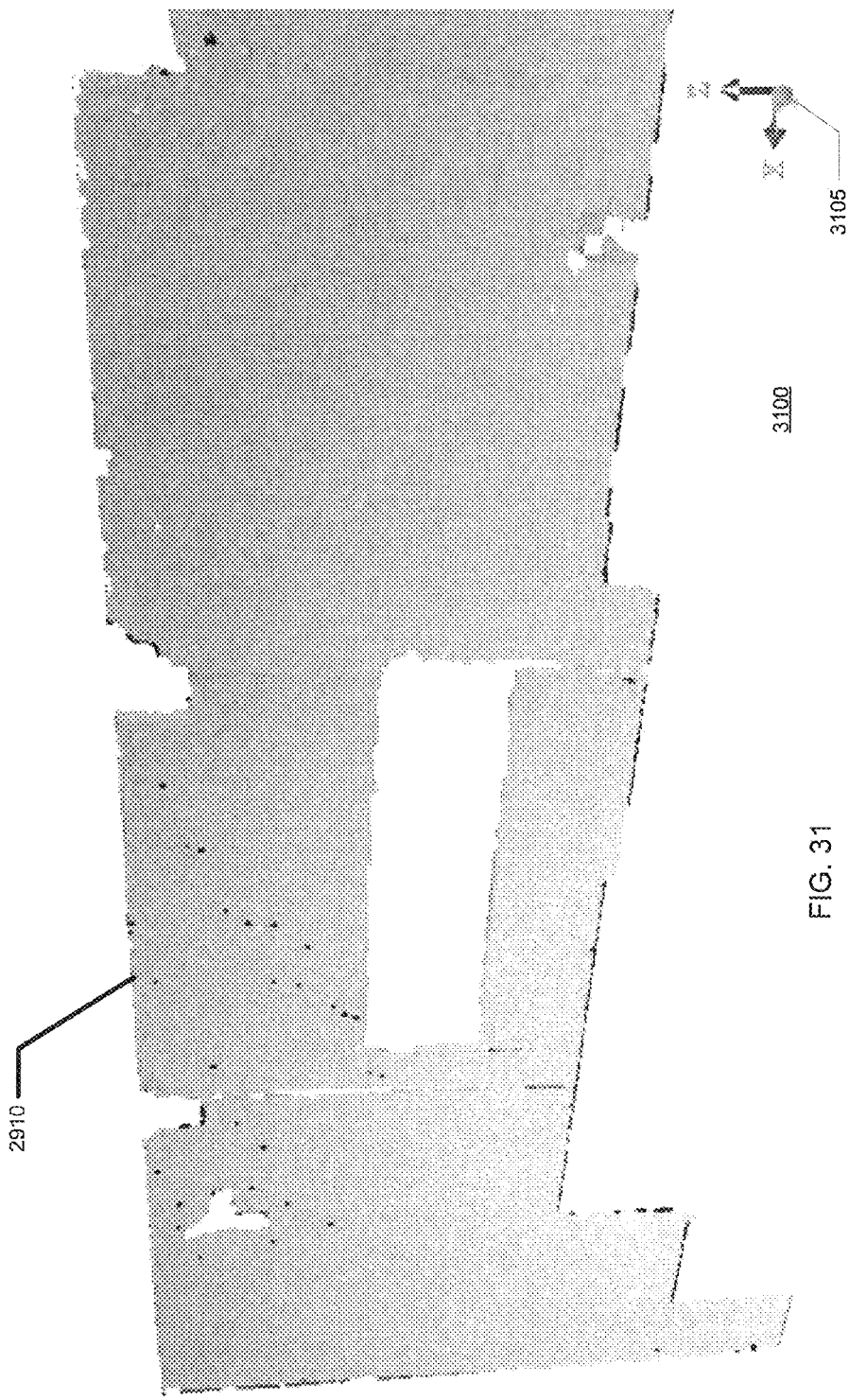
FIG. 31 shows a representation in a Cartesian coordinate system of points corresponding to the region of FIG. 29.

FIG. 31 shows at 3100 a representation in a Cartesian coordinate system 3105 of points 3110 of region 2910.

Figure 32:
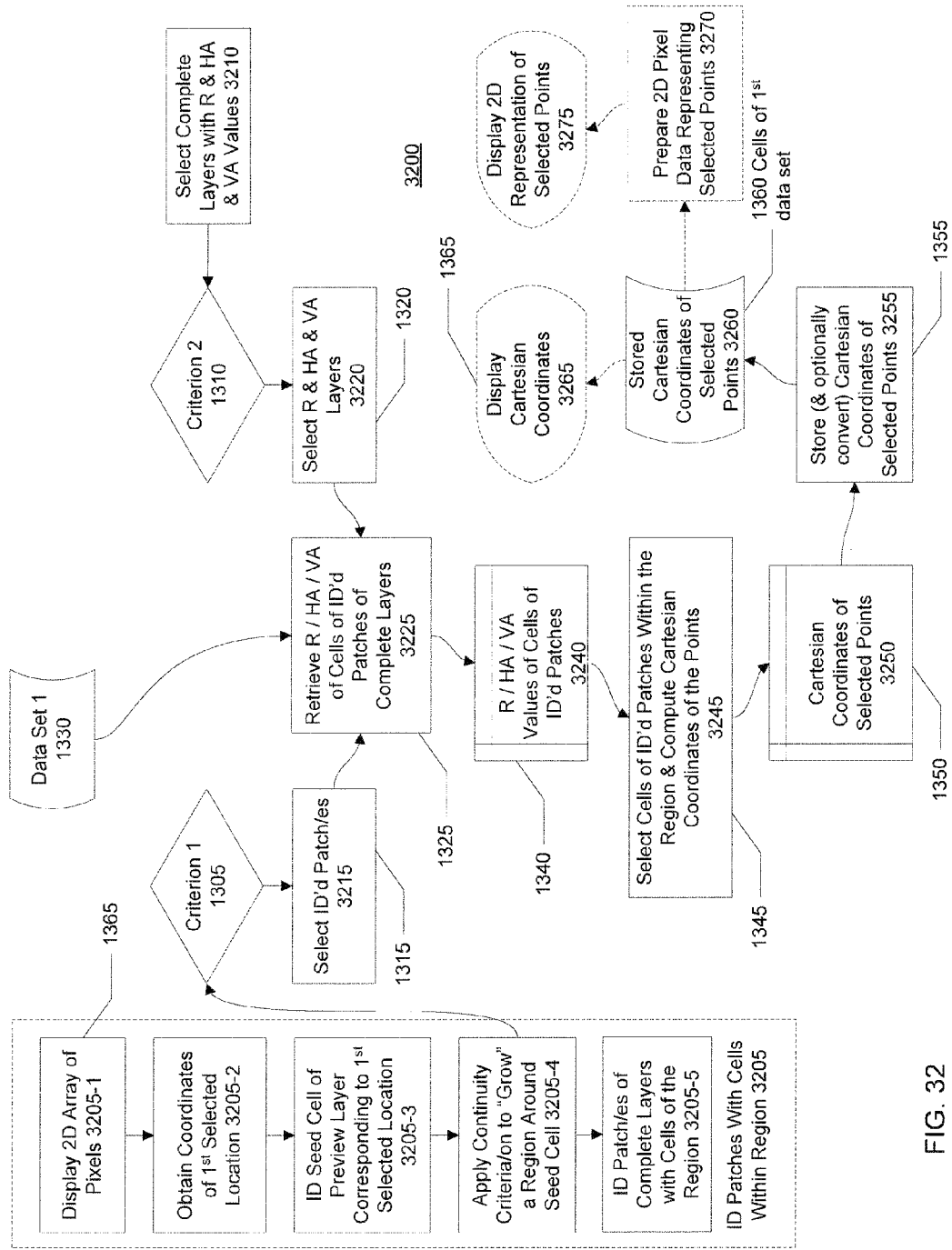
FIG. 32 shows a process for retrieving from a data set the coordinates of three-dimensional points contained within a region around a selected point in accordance with some embodiments of the invention.

FIG. 32 shows at 3200 a process for retrieving from a data set the coordinates of three-dimensional points contained within a region around a selected point in accordance with some embodiments of the invention. Common reference numerals indicate correspondence of elements of process 3200 with the generic process 1300 of FIG. 13.

At step 3205 the patches with cells having point data meeting at least one continuity criterion are identified. To do this, a two-dimensional array of pixels is displayed at step 3205-1, such as by performing the process of FIG. 15. The two-dimensional coordinates in the display of a first point selected by a user, such as point 2805, are obtained at step 3205-2. The cell (of the preview layer used to prepare the display) corresponding to the first location is identified at step 3205-3 as a "seed" cell. At step 3205-4, at least one continuity criterion is applied to "grow" a region around the "seed" cell.

That is, the cells surrounding the "seed" cell which have point data meeting the at least one continuity criterion are identified so as to define an associated group of cells around the "seed" cell in the preview layer. The at least one criterion can be the normal of the point (indicating association of a point with a planar surface or a cylindrical surface or other geometric shape) and/or intensity of the point (indicating association of a point with an object having albedo different from its surroundings) and/or any other characteristic or characteristics which allow the point to be associated with the point of the "seed" cell.

The patches of the full data set containing the identified cells are identified at step 3205-4, e.g., the patches indicated at 3015. The identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 3215 are thus the patches including the cells which contain data for points of the region grown around the "seed" cell, and the layers selected at 3220 are those having the data needed to determine position of these points in a three-dimensional coordinate system.

At step 3225 the values contained in the patches of cells including the region grown around the "seed" cell are retrieved from the respective layers as R, HA and VA values 3240. At step 3245 the R, HA and VA values defining three-dimensional positions of the points of the region grown around the "seed" cell are used to compute Cartesian coordinates 3250 of these points. At step 3255 the Cartesian coordinates are stored in at 3260 for use in other processes and/or optional display at 3265. Optional step 3270 prepares two-dimensional pixel data representing the points for storage and/or optional display at 3275. Data 3260 may be stored in the form of one or more derived layers, such as layers 930 . . . 945 of FIG. 9.

FIG. 33A shows at 3300 the view of FIG. 30 with one patch of the region indicated at 3320.

FIG. 33B shows at 3350 an enlarged view of patch 3310.

Figure 34:
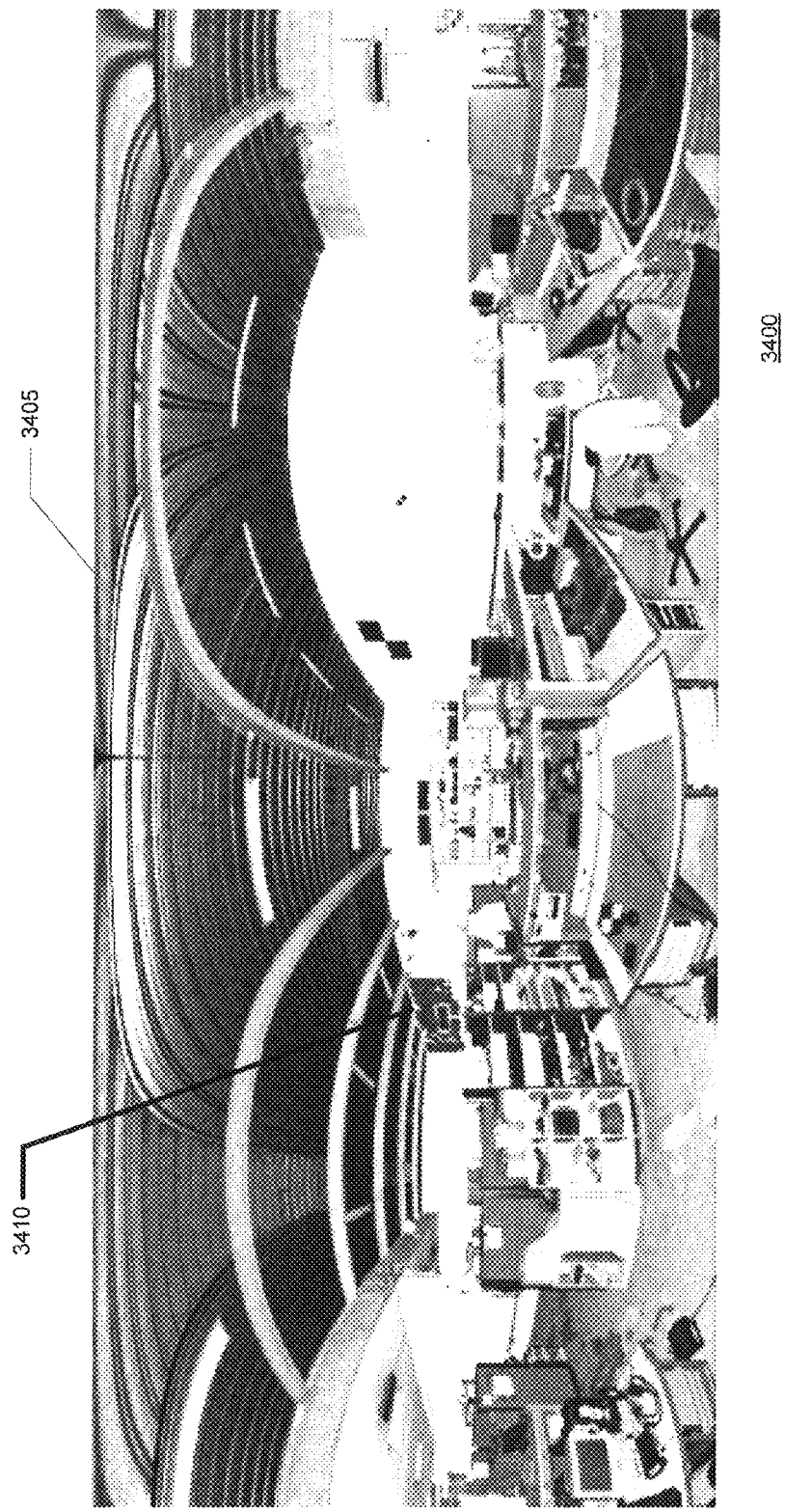
FIG. 34 shows a two-dimensional view from a second station overlapping the view of FIG. 29.

FIG. 34 shows at 3400 a two-dimensional view 3405 from a second station overlapping with the view of FIG. 29. Highlighted region 3410 contains points corresponding to points of region 2910. For multi-station scans, the second and subsequent stations are typically selected so that some parts of the environment scanned from one station are also scanned from other stations, and thus features (e.g., physical objects) with measured points in one scan data set will also have measured points in other data sets.

FIG. 35A shows an enlarged view of patch 3320 of FIG. 33A with a region highlighted at 3510. The rough-edged region 3510 illustrates the notion of a region grown around a "seed" cell using the preview layer.

FIG. 35B shows a refinement of the patch of FIG. 35A in which a refined version of region 3610 is highlighted at 3560. The smooth-edged region 3560 illustrates the notion of using data from the complete data set to refine a region which has initially been roughly determined using the preview layer. In this way the overall processing burden is greatly reduced, since the region is initially determined using a smaller data set (the preview layer is a subsampled version of the complete data set); subsequent refinement processing involves only those patches of the complete data set with cells having point data of the region of interest. This approach offers a great reduction of the resources and time needed to process large scan-data sets.

Figure 36:
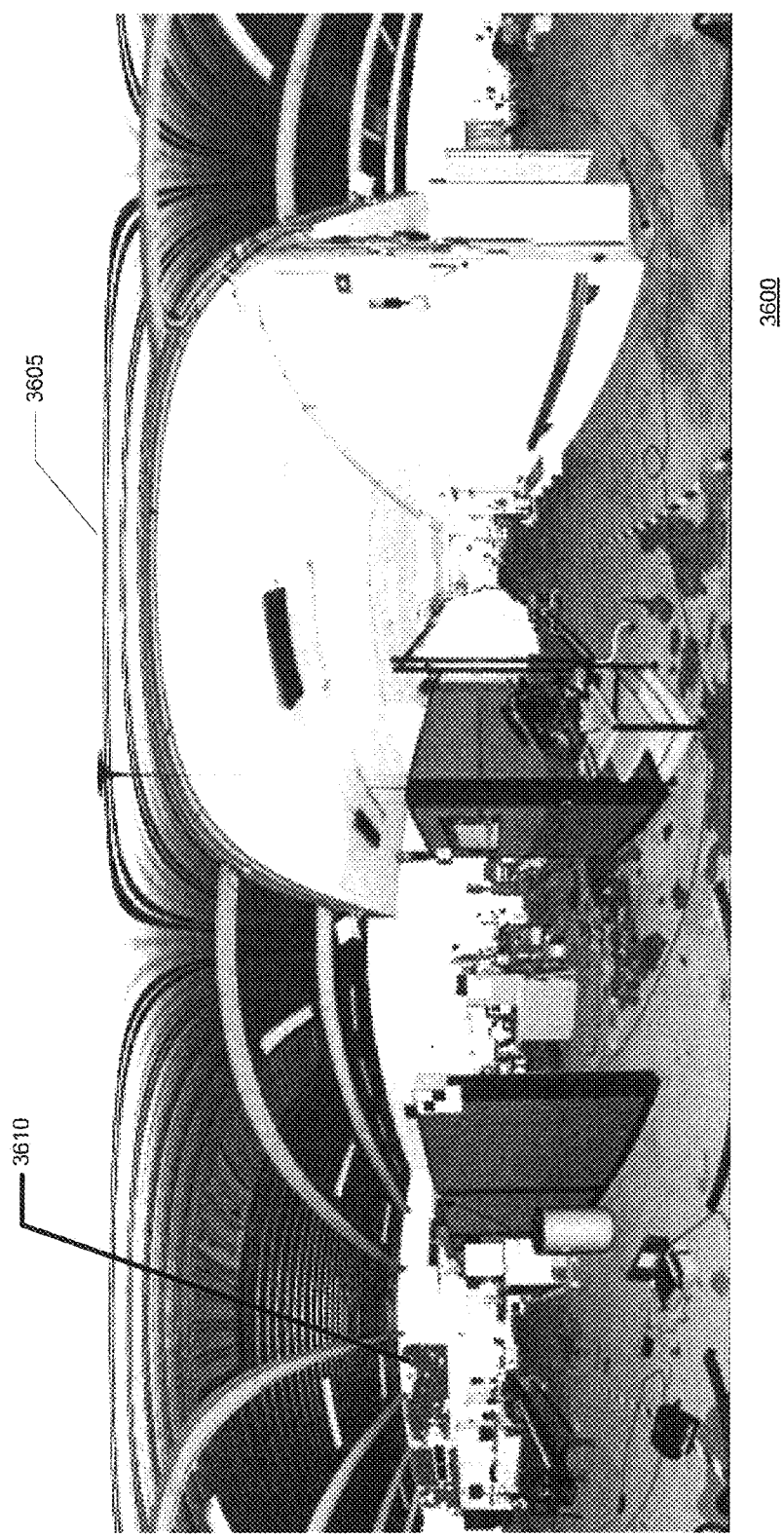
FIG. 36 shows a two-dimensional view from a third station of the region of FIG. 29.

FIG. 36 shows a two-dimensional view from a third station of the region of FIG. 29. Highlighted region 3610 contains points corresponding to points of region 2910 and region 3410.

Figure 37:
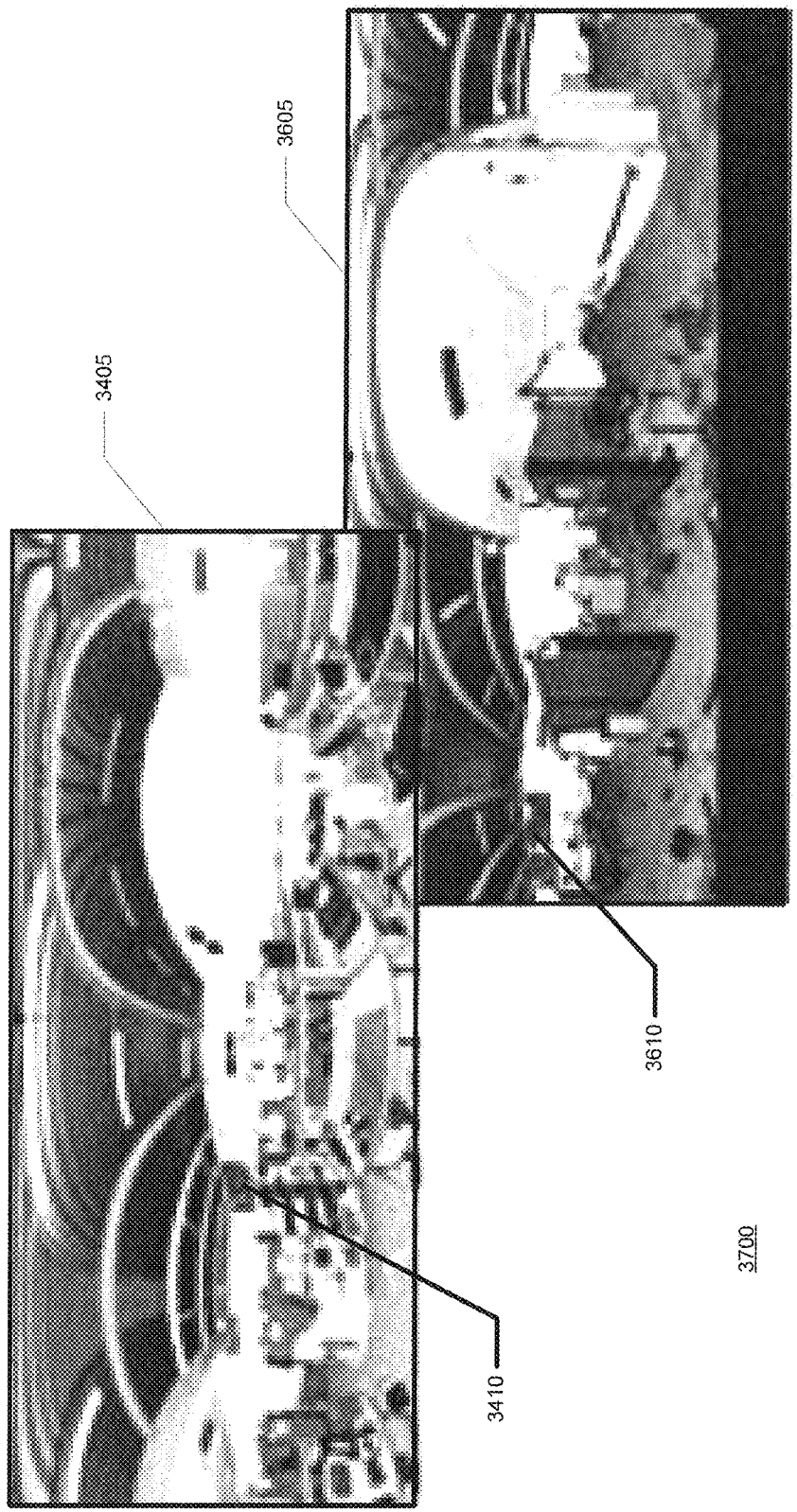
FIG. 37 shows the views of FIG. 34 and FIG. 36.

FIG. 37 juxtaposes the views 3405 and 3605 of FIG. 34 and FIG. 36, respectively. Highlighted regions 3410 and 3610 contain points representing the same feature as region 2910.

Figure 38:
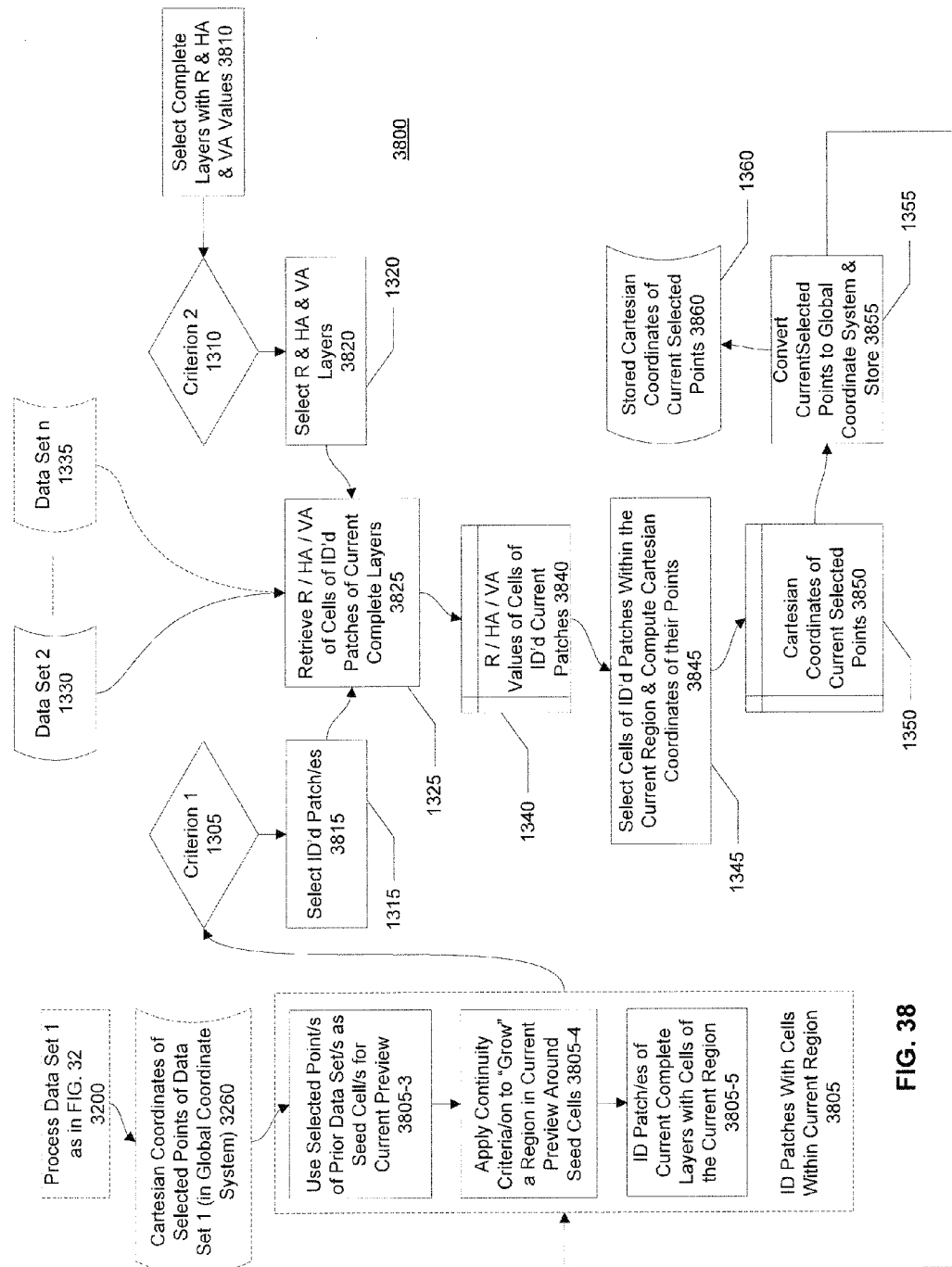
FIG. 38 shows a process for retrieving from multiple data sets the coordinates of three-dimensional points contained within a region around a selected point in accordance with some embodiments of the invention.

Described above with reference to FIG. 32 is a process 3200 for obtaining from a first data set 1330 the Cartesian coordinates 3260 of three-dimensional points contained within a region around a selected point. FIG. 38 shows at 3800 a process for retrieving from one or more further data sets 1332 . . . 1335 the coordinates of three-dimensional points contained within the region in accordance with some embodiments of the invention. Common reference numerals indicate correspondence of elements of process 3800 with process 3200 and with the generic process 1300 of FIG. 13.

Referring to the example of FIG. 38, the Cartesian coordinates of points 3260 are used as input for process 3800. At step 3805, the three-dimensional location of at least one of these points is matched with a respective cell of the preview layer of a current data set, e.g., data set 1332; each of the at least one matched cells is used as a "seed" cell to identify the patches of the current complete data set with cells having point data meeting at least one continuity criterion.

To do this, at least one cell (of the preview layer of the current data set) corresponding to the location of a selected point of the prior data set is identified at step 3805-3 as a "seed" cell. At step 3805-4, at least one continuity criterion is applied to "grow" a region around this "seed" cell.

That is, the cells surrounding the "seed" cell which have point data meeting the at least one continuity criterion are identified so as to define an associated group of cells around the "seed" cell. The at least one criterion can be the same as used in the process for the prior data set, for example.

The patches of the current complete data set containing the cells of the region are identified at step 3805-4, e.g., the patches containing cells with point data for region 3410. In a first iteration of process 3800, the identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 3815 are thus the patches of the current data set including the cells which contain data for points of the region grown around the at least one "seed" cell, and the layers selected at 3820 are those having the data needed to determine position of these points in a three-dimensional coordinate system.

At step 3825 the values contained in the patches of cells of the current data set including the region grown around the "seed" cell are retrieved from the respective layers as R, HA and VA values 3840. At step 3845 the R, HA and VA values defining three-dimensional positions of the points of the region grown around the "seed" cell are used to compute Cartesian coordinates 3850 of these points for the current data set. At step 3855 the Cartesian coordinates are stored at 3860 for use in a further iteration of process 3800, in other processes and/or optional display. Data 3860 may be stored in the form of one or more derived layers, such as layers 930 . . . 945 of FIG. 9.

Process 3800 returns as shown by arrow 3865 to process a subsequent data set, such as data set 1335. The "seed" cell or cells for this iteration may be determined from the Cartesian coordinates 3260 of process 3200 or from the Cartesian coordinates 3860 of a prior iteration of process 3800. Each iteration of process 3800 retrieves the coordinates of additional points to densify a point cloud in a region of interest.

Selecting a Feature by Outlining a Region ("Lasso")

Figure 39:
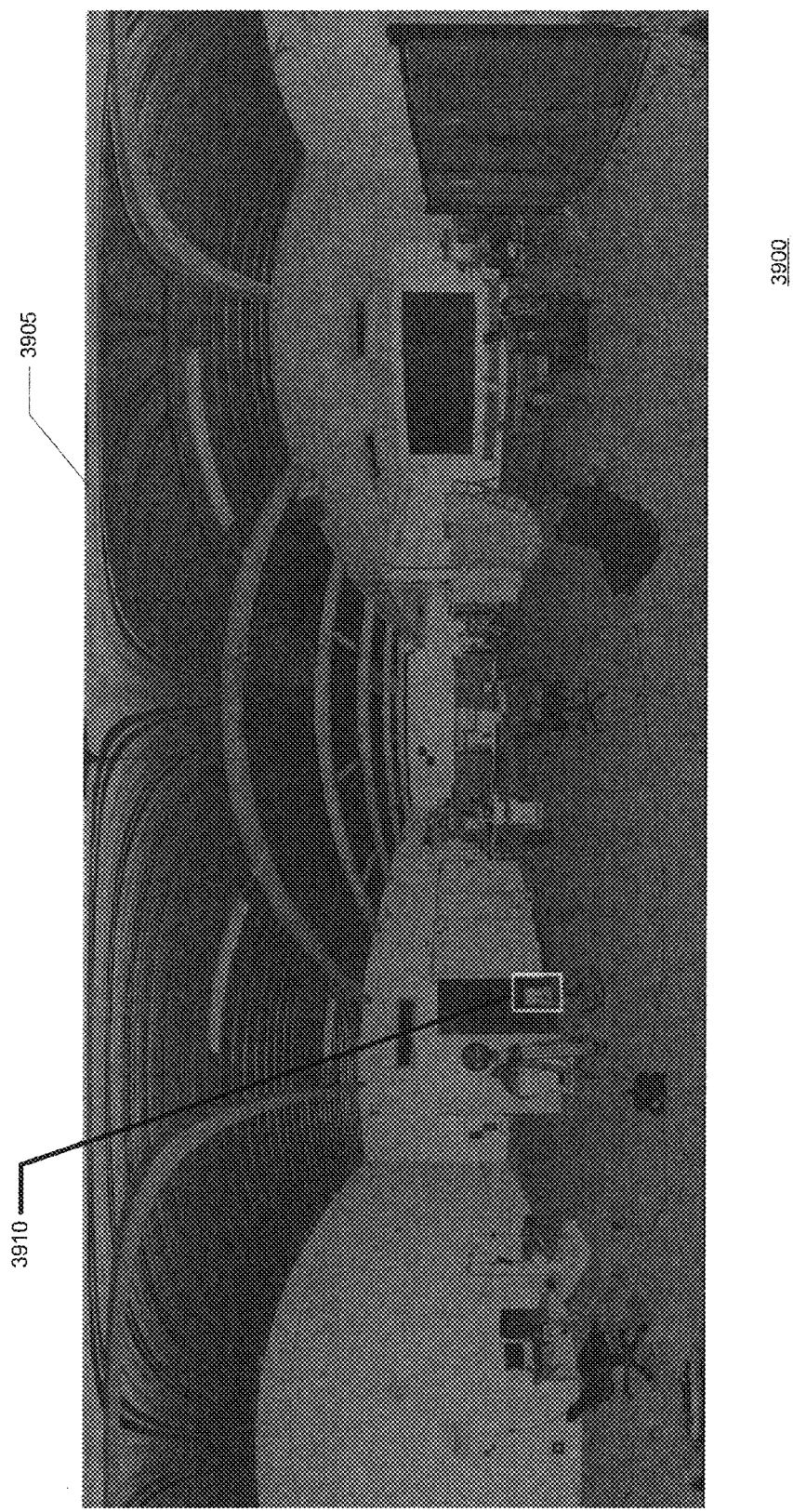
FIG. 39 shows an example of an outlined object in a two-dimensional view projection of three-dimensional points in accordance with some embodiments of the invention.

FIG. 39 shows at 3900 an example of a two-dimensional view 3905 of three-dimensional points in accordance with some embodiments of the invention, with an object of interest outlined at 3910.

Figure 40:
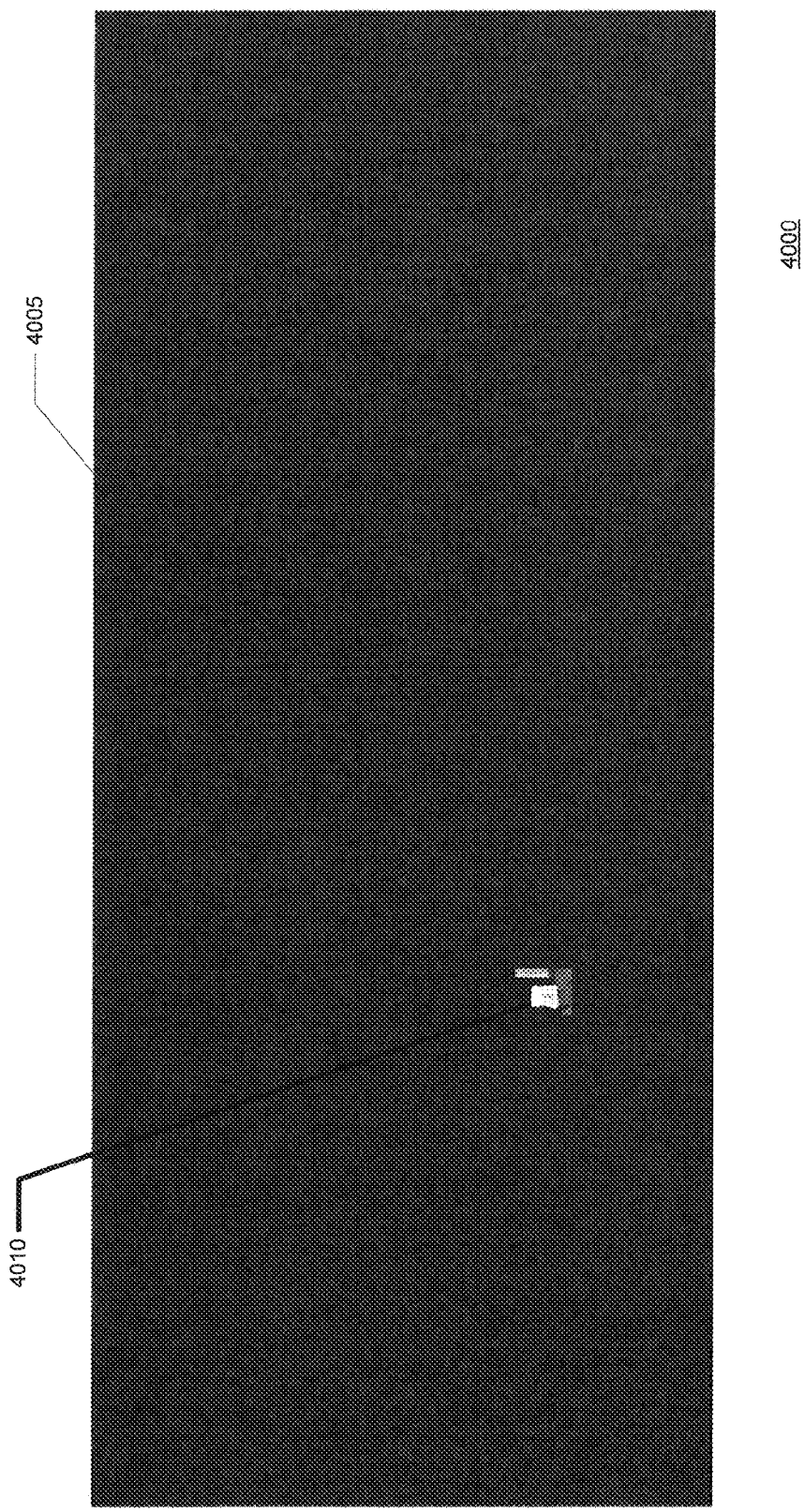
FIG. 40 shows the outlined object of FIG. 39.

FIG. 40 shows at 4000 a two-dimensional view 4005 with the object of interest of FIG. 39 shown at 4010 and with the remainder of the view blacked out. That is, a binary mask is used to show at 4010 the points representing the object of interest and to block the remainder of the points.

Figure 41:
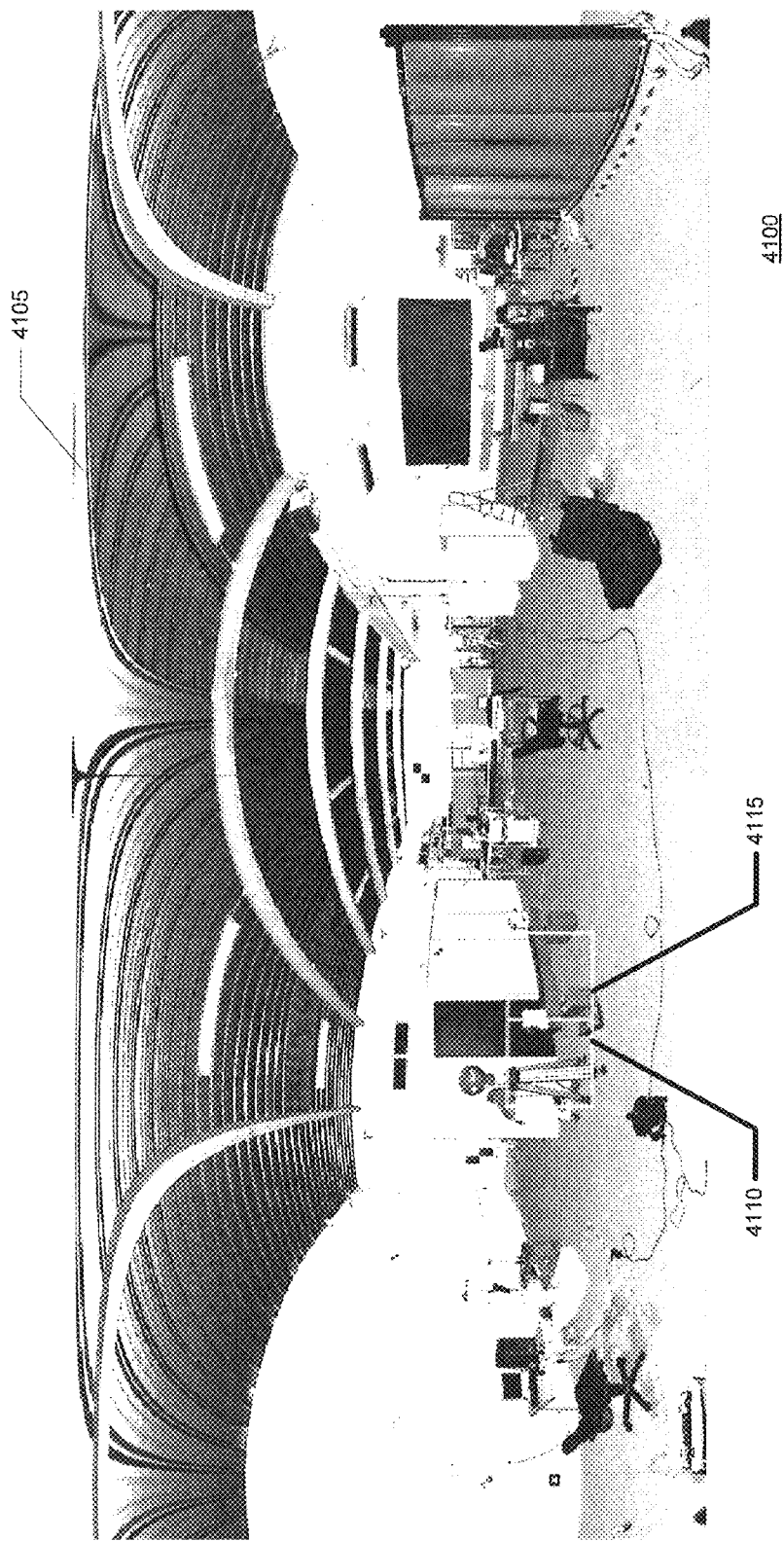
FIG. 41 shows the patches containing the points of the outlined object of FIG. 39 in accordance with some embodiments of the invention.

FIG. 41 shows at 4100 a two-dimensional view 4105 with the outlined object of interest of FIG. 39 overlaid with rectangles 4110 and 4115; these rectangles represent patches (of the data set from which view 4105 is derived) of cells containing values for the points of the outlined object of FIG. 39.

FIG. 42A shows at 4200 an enlarged view of the patches of FIG. 41. Regions 4205 and 4215 correspond respectively to patches 4105 and 4115. Boundaries 4210 and 4215 roughly indicate the outline of the object of interest of FIG. 39. The view of FIG. 42A is prepared from a preview layer having reduced point density relative to the data set from which it is obtained by subsampling.

FIG. 42B shows at 4350 an enlarged view of the patches of FIG. 41. Regions 4255 and 4265 correspond respectively to patches 4105 and 4115. Boundaries 4260 and 4265 indicate the outline of the object of interest of FIG. 39 more sharply than the view of FIG. 42A. The view of FIG. 42B is prepared from a full data set having greater point density than a preview layer.

Figure 43:
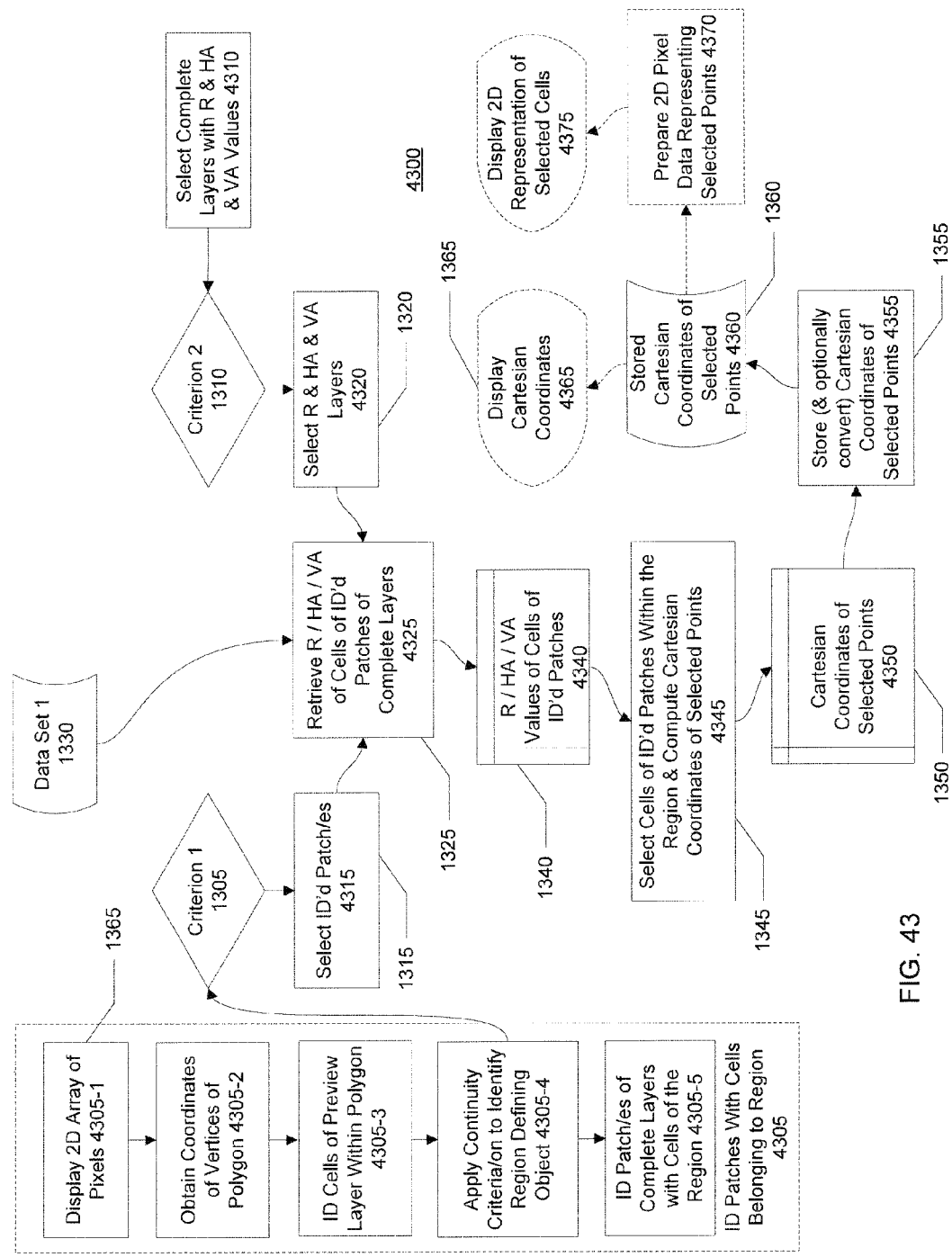
FIG. 43 shows a process for retrieving from a data set the coordinates of three-dimensional points of an object in accordance with some embodiments of the invention.

FIG. 43 shows at 4300 a process for retrieving from a data set the coordinates of three-dimensional points representing an object in accordance with some embodiments of the invention. Common reference numerals indicate correspondence of elements of process 4300 with the generic process 1300 of FIG. 13.

At step 4305 the patches with cells having point data associated with an object are identified. To do this, a two-dimensional array of pixels is displayed at step 4305-1, such as by performing the process of FIG. 15. The two-dimensional coordinates in the display of the vertices of a polygon (or ellipse or other shape) defined by a user, such as polygon 3910, are obtained at step 3205-2. Cells (of the preview layer used to prepare the display) within the polygon are identified at step 4305-3. At step 4305-4, at least one continuity criterion is applied to identify a region within the polygon defining the object.

That is, the cells corresponding to pixels within the polygon which have point data meeting the at least one continuity criterion are identified so as to define an associated group of cells representing the object in the preview layer, e.g., as in the example of FIG. 42A. The at least one criterion can be the normal of the point (indicating association of a point with a planar surface or a cylindrical surface or other geometric shape) and/or intensity of the point (indicating association of a point with an object having albedo different from its surroundings) and/or any other characteristic or characteristics which allow the point to be associated with an object to the exclusion of other points within the user-defined polygon.

The patches of the full data set containing the identified cells are identified at step 4305-5, e.g., the patches indicated at 4110 and 4115. The identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 4315 are thus the patches including the cells which contain data for points of the region associated with the object of interest, and the layers selected at 4320 are those having the data needed to determine position of these points in a three-dimensional coordinate system.

At step 4325 the values contained in the patches of cells including the region of the polygon are retrieved from the respective layers of the full data set as R, HA and VA values 4340. At step 4345 the R, HA and VA values defining three-dimensional positions of the points representing the object are used to compute Cartesian coordinates 4350 of these points. Step 4355 stores the Cartesian coordinates at 4360 for use in other processes and/or optional display at 4365. Optional step 4370 prepares two-dimensional pixel data representing the points for storage and/or optional display at 4375. Data 4360 may be stored in the form of one or more derived layers, such as layers 930 . . . 945 of FIG. 9.

Data 4360 may also be used to generate a binary layer (of true/false values) which identifies the points of the preview layer representing the object of interest and/or a binary layer which identifies the points of the full data set representing the object of interest; such a binary layer is more compact than a set of point data representing the object, and can be used as a filter to later retrieve the points representing the object of interest. For a scene having multiple objects of interest, preparing and storing a binary layer per object allows the point data of a large data set to be processed one time and prepared for later retrieval by object without incurring the penalty of separately storing a copy of the point data associated with each object.

Figure 44:
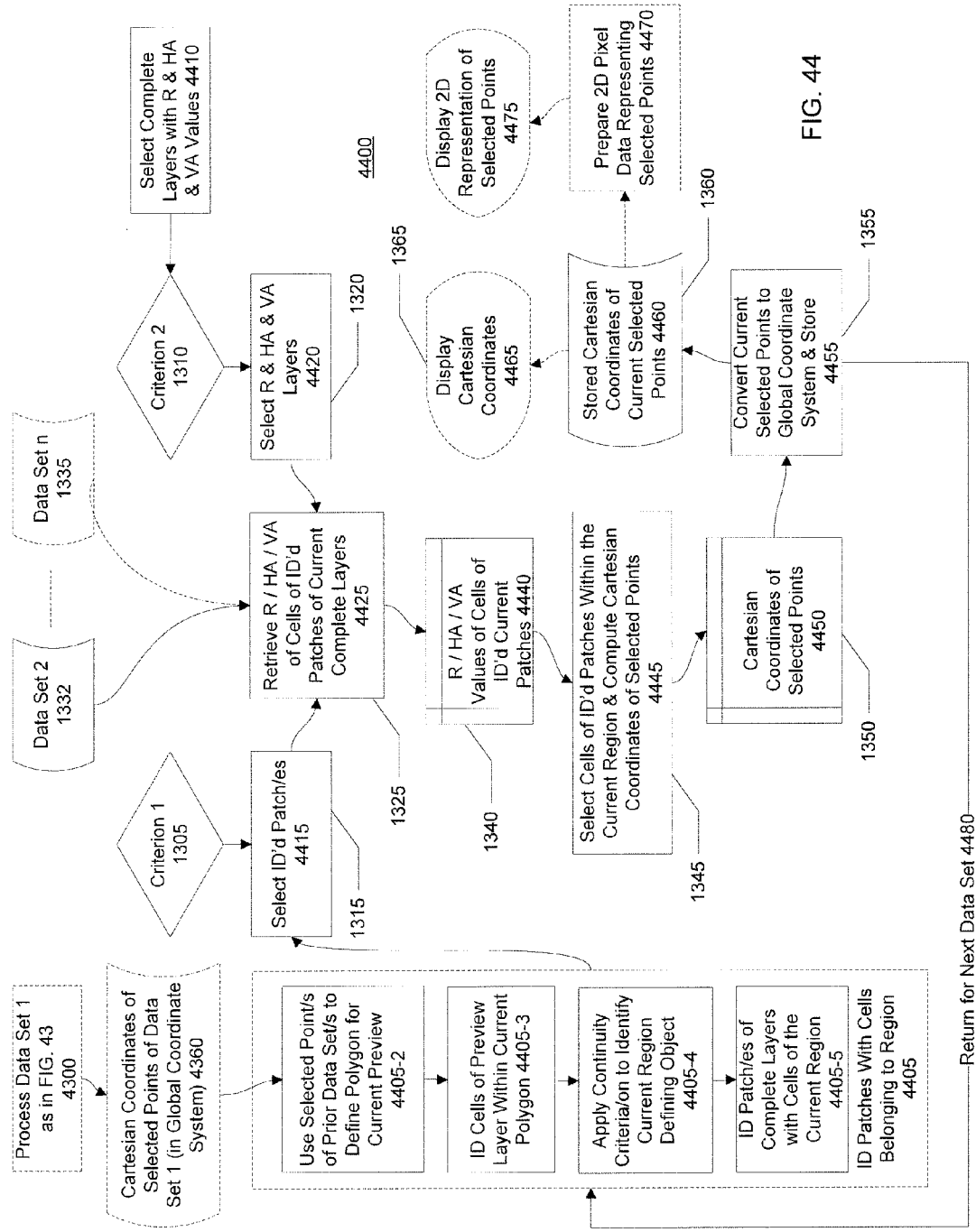
FIG. 44 shows a process for retrieving from multiple data sets the coordinates of three-dimensional points of an object in accordance with some embodiments of the invention.

Described above with reference to FIG. 43 is a process 4300 for obtaining from a first data set 1330 the Cartesian coordinates 4360 of three-dimensional points representing an object. FIG. 44 shows at 4400 a process for retrieving from one or more further data sets the coordinates of three-dimensional points representing an object in accordance with some embodiments of the invention. Common reference numerals indicate correspondence of elements of process 4400 with process 4300 of FIG. 43 and with the generic process 1300 of FIG. 13.

Referring to the example of FIG. 44, the Cartesian coordinates of points 4360 are used as input for process 4400. At step 4405, the three-dimensional location of at least one of these points is used to define a region of the preview layer of a current data set, e.g., data set 1332.

To do this, a convex hull of locations of selected points of the prior data set is used to define a polygon for the current preview. At step 4405-3, the cells of the preview layer of the current data set within the defined region are identified. At step 4405-4, at least one continuity criterion is applied to identified points of the defined region within the polygon representing the object of interest.

That is, the cells which have point data meeting the at least one continuity criterion are identified so as to define an associated group of cells of the current data set representing the object of interest. The at least one criterion can be the same as used in the process for the prior data set, for example.

The patches of the current complete data set containing the cells of the defined region are identified at step 4405-5, e.g., the patches containing cells with point data for regions 4260 and 4270. In a first iteration of process 4400, the identities of these patches are taken as the at least one first criterion 1305.

Because the three-dimensional coordinates of the first point are to be determined, the layers with cells containing range (R), horizontal angle (HA) and vertical angle (VA) data define the at least one second criterion 1310. The patches selected at 4415 are thus the patches including the cells which contain data for points of the region associated with the object of interest, and the layers selected at 4420 are those having the data needed to determine position of these points in a three-dimensional coordinate system.

At step 4425 the values contained in the patches of cells including the region associated with the object of interest are retrieved from the respective layers of the full data set as R, HA and VA values 4440. At step 4445 the R, HA and VA values defining three-dimensional positions of the points (of the current data set) representing the object are used to compute Cartesian coordinates 4450 of these points. Step 4455 stores the Cartesian coordinates at 4460 for use in a further iteration of process 4400, in other processes and/or for optional display at 4465. Optional step 4470 prepares two-dimensional pixel data representing the points for storage and/or optional display at 4475. Data 4460 may be stored in the form of one or more derived layers, such as layers 930 . . . 945 of FIG. 9.

Data 4460 may also be used to generate a binary layer (of true/false values) which identifies the points of the preview layer representing the object of interest and/or a binary layer which identifies the points of the full data set representing the object of interest; such a binary layer is more compact than a set of point data representing the object, and can be used as a filter to later retrieve the points representing the object of interest. For a scene having multiple objects of interest, preparing and storing a binary layer per object allows the point data of a large data set to be processed one time and prepared for later retrieval of points by object without incurring the penalty of separately storing a copy of the point data associated with each object.

Process 4400 returns as shown by arrow 4480 to process a subsequent data set, such as data set 1335. The selected points used as input for this iteration may be determined from the Cartesian coordinates 4360 of process 4300 or from the Cartesian coordinates 4460 of a prior iteration of process 4400. Each iteration of process 4400 retrieves the coordinates of additional points to densify a point cloud representing the object of interest.

Data 4460 may also be used to generate a binary layer (of true/false values) which identifies the points of the current preview layer representing the object of interest and/or a binary layer which identifies the points of the current full data set representing the object of interest.

Computing Normal of a Point

Figure 45B:
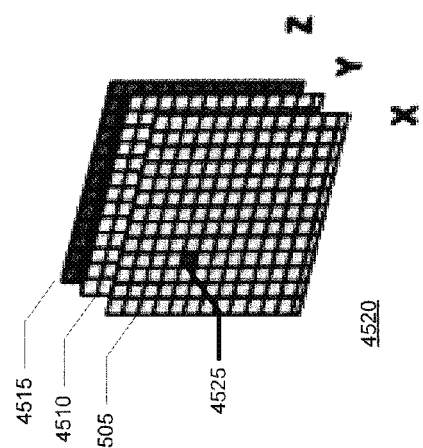
FIG. 45B shows a cell within the patch of FIG. 45A.
Figure 45D:
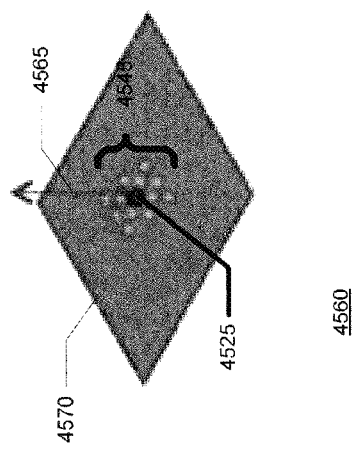
FIG. 45D shows computation of a normal of the point whose data is contained in the cell indicated in FIG. 45B in accordance with some embodiments of the invention.
Figure 45A:
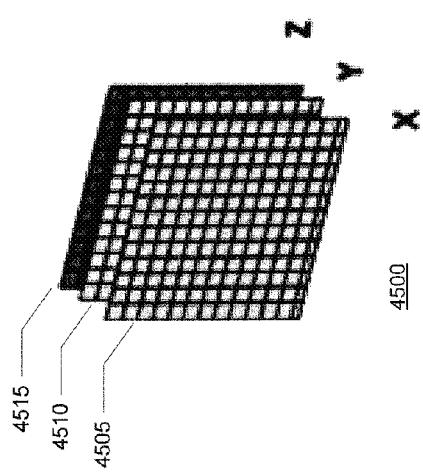
FIG. 45A shows a patch of respective layers of a data set in accordance with some embodiments of the invention.

FIG. 45A shows at 4500 a patch of multiple layers of a data set in accordance with some embodiments of the invention. The layers are grids of cells of Cartesian coordinates with layer 4505 having x-axis values, layer 4510 having y-axis values, and layer 4515 having z-axis values. The layers of FIG. 45A contain position values derived from processing of polar coordinate values of a scanner measurement data set, e.g., as in processes described above.

FIG. 45B shows at 4520 a selected cell 4525 of FIG. 45A.

Figure 45C:
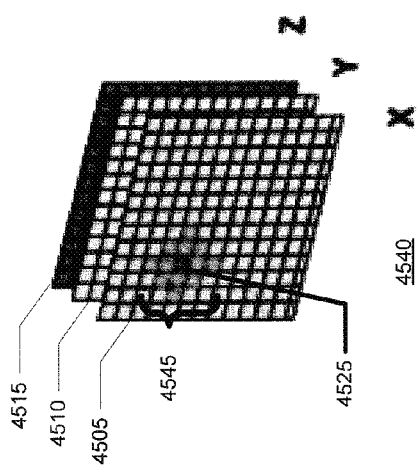
FIG. 45C shows cells surrounding the cell indicated in FIG. 45B.

FIG. 45C shows at 4540 a cluster 4545 of cells surrounding cell 4525.

FIG. 45D shows at 4560 computation of a normal 4565 of the point of cell 4525 of FIG. 45B in accordance with some embodiments of the invention. The normal 4565 of the point of cell 4525 is the normal to a plane 4570 fitted to points of cells, such as cells 4545, surrounding the point of cell 4525.

Figure 46:
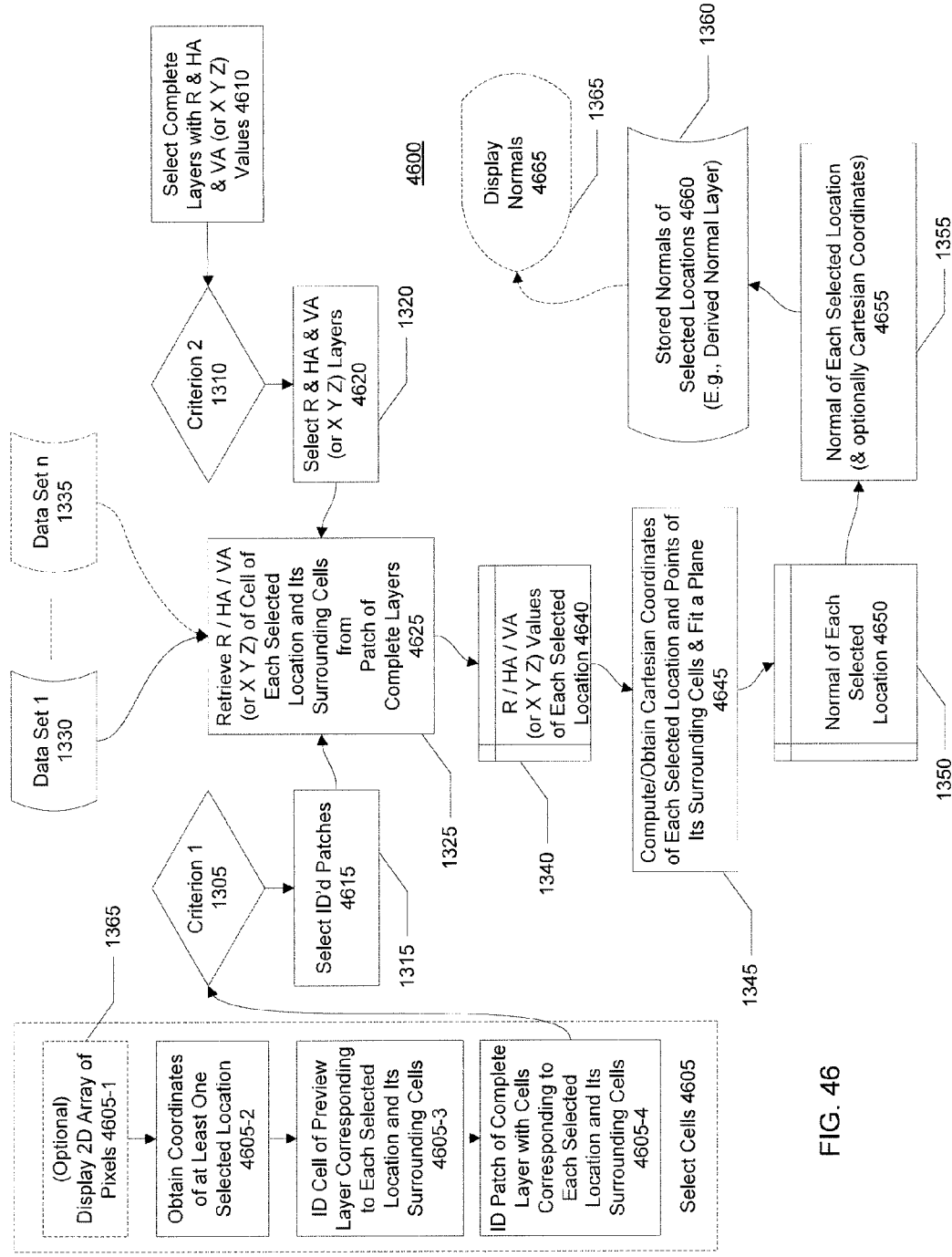
FIG. 46 shows a process for obtaining from a data set the coordinates of three-dimensional points of an object with normals of the points in accordance with some embodiments of the invention.

FIG. 46 shows at 4600 a process for obtaining from a data set the coordinates of three-dimensional points of an object with normals of the points in accordance with some embodiments of the invention. Common reference numerals indicate correspondence of elements of process 4600 with the generic process 1300 of FIG. 13.

At step 4605 at least one patch is identified with cells to be used in computing a normal for at least one point. A two-dimensional array of pixels is optionally displayed at step 4605-1 such as by performing the process of FIG. 15. If displayed, the two-dimensional coordinates in the display of a point selected by a user, such as the point of cell 4525, are obtained at step 4605-2.

Alternatively, points may be selected automatically, such as all points of a patch or of a feature or of the entire data set. The cell of each point for which a normal is to be computed, and its surrounding cells, are identified at step 4605-3. Each patch containing identified cells is identified at step 4605-4. The identity of this patch or patches is taken as the at least one first criterion 1305.

Because the three-dimensional coordinates of the points are to be determined, the layers with cells containing range (R), horizontal angle (HA) and vertical angle (VA) data define the at least one second criterion 1310. Alternately, if the Cartesian coordinates are available as in the example of FIG. 45A, the layers with cells containing X, Y, Z data define the at least one second criterion 1310. The patches selected at 4615 are thus the patches with the cells of points for which normal are to be computed, and their surrounding cells, and the layers selected at 4620 are those having the data needed to determine position of each of the needed points in a three-dimensional coordinate system.

At step 4625 the values contained in the cells defining positions of the points are retrieved from the respective layers as values 4640. Step 4645 computes the Cartesian coordinates of the points of interest (if not already available, or retrieves these if available), and the normal of each point of interest. Step 4655 stores the normal at 4660 for use in other processes and/or optional display at 4665 (optionally with Cartesian coordinates of the points). Normals and/or Cartesian coordinates may be stored in the form of respective derived layers, such as layers 930 . . . 945 of FIG. 9, e.g., with one layer for normals and one layer for each of the X, Y and Z coordinate axes.

Euclidian Spatial Sampling

Figure 47B:
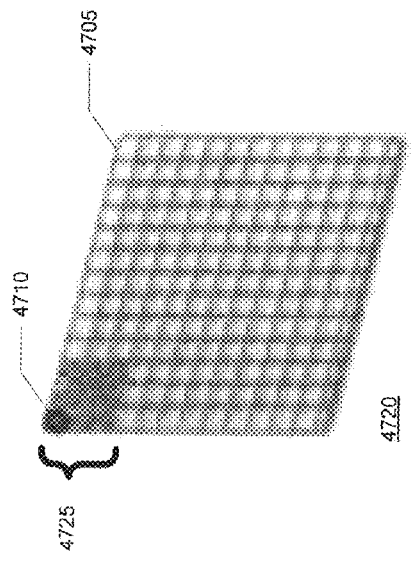
FIG. 47B shows clustering of cells in the patch of FIG. 47A in accordance with some embodiments of the invention.
Figure 47D:
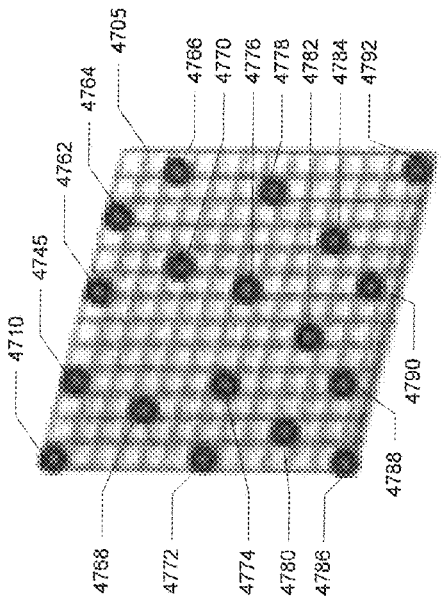
FIG. 47D shows an example of a cells with points of substantially uniform Euclidian spacing in accordance with some embodiments of the invention.
Figure 47A:
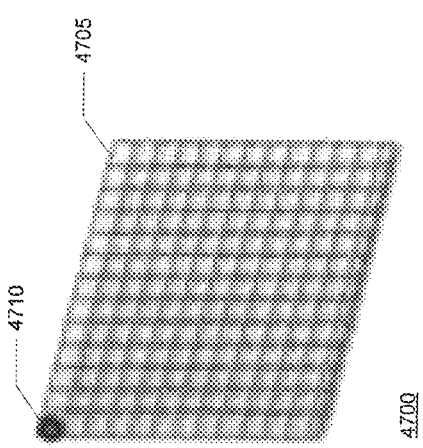
FIG. 47A shows a patch of cells in accordance with some embodiments of the invention.

FIG. 47A shows at 4700 a patch 4705 of cells, including a cell 4710 containing data of a first point, in accordance with some embodiments of the invention.

FIG. 47B shows at 4720 the patch 4705, the cell 4710, and a cluster 4725 of cells around cell 4710 containing data for points around the point of cell 4710, in accordance with some embodiments of the invention.

Figure 47C:
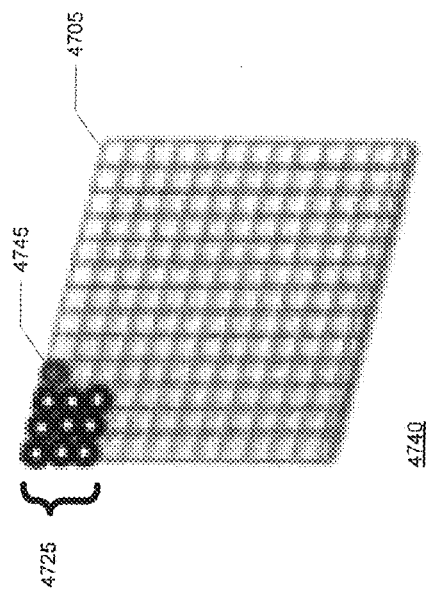
FIG. 47C shows a cell adjacent a cluster of cells in the patch of FIG. 47A in accordance with some embodiments of the invention.

FIG. 47C shows at 4740 a cell 4745 containing data of a point adjacent the points of the cluster 4725, in accordance with some embodiments of the invention.

FIG. 47D shows at 4760 cells with points of substantially uniform Euclidian spacing, e.g., cells 4710, 4745, 4762, 4764, 4766, 4768, 4770, 4772, 4774, 4776, 4778, 4780, 4782, 4784, 4786, 4788 and 4790, in accordance with some embodiments of the invention.

Figure 48:
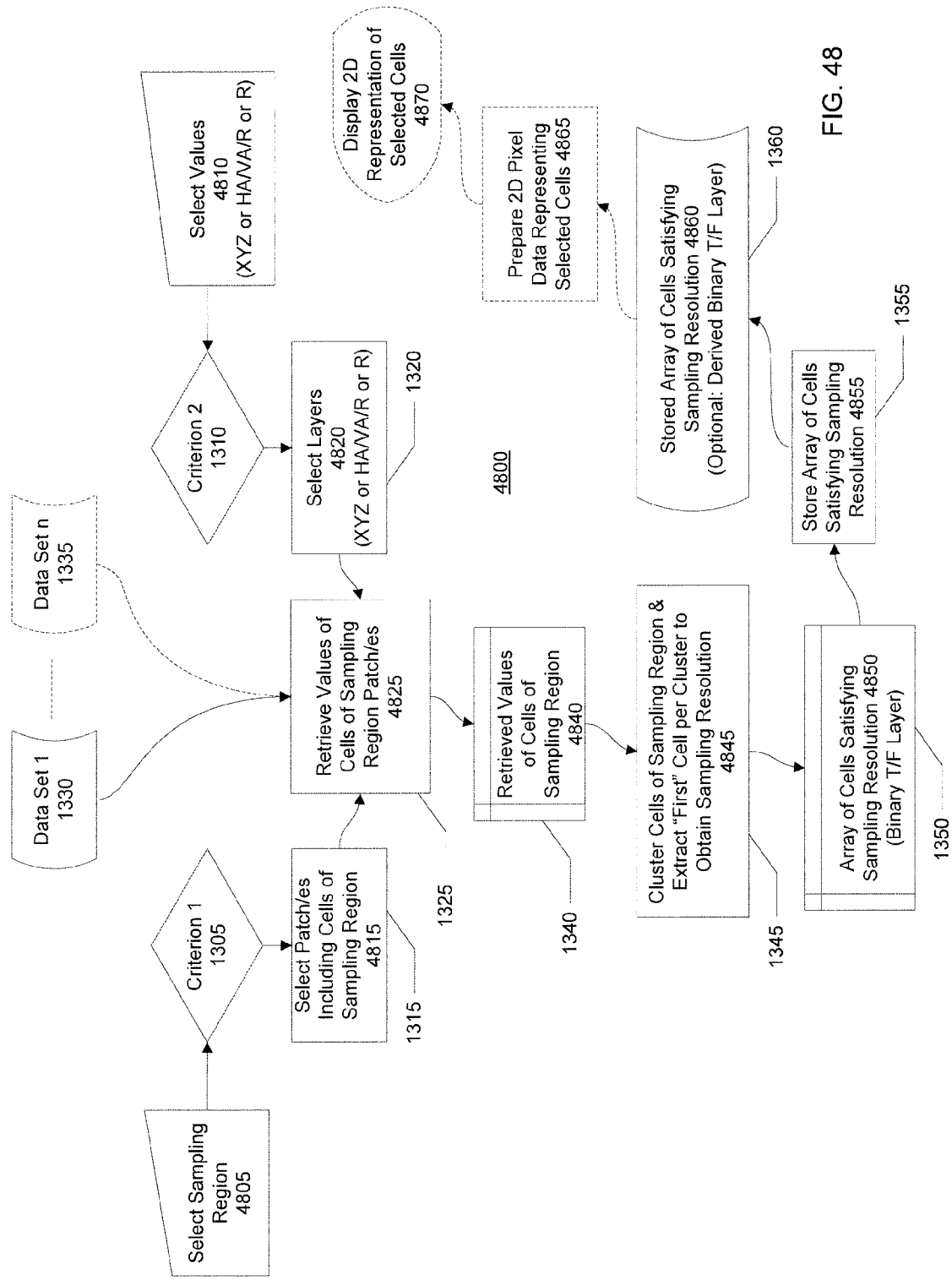
FIG. 48 shows a process for Euclidean spatial sampling of three-dimensional points in accordance with some embodiments of the invention.

FIG. 48 shows at 4800 a process for Euclidean spatial sampling of three-dimensional points in accordance with some embodiments of the invention. Common reference numerals indicate correspondence of elements of process 4800 with the generic process 1300 of FIG. 13.

A sampling region is selected at step 4805. The region can be defined as desired, such as an entire data set, one or more patches of cells, a group of cells selected using one of the processes described above, or any other selected group of cells. The identities of the patch or patches with cells of the sampling region are taken as the at least one first criterion 1305.

Two approaches are possible for determining Euclidian spacing of points of the sampling region. A first approach uses the Cartesian coordinates of the points. If Cartesian coordinates of the points are available (as in FIG. 45A), the layers with cells containing the X, Y, Z values are selected at 4810, and these values define the at least one second criterion 1310. If polar coordinates of the points are available, the layers with cells containing the horizontal angle (HA), vertical angle (VA) and range (R) values of the points are selected at 4810, and these values define the at least one second criterion 1310. (The Cartesian coordinates of the points will be determined from the HA, VA and R values.)

A second approach for determining Euclidian spacing of points of the sampling region is more computationally efficient, if less exact. This approach uses only the range (R) values of the points as a rough approximation of Euclidian point spacing, assuming the nominal angular spacing from cell to cell is roughly constant in each of the vertical and horizontal directions. In this approach, the layer with cells containing the R values of the points are selected at 4810, and these values define the at least one second criterion 1310.

The at least one patch selected at 4815 is thus the patch with the cells of the sampling region, and the layers selected at 4820 are those having the data needed to determine Euclidian spacing of the points of the sampling region, using either Cartesian coordinates or range values. At step 4825 the values contained in the cells of the points of the sampling region are retrieved from the respective layer or layers.

Step 4845 selects cells of the sampling region which satisfy the desired Euclidian spacing (sampling resolution). To do this, cells are clustered (as shown in FIG. 47C) such that selection of a particular cell from each cluster identifies an array 4850 of cells with points having the desired Euclidian spacing (as shown in FIG. 47D). Step 4855 stores array 4850 at 4860. The stored array at 4860 is in the form of derived layers of point data (X Y Z or HA/VA/R or R), or a binary layer of cells indicating which cells of the patch are members of the array (true/false values), or any other desired format. The stored array at 4860 can be used in other processes and/or prepared as two-dimensional pixel data 4865 for optional display at 4870.

Figure 49:
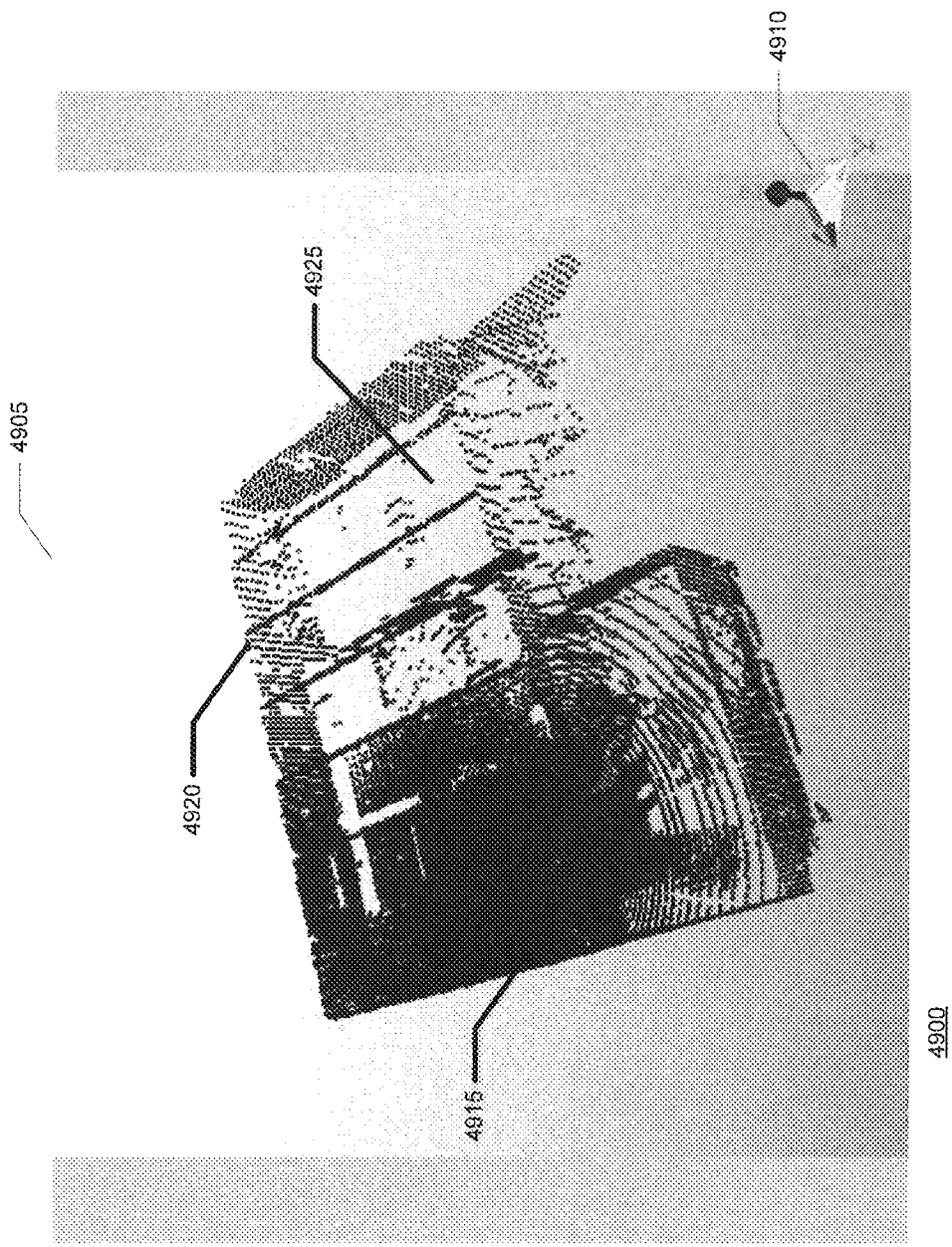
FIG. 49 shows a set of three-dimensional points of variable spacing in a Cartesian coordinate system.

FIG. 49 shows at 4900 a set 4905 of three-dimensional points of variable spacing in a Cartesian coordinate system 4910. Region 4915 has points of highest spatial density, while region 4920 has points of lower spatial density and region 4925 has lowest point density. While scanners typically acquire data with such variable point density, users often wish to have a data set with more uniform point density in Euclidian space. Process 4800 of FIG. 48 can be used to extract or identify the points of the data set meeting the desired sampling resolution.

Overlap Detection

Figure 50:
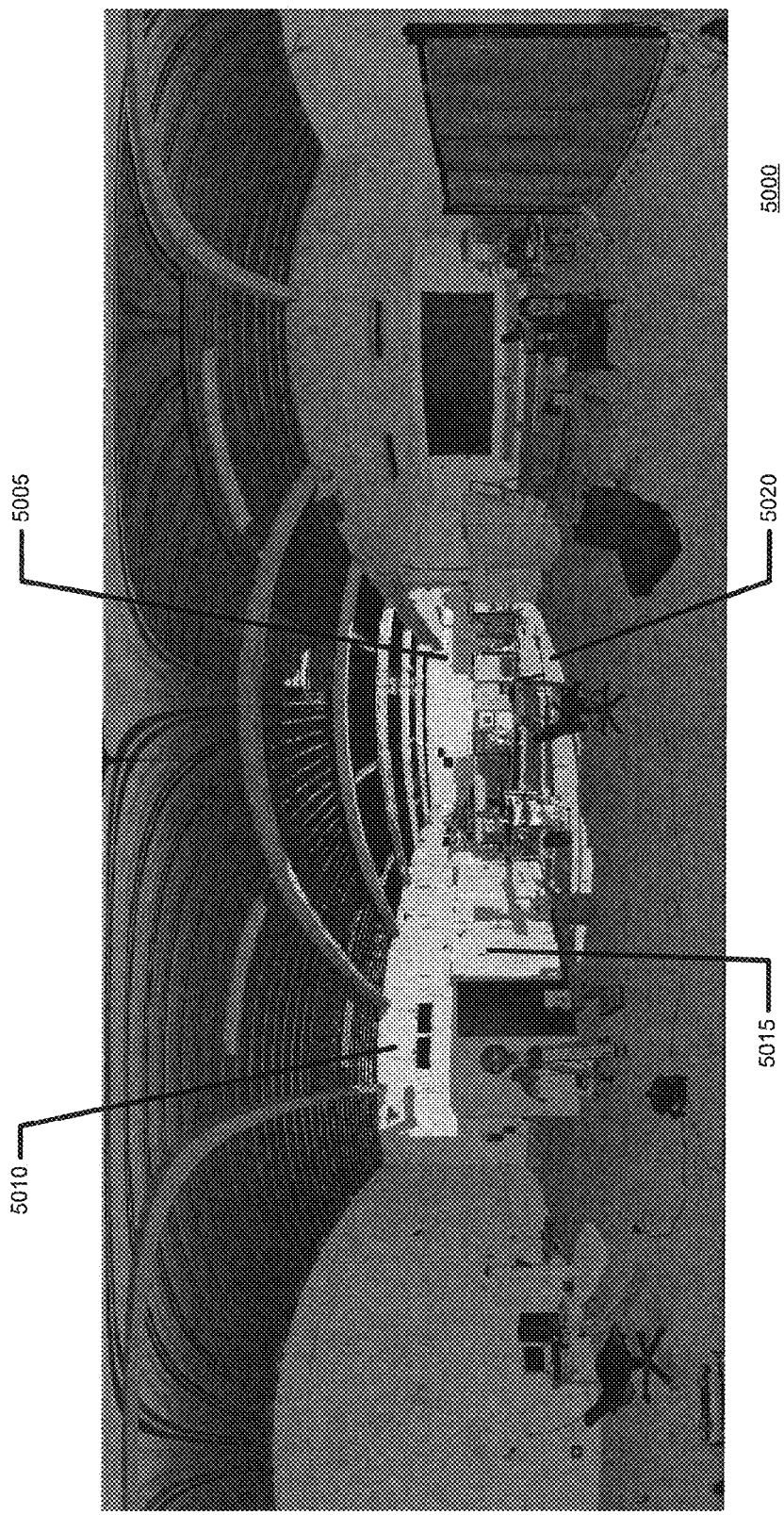
FIG. 50 shows regions of interest of three-dimensional points in a two-dimensional view from a first station.
Figure 51:
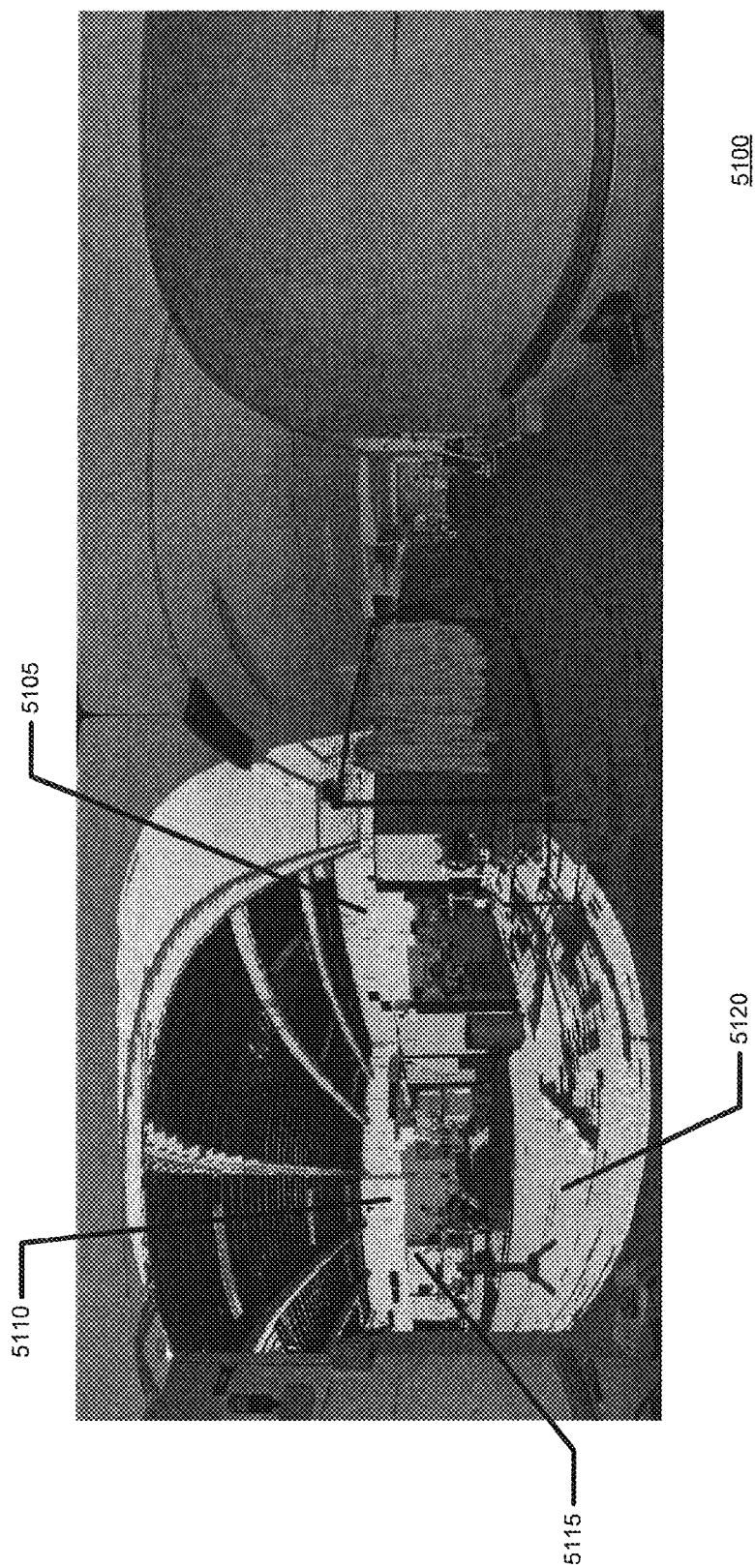
FIG. 51 shows regions of interest of FIG. 50 of three-dimensional points of interest in a two-dimensional view from a second station.

FIG. 50 and FIG. 51 represent scan data sets of the same environment obtained from respective different stations.

FIG. 50 shows at 5000 a two-dimensional display of three-dimensional points of an environment viewed from a first station. Regions of the display are highlighted at 5005, 5010, 5015 and 5020.

FIG. 51 shows at 5100 a two-dimensional display of three-dimensional points of the environment of FIG. 50 viewed from a second station. Regions of the display are highlighted at 5105, 5110, 5115, 5120, with features corresponding respectively to the features of regions 5005, 5010, 5015 and 5020.

It is sometimes desired to identify coincident (or near-coincident) points of the data sets so that point sets with non-duplicative points can be extracted.

Figure 52:
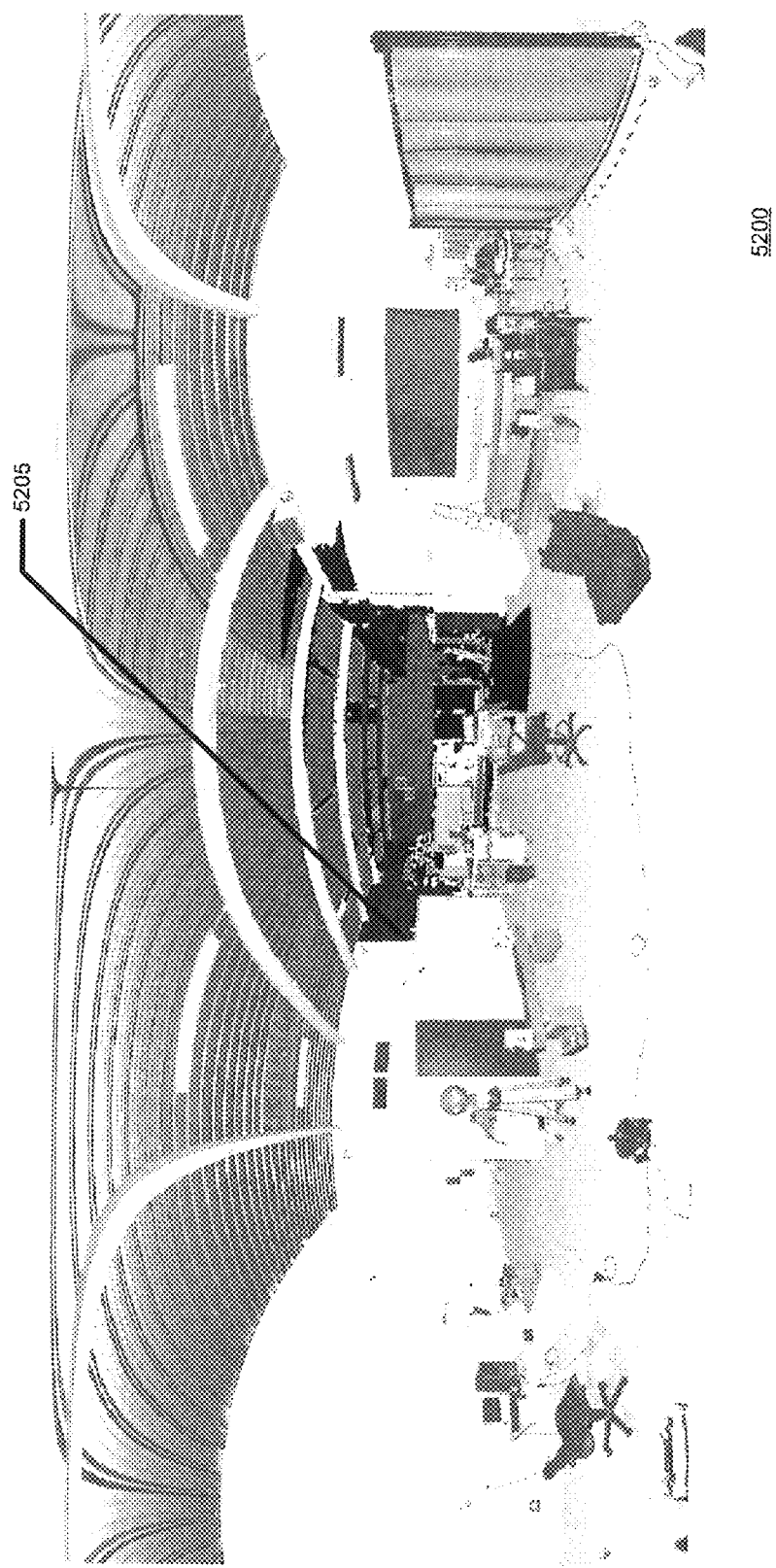
FIG. 52 shows a region of points identified using a coincident-points algorithm in accordance with some embodiments of the invention.

FIG. 52 shows at 5200 a two-dimensional display of three-dimensional points of the environment of FIG. 50 in which coincident points are identified in accordance with some embodiments of the invention.

Figure 53:
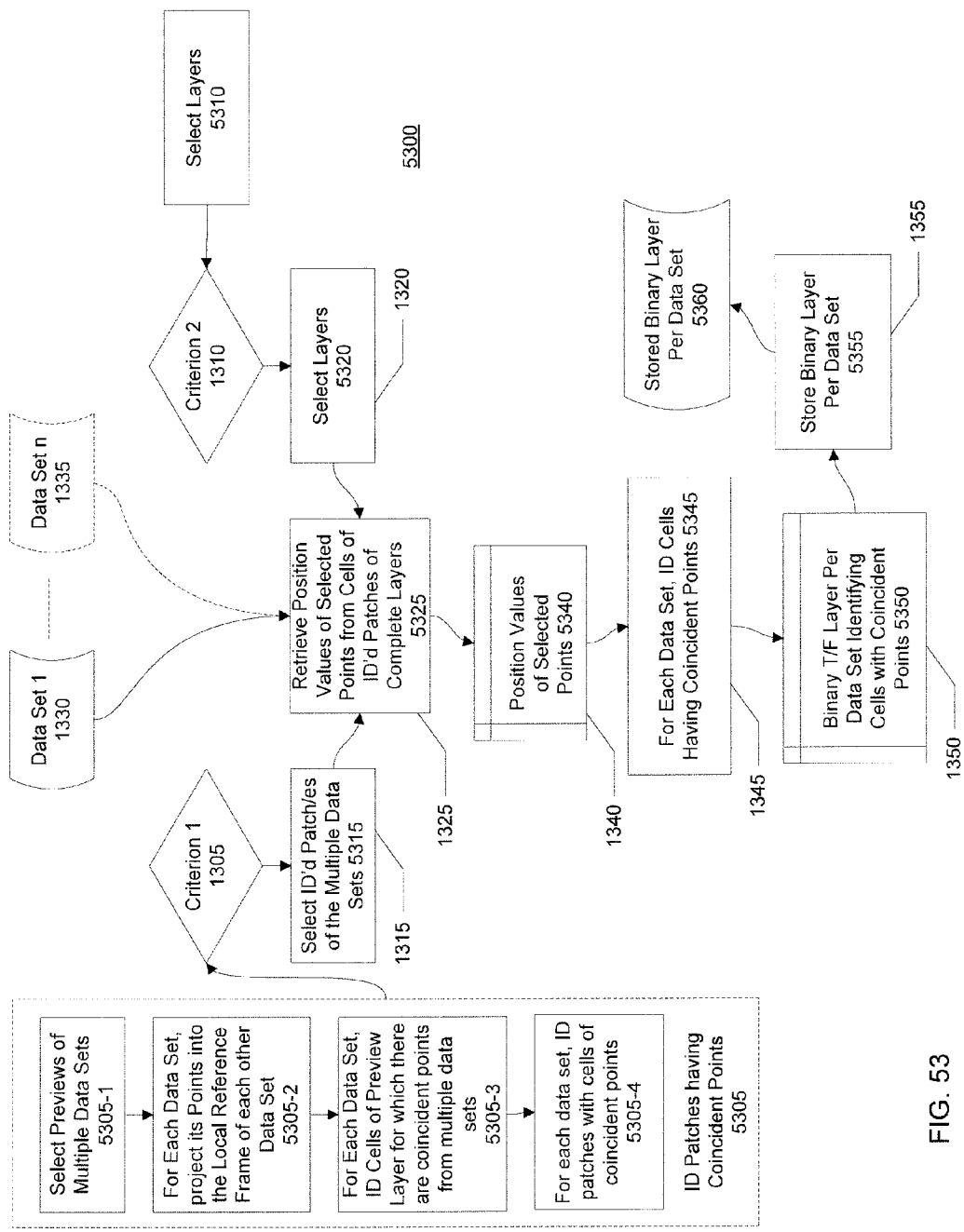
FIG. 53 shows a process for identification of coincident points from multiple data sets in accordance with some embodiments of the invention.

FIG. 53 shows at 5300 a process for identification of coincident points from multiple data sets in accordance with some embodiments of the invention. Common reference numerals indicate correspondence of elements of process 5300 with the generic process 1300 of FIG. 13.

Step 5305 examines preview layers of multiple data set to identify those patches of each complete data set having cells with coincident points. To do this, the preview layer of each of multiple data sets is selected at step 5305-1. Each data set has a local reference frame, and the spatial relationship between the local reference frames is assumed to be known or determinable for purposes of this description. For each data set, the points of the cells of its preview layer are projected into the local reference frame of the each other data set at step 5305-2. Projecting a point means, for example, that it is converted from its local station reference frame to a global reference frame and then converted into the local station reference frame of the other data set.

Step 5305-3 compares the positions of points of the previews of the data sets to identify cells having coincident points. It is assumed for this purpose that coincident point locations are not necessarily identical, but are within a defined distance of one another. Step 5305-4 identifies for each data set the patches (or portions of patches) of the complete data set with cells having the identified coincident points. The identities of these patches are taken as the at least one first criterion 1305.

Two approaches are possible for determining coincidence of points. A first approach uses the Cartesian coordinates of the points. If Cartesian coordinates of the points are available (as in FIG. 45A), the layers with cells containing the X, Y, Z values are selected at 5310, and these values define the at least one second criterion 1310. If polar coordinates of the points are available, the layers with cells containing the horizontal angle (HA), vertical angle (VA) and range (R) values of the points are selected at 5310, and these values define the at least one second criterion 1310. (The Cartesian coordinates of the points will be determined from the HA, VA and R values.)

A second approach for determining coincidence of points uses only the range (R) values of the points as a rough approximation of Euclidian position, assuming the nominal angular spacing from cell to cell is roughly constant in each of the vertical and horizontal directions. In this approach, the layer with cells containing the range (R) values of the points is selected at 5310, and these values define the at least one second criterion 1310.

The patches selected at 5315 are thus the patches of the multiple data sets with cells having one or more coincident points, and the layers selected at 5320 are those having the data needed to determine Euclidian positions of the points of these cells, using either Cartesian coordinates or range values. At step 5325 the values contained in the cells of these points are retrieved from the respective layer or layers as position values 5340 of selected points.

Step 5345 uses the position values 5340 (and at least one coincidence criterion) to identify which cells have coincident points. The resulting array of identified cells 5350 is in the form of a derived layer of cells with binary (true/false) values indicating the cells with coincident points, or any other desired format. Step 5355 optionally stores the array as a binary layer for each data set.

When coincident points are identified, at least one selection criterion is optionally applied to prefer one point over the others at the coincident position. The at least one criterion can be one or more of: (1) incident angle of the scan path on the scanned surface, (2) minimum range of the scan measurement, (3) scan data density, (4) scanner technical specifications, and (5) any other desired selection criterion.

Figure 54:
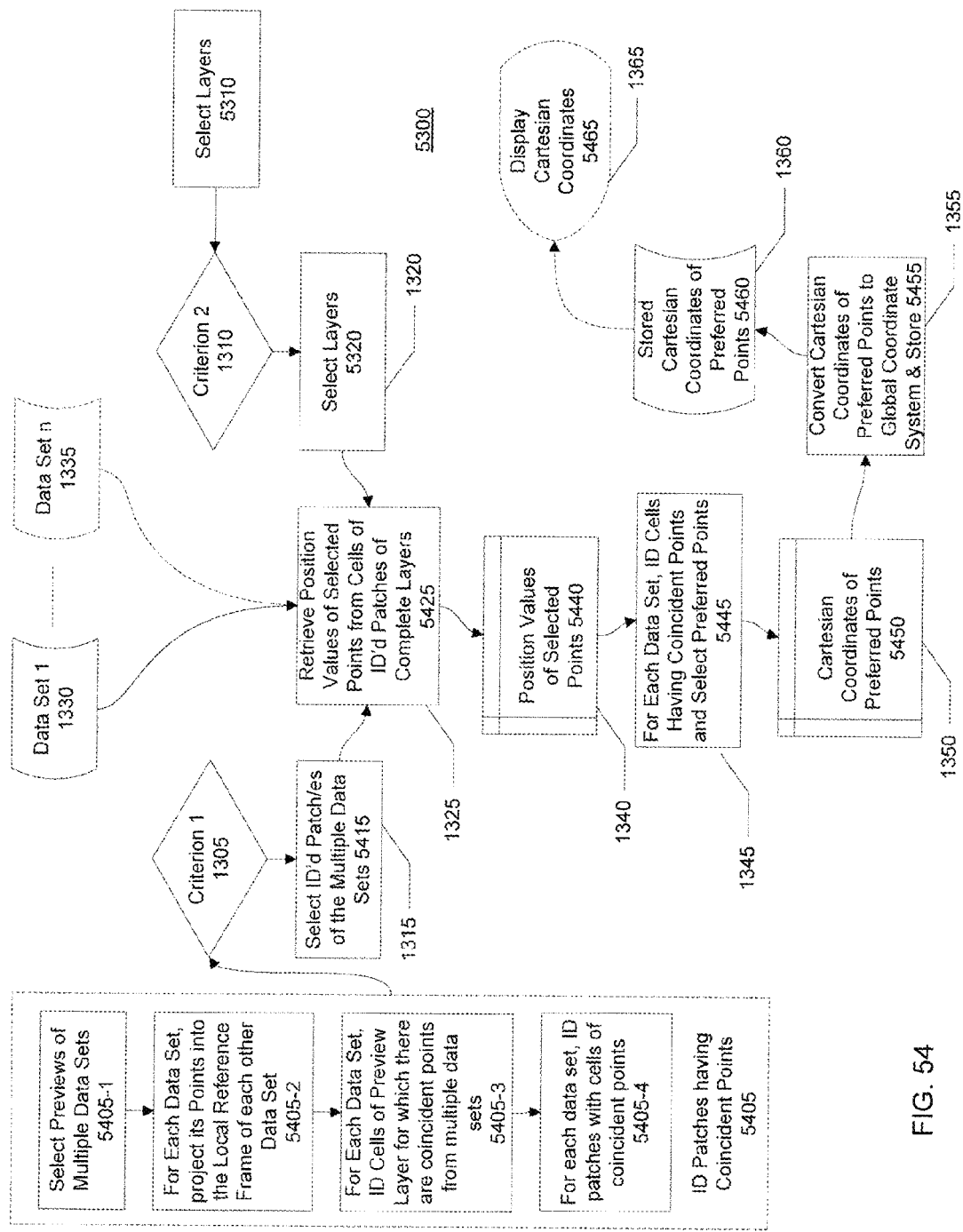
FIG. 54 shows a process for extraction of non-coincident points from multiple data sets in accordance with some embodiments of the invention.

FIG. 54 shows at 5400 a process for extraction of preferred coincident points from multiple data sets in accordance with some embodiments of the invention. Common reference numerals indicate correspondence of elements of process 5400 with the generic process 1300 of FIG. 13.

Step 5405 examines preview layers of multiple data set to identify those patches of each complete data set having cells with coincident points. To do this, the preview layer of each of multiple data sets is selected at step 5405-1. Each data set has a local reference frame, and the spatial relationship between the local reference frames is assumed to be known or determinable for purposes of this description. For each data set, the points of the cells of its preview layer are projected into the local reference frame of the each other data set at step 5405-2. Projecting a point means, for example, that it is converted from its local station reference frame to a global reference frame and then converted into the local station reference frame of the other data set.

Step 5405-3 compares the positions of points of the previews of the data sets to identify cells having coincident points. It is assumed for this purpose that coincident point locations are not necessarily identical, but are within a defined distance of one another. Step 5405-4 identifies for each data set the patches (or portions of patches) of the complete data set with cells having the identified coincident points. The identities of these patches are taken as the at least one first criterion 1305.

Two approaches are possible for determining coincidence of points. A first approach uses the Cartesian coordinates of the points. If Cartesian coordinates of the points are available (as in FIG. 45A), the layers with cells containing the X, Y, Z values are selected at 5410, and these values define the at least one second criterion 1310. If polar coordinates of the points are available, the layers with cells containing the horizontal angle (HA), vertical angle (VA) and range (R) values of the points are selected at 5410, and these values define the at least one second criterion 1310. (The Cartesian coordinates of the points will be determined from the HA, VA and R values.)

A second approach for determining coincidence of points uses only the range (R) values of the points as a rough approximation of Euclidian position, assuming the nominal angular spacing from cell to cell is roughly constant in each of the vertical and horizontal directions. In this approach, the layer with cells containing the range (R) values of the points is selected at 5410, and these values define the at least one second criterion 1310.

The patches selected at 5415 are thus the patches of the multiple data sets with cells having one or more coincident points, and the layers selected at 5420 are those having the data needed to determine Euclidian positions of the points of these cells, using either Cartesian coordinates or range values. At step 5425 the values contained in the cells of these points are retrieved from the respective layer or layers as position values 5440 of selected points.

Step 5445 uses the position values 5340 (and at least one coincidence criterion) to identify which cells have coincident points. When coincident points are identified, at least one selection criterion is optionally applied to prefer one point over the others at the coincident position. The at least one criterion can be one or more of: (1) incident angle of the scan path on the scanned surface, (2) minimum range of the scan measurement, (3) scan data density, (4) scanner technical specifications, and (5) any other desired selection criterion.

The resulting array 5450 of coordinates of points selected from the multiple data sets as preferred points is converted at 5455 to a global coordinate system and stored as a data set 5460 of the positions of preferred points. This data set optionally also includes the positions of points which were not determined to be coincident points, so that the resulting data set 5460 has a single point for each measured position but without duplication resulting from coincident points. The coordinates of the points of data set 5460 are optionally stored at 5460 for display at 5465 and/or for use in other processes.

Object Segmentation & Optional Geometry Detection

Figure 55:
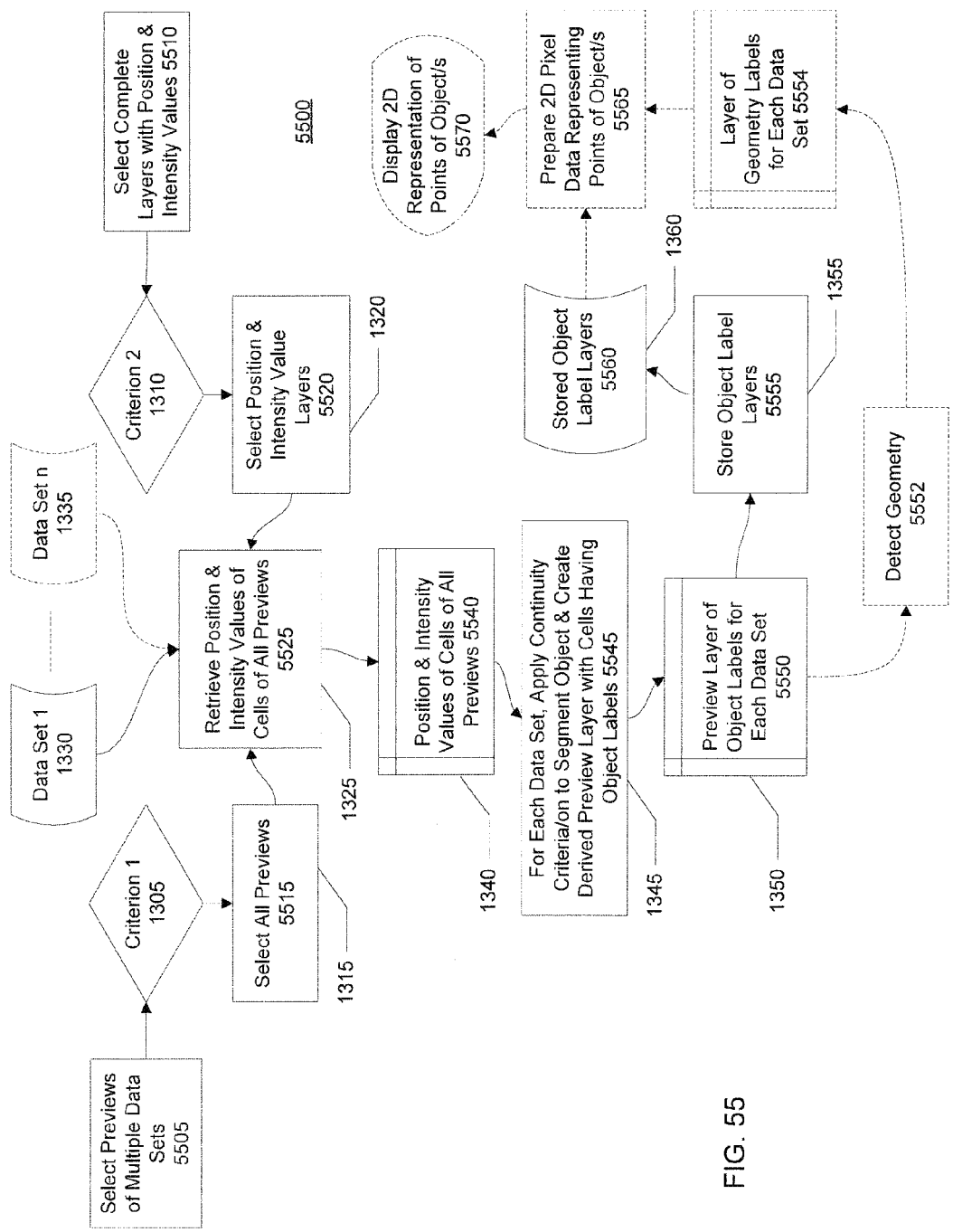
FIG. 55 shows a process for identification of non-coincident points from multiple data sets in accordance with some embodiments of the invention.

FIG. 55 shows at 5500 a process for creating derived layers from multiple data sets in accordance with some embodiments of the invention. The derived layers associate points of the data set with features, such as objects and/or surfaces and/or geometries. Common reference numerals indicate correspondence of elements of process 5500 with the generic process 1300 of FIG. 13.

At step 5505 the preview layers of multiple data sets are selected. The identities of these preview layers are taken as the at least one first criterion 1305.

Because features represented by points in the data sets are to be identified, the layers with cells containing position and intensity (I) values define the at least one second criterion 1310.

If Cartesian coordinates of the points are available (as in FIG. 45A), the layers with cells containing the X, Y, Z values are selected at 5510, and these values together with the intensity (I) values define the at least one second criterion 1310. If polar coordinates of the points are available, the layers with cells containing the horizontal angle (HA), vertical angle (VA) and range (R) values of the points are selected at 5510, and these values together with the intensity (I) values define the at least one second criterion 1310. (The Cartesian coordinates of the points will be determined from the HA, VA and R values.)

Step 5525 retrieves the values 5540 for intensity and position of point of cells of the preview layers. Step 5545 applies at least one continuity criterion to identify points associated with a feature (e.g., an object) to create at least one derived preview layer 5550 with cells having feature (or object) labels. The at least one derived preview layer identifies points associated with a feature (or object). Step 5555 stores the derived preview layer or layers as object label layers 5560 for use in other processes and/or for optional preparation of pixel data at 5565 and optional display of representations of the points associated with one or more features (or objects).

The at least one continuity criterion to identify points associated with a feature (e.g., an object) can be one or more of: (1) for object segmentation, defining object boundaries based on discontinuities of intensity and/or range and/or computed normals, and/or (2) for plane detection, defining a plane based on discontinuities of range and/or computed normals indicating minimal curvature.

Optional step 5552 uses the at least one preview layer 5550 to detect geometry of one or more features, and prepare a layer of geometry labels per data set 5554. The layers of geometry labels are optionally used to extract points from the data sets representing geometric objects, used at step 5565 to prepare pixel data for display of point clouds representing the objects.

Step 5552 optionally applies at least one curvature criterion to detect geometry (e.g., plane, cylinder, etc.) by fitting the geometry to points of a segmented object. A segmented object is defined for example in object label layers 5560. Points of the segmented object deviating by less than a predetermined (threshold) amount from the fitted geometry are identified as belonging to the fitted geometry, for example.

Those of ordinary skill in the art will realize that the detailed description of embodiments of the present invention is illustrative only and is not intended to be in any way limiting.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Methods in accordance with some embodiments may be implemented on a data processing computer such as a personal computer, workstation computer, mainframe computer, or high-performance server running an OS such as a version of Microsoft® Windows® available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented by means of a computer program. The computer program may be loaded in an apparatus having a processor, such as a scanner or total station with scanning capability. Therefore, the invention also relates to a computer program which can enable a processor to carry out any one of the described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on devices already in the field, i.e. a computer program which is delivered to the field as a computer program product.

The constituent parts of a unit may be distributed in different software or hardware components or devices for bringing about the intended function. Furthermore, the units may be gathered together for performing their functions by means of a combined, single unit.

Following is a summary of some of the inventive concepts described herein:

1. [FIG. 13][generic process] A method of processing at least one set of data representing three-dimensional points organized in a data structure wherein, for each set, each three-dimensional point has multiple components, the data is organized in a respective layer per component, each layer is segmented in cells of a two-dimensional grid, the cells are arranged such that the components of a given point are contained in corresponding cells of multiple layers, the cells are grouped in patches by layer, and the patches are arranged such that the components of an array of points is represented by corresponding patches of multiple layers, comprising:

a. obtaining at least one first criterion;

b. obtaining at least one second criterion;

c. retrieving data from cells of patches meeting the at least one first criterion of layers meeting the at least one second criterion, d. processing the retrieved data to obtain a derivative data set, and e. storing the derivative data set.

2. [FIG. 9A/9B][Preview Layer] The method of 1, wherein the layers comprise complete layers and preview layers, wherein each preview layer has cells containing data from a subset of the cells of a complete layer.

3. [FIG. 15][Viewer] The method of 1, wherein a. obtaining the at least one first criterion comprises identifying patches corresponding to a display region;

b. obtaining the at least one second criterion comprises selecting a layer whose cells contain intensity values for the three-dimensional points, c. retrieving data comprises retrieving intensity values from cells of the identified patches of the selected layer, d. processing the retrieved data to obtain a derivative data set comprises preparing from the retrieved intensity values an array of two-dimensional pixel data, and e. storing the derivative data set comprises providing the array of two-dimensional pixel data to a device for display as an array of two-dimensional pixels over the display region.

4. The method of 3, wherein the display region is defined by at least one of an aperture, a pixel-array size, a direction of view, a field of view, and a distance.

5. [Viewer-Preview] The method of one of 3-4, wherein the layers comprise complete layers and preview layers, each preview layer has cells containing data from a subset of the cells of a complete layer, and the selected layer comprises a preview layer.

6. [FIG. 17][Retrieve 3D Point] The method of 2, wherein
   a. obtaining the at least one first criterion comprises
      i. displaying intensity values of cells of a preview layer as a two-dimensional array of pixels,
      ii. obtaining coordinates of a first selected location in the two-dimensional array,
      iii. identifying a cell of the preview layer corresponding to the first selected location as a first selected cell,
      iv. identifying a patch of a complete layer which contains the first selected cell,
   b. obtaining the at least one second criterion comprises selecting complete layers containing range data, horizontal angle data and vertical angle data,
   c. retrieving data comprises retrieving patches from the selected complete layers which contain a range value, a horizontal angle value and a vertical angle value of the three-dimensional point corresponding to the first selected cell,
   d. processing the retrieved data to obtain a derivative data set comprises computing first Cartesian coordinates of the three-dimensional point corresponding to the first selected cell from the range value, the horizontal angle value and the vertical angle value of the three-dimensional point corresponding to the first selected cell, and
   e. storing the derivative data set comprises storing the first Cartesian coordinates as a first selected point.

7. [FIG. 18][Select Second 3D Point] The method of one of 5-6, wherein
   a. obtaining the at least one first criterion further comprises
      i. obtaining coordinates of a second selected location in the two-dimensional array,
      ii. identifying a cell of the preview layer corresponding to the second selected location as a second selected cell,
      iii. identifying a patch of a complete layer which contains the second selected cell,
   b. retrieving data comprises retrieving patches from the selected complete layers which contain a range value, a horizontal angle value and a vertical angle value of the three-dimensional point corresponding to the second selected cell,
   c. processing the retrieved data to obtain a derivative data set comprises computing second Cartesian coordinates of the three-dimensional point corresponding to the second selected cell from the range value, the horizontal angle value and a vertical angle value of the three-dimensional point corresponding to the second selected cell, and
   d. storing the derivative data set comprises storing the second Cartesian coordinates as a second selected point.

8. [FIG. 18][Measure Distance between $1^{st}$ & $2^{nd}$ 3D points] The method of one of 7, further comprising: computing from the first Cartesian coordinates and the second Cartesian coordinates a distance value representing distance between the first selected point and the second selected point, and storing the distance value.

9. [FIG. 19][Measure Angle Between Three 3D Points] The method of 8, wherein
   a. obtaining the at least one first criterion further comprises
      i. obtaining coordinates of a third selected location in the two-dimensional array,
      ii. identifying a cell of the preview layer corresponding to the third selected location as a third selected cell,
      iii. identifying a patch of a complete layer which contains the third selected cell,
   b. retrieving data comprises retrieving patches from the selected complete layers which contain a range value, a horizontal angle value and a vertical angle value of the three-dimensional point corresponding to the third selected cell,
   c. processing the retrieved data to obtain a derivative data set comprises computing third Cartesian coordinates of the three-dimensional point corresponding to the third selected cell from the range value, the horizontal angle value and a vertical angle value of the three-dimensional point corresponding to the third selected cell, and
   d. storing the derivative data set comprises storing the third Cartesian coordinates as a third selected point,
   the method further comprising: computing from the first Cartesian coordinates and the second Cartesian coordinates and the third Cartesian coordinates an angle value representing an angle between a line joining the first selected point and the second selected point and a line joining the first selected point and the third selected point, and storing the distance value.

10. [FIG. 25][Retrieve All Points within Polygon] The method of 2, wherein
    a. obtaining the at least one first criterion comprises
       i. displaying intensity values of cells of a preview layer of a first data set as a two-dimensional array of pixels,
       ii. obtaining coordinates of vertices of a polygon in the two-dimensional array,
       iii. identifying cells of the preview layer lying within the vertices of the polygon as identified cells,
       iv. identifying patches of the first data set which contain the identified cells,
    b. obtaining the at least one second criterion comprises selecting complete layers of the first data set containing range data, horizontal angle data and vertical angle data,
    c. retrieving data comprises retrieving patches from the selected complete layers of the first data set which contain a range value, a horizontal angle value and a vertical angle value of each of the three-dimensional points corresponding to the identified cells,
    d. processing the retrieved data to obtain a derivative data set comprises
       i. selecting cells of the identified patches of the complete layers of the first data set lying within the vertices of the polygon as selected cells,
       ii. computing Cartesian coordinates of each of the three-dimensional points corresponding to the selected cells from the range value, the horizontal angle value and the vertical angle value of the respective three-dimensional point, and
    e. storing the derivative data set comprises storing the Cartesian coordinates as a set of points.

11. [FIG. 26] [Iterate for multiple data sets] The method of 10, further comprising processing a further data set by
    a. obtaining at least one first criterion for the further data set comprising
       i. using at least one of the three-dimensional points from the first data set to define a further polygon in a preview layer of the further data set;
       ii. identifying cells of the further preview layer lying within the vertices of the further polygon as identified cells of the further data set, iii. identifying patches of the further data set which contain the identified cells of the further data set,
b. obtaining at least one second criterion for the further data set by selecting complete layers of the further data set containing range data, horizontal angle data and vertical angle data,
c. retrieving data from the further data set by retrieving patches from the selected complete layers of the further data set which contain a range value, a horizontal angle value and a vertical angle value of each of the three-dimensional points corresponding to the identified cells of the further data set,
d. processing the retrieved data of the further data set to obtain a further derivative data set by
  i. selecting cells of the identified patches of the complete layers of the further data set lying within the vertices of the polygon as selected cells of the further data set,
  ii. computing Cartesian coordinates of each of the three-dimensional points corresponding to the selected cells of the further data set from the range value, the horizontal angle value and the vertical angle value of the respective three-dimensional point, and
e. storing the further derivative data set by storing the Cartesian coordinates as a set of points.

12. [FIG. 32][Magic Wand] The method of 2, wherein
a. obtaining the at least one first criterion comprises
  i. displaying intensity values of cells of a preview layer of a first data set as a two-dimensional array of pixels, the preview layer having cells containing data from a subset of cells of a complete layer of the first data set,
  ii. obtaining coordinates of a selected location in the two-dimensional array,
  iii. identifying a cell of the preview layer of the first data set corresponding to the selected location as a seed cell,
  iv. growing a region of cells of the preview layer of the first data set including the seed cell and adjacent cells of the preview layer cells containing data whose values satisfy a continuity criterion,
  v. identifying patches of the preview layer of the first data set containing cells of the region,
b. obtaining the at least one second criterion comprises identifying complete layers of the first data set whose cells contain data representing intensity, range, vertical angle and horizontal angle of points,
c. retrieving data comprises retrieving from the first data set values from cells of the region,
d. processing the retrieved data to obtain a derivative data set comprises
  i. selecting cells of the identified patches of the complete layers of the first data set lying within the region as selected cells,
  ii. computing Cartesian coordinates of each of the three-dimensional points corresponding to the selected cells of the first data set from the range value, the horizontal angle value and the vertical angle value of the respective three-dimensional point, and
e. storing the derivative data set comprises storing the Cartesian coordinates as a set of points.

13. [FIG. 27B] [Growing a Region] The method of 12, wherein growing a region comprise applying at least one continuity criterion to identify a region of cells including the seed cell and adjacent cells.

14. The method of 13, wherein the at least one continuity criterion comprises at least one of: intensity, color, curvature defined by normals of points, and discontinuity of range values between adjacent points.

15. [FIG. 38][Iterate for multiple data sets] The method of one of 12-14, further comprising processing a further data set by
a. obtaining at least one first criterion for the further data set comprising
  i. using at least one of the three-dimensional points from the first data set to identify a three-dimensional point of the further data set as a seed cell for the further data set,
  ii. growing a region of cells of the preview layer of the further data including the seed cell for the further data set and adjacent cells of the preview layer cells of the further data set containing data whose values satisfy a continuity criterion,
  iii. identifying patches of the preview layer of the further data set containing cells of the region of the preview layer of the further data set,
b. obtaining at least one second criterion for the further data set by identifying complete layers of the further data set whose cells contain data representing intensity, range, vertical angle and horizontal angle of points,
c. retrieving data by retrieving values from cells of the region of the further data set,
d. processing the retrieved data from the further data set to obtain a further derivative data set by
  i. selecting cells of the identified patches of the complete layers of the further data set lying within the region as selected cells of the further data set,
  ii. computing Cartesian coordinates of each of the three-dimensional points corresponding to the selected cells of the further data set from the range value, the horizontal angle value and the vertical angle value of the respective three-dimensional point, and
e. storing the further derivative data set comprises storing the Cartesian coordinates as a set of points.

16. [FIG. 43][Lasso] The method of 2, wherein
a. obtaining the at least one first criterion comprises
  i. displaying intensity values of cells of a preview layer of a first data set as a two-dimensional array of pixels,
  ii. obtaining coordinates of vertices of a polygon in the two-dimensional array,
  iii. identifying cells of the preview layer of the first data set lying within the vertices of the polygon as identified cells,
  iv. applying at least one continuity criterion to identify a first region defining an object,
  v. identifying patches of the preview layer containing cells of the first region,
b. obtaining the at least one second criterion comprises selecting complete layers of the first data set containing range data, horizontal angle data and vertical angle data,
c. retrieving data comprises retrieving patches from the selected complete layers of the first data set which contain a range value, a horizontal angle value and a vertical angle value of each of the three-dimensional points corresponding to the selected cells,
d. processing the retrieved data to obtain a first derivative data set comprises i. selecting cells of the identified patches of the complete layers of the first data set lying within the region as selected cells,
ii. computing Cartesian coordinates of each of the three-dimensional points corresponding to the selected cells from the range value, the horizontal angle value and the vertical angle value of the respective three-dimensional point, and
e. storing the first derivative data set comprises storing the Cartesian coordinates as a set of points.

17. [Lasso Criteria/on] The method of 16, wherein the at least one continuity criterion comprises at least one of: intensity, color, [curvature defined by normals], discontinuity of range values.

18. [FIG. 44][Iterate for multiple data sets] The method of one of 16-17, further comprising processing a further data set by
a. obtaining at least one first criterion comprising
   i. using at least one of the three-dimensional points from the first data set to determine coordinates of vertices of a further polygon of a preview layer of the further data set;
   ii. identifying cells of the preview layer of the further data set lying within the vertices of the further polygon as identified cells,
   iii. applying at least one continuity criterion to identify a further region of cells of the further data set defining the object,
   iv. identifying patches of the preview layer containing cells of the further region,
b. obtaining at least one second criterion for the further data set by selecting complete layers of the further data set containing range data, horizontal angle data and vertical angle data,
c. retrieving data from the further data set by retrieving patches from the selected complete layers of the further data set with cells which contain a range value, a horizontal angle value and a vertical angle value of each of the three-dimensional points corresponding to further region,
d. processing the retrieved data from the further data set to obtain a further derivative data set by
   i. selecting cells of the identified patches of the complete layers of the further data set lying within the further region as further selected cells,
   ii. computing Cartesian coordinates of each of the three-dimensional points corresponding to the further selected cells from the range value, the horizontal angle value and the vertical angle value of the respective three-dimensional point, and
e. storing the further derivative data set by storing the Cartesian coordinates as a set of points.

19. [FIG. 46] [Normals] The method of 2, wherein
a. obtaining the at least one first criterion comprises
   i. obtaining coordinates of at least one selected location,
   ii. identifying a respective cell of a preview layer of the data set corresponding to each selected location, and its surrounding cells,
   iii. identifying patches of the preview layer of the first data set containing the identified cells,
b. obtaining the at least one second criterion comprises identifying complete layers of the first data set whose cells contain data representing intensity and position of points,
c. retrieving data comprises retrieving from the data set values from cells of the identified patches,
d. processing the retrieved data to obtain a derivative data set comprises, for each selected location, determining Cartesian coordinates of the selected location and points of its surrounding cells, and fitting a plane to determine a normal value for the selected location, and
e. storing the derivative data set comprises storing the normal value for each selected location.

20. [FIG. 48][Euclidian Spatial Sampling] The method of 2, wherein
a. obtaining the at least one first criterion comprises selecting a sampling region;
b. obtaining the at least one second criterion comprises identifying complete layers of the first data set whose cells contain data representing intensity and position of points,
c. retrieving data comprises retrieving from the identified layers of the data set values from cells of the sampling region,
d. processing the retrieved data to obtain a derivative data set comprises
   i. clustering cells of the sampling region and extracting a cell per cluster to objected an array of cells with points satisfying a sampling resolution, and
e. storing one of (i) the array of cells and (ii) a binary layer identifying which cells of the data set are the extracted cells.

21. [FIG. 53][Overlap Detection] The method of 2, wherein
a. obtaining the at least one first criterion comprises
   i. selecting a preview layer of each of multiple data sets,
   ii. for each data set, projecting points of cells of its preview layer into a local reference frame of each other data set,
   iii. for each data set, identifying cells of its preview layer having points which coincide with points of cells of the other data sets,
   iv. for each data set, identifying patches of the complete data set having patches with the identified cells of its preview layer,
b. obtaining the at least one second criterion comprises identifying complete layers of the first data set whose cells contain data representing position of points,
c. retrieving data comprises retrieving position values from cells of patches of complete layers of each data set which include the identified cells,
d. processing the retrieved data to obtain a derivative data set comprises, for each data set, identifying cells having coincident points, and generating for each data set a binary layer per data set identifying cells with points coinciding with points of the other data sets, and
e. storing the derivative data set comprises storing the binary layers.

22. [FIG. 54] [Removing Coincident Points] The method of 2, wherein
a. obtaining the at least one first criterion comprises
   i. selecting a preview layer of each of multiple data sets,
   ii. for each data set, projecting points of cells of its preview layer into a local reference frame of each other data set,
   iii. for each data set, identifying cells of its preview layer having points which coincide with points of cells of the other data sets,
   iv. for each data set, identifying patches of the complete data set having patches with the identified cells of its preview layer, b. obtaining the at least one second criterion comprises identifying complete layers of the first data set whose cells contain data representing position of points,
c. retrieving data comprises retrieving position values from cells of patches of complete layers of each data set which include the identified cells,
d. processing the retrieved data to obtain a derivative data set comprises, for each data set, identifying cells having coincident points, and selecting preferred points,
e. storing the derivative data set comprises storing values representing locations of the preferred points.

23. [FIG. 55][Object Segmentation] The method of 2, wherein
a. obtaining the at least one first criterion comprises selecting a preview layer of each of multiple data sets,
b. obtaining the at least one second criterion comprises identifying complete layers of the multiple data sets whose cells contain data representing position and intensity of points,
c. retrieving data comprises retrieving position and intensity values from cells of preview layers of the multiple data sets,
d. processing the retrieved data to obtain a derivative data set comprises, for each data set, applying at least one continuity criterion to segment the object, and creating a derived preview layer with cells having object labels, and
e. storing the derivative data set comprises storing the derived preview layers.

24. [Plane Extraction] The method of 23, wherein applying at least one continuity criterion comprises comparing normals of points to identify points associated with a geometry, and wherein object labels of at least one derived preview layer identify the points associated with the geometry.

25. The method of 24, wherein the geometry comprises one of a plane and a cylinder.

26. [Apparatus] [FIG. 12] Apparatus comprising a processor with instructions for performing a method according to any one of 1-25.

27. A computer program comprising a set of instructions adapted to enable a processor to perform a method according to any one of 1-25.

28. A computer program product comprising a tangible medium on which is embodied a set of instructions adapted to enable a processor to perform a method according to any one of 1-25.

The invention claimed is:

1. A method of processing at least one set of data representing three-dimensional points organized in a data structure wherein, for each set,
    each three-dimensional point has multiple components,
    the data is organized in a respective layer per component,
    each layer is segmented in cells of a two-dimensional grid, wherein the layers comprise complete layers and preview layers, each preview layer having cells containing data from a subset of the cells of a complete layer,
    the cells are arranged such that the components of a given point are contained in corresponding cells of multiple layers,
    the cells are grouped in patches by layer, and
    the patches are arranged such that the components of an array of points is represented by corresponding patches of multiple layers, the method comprising:
a. obtaining at least one first criterion, wherein obtaining the at least one first criterion comprises:
    i. displaying intensity values of cells of a preview layer of a first data set as a two-dimensional array of pixels, the preview layer having cells containing data from a subset of cells of a complete layer of the first data set,
    ii. obtaining coordinates of a selected location in the two-dimensional array,
    iii. identifying a cell of the preview layer of the first data set corresponding to the selected location as a seed cell,
    iv. growing a region of cells of the preview layer of the first data set including the seed cell and adjacent cells of the preview layer cells containing data whose values satisfy a continuity criterion, and
    v. identifying patches of the preview layer of the first data set containing cells of the region;
b. obtaining at least one second criterion, wherein obtaining the at least one second criterion comprises identifying complete layers of the first data set whose cells contain data representing intensity, range, vertical angle and horizontal angle of points;
c. retrieving data from cells of patches meeting the at least one first criterion and meeting the at least one second criterion, wherein retrieving the data comprises retrieving from the first data set values from cells of the region,
d. processing the retrieved data to obtain a derivative data set, wherein processing the retrieved data to obtain the derivative data set comprises:
    i. selecting cells of the identified patches of the complete layers of the first data set lying within the region as selected cells, and
    ii. computing Cartesian coordinates of each of the three-dimensional points corresponding to the selected cells of the first data set from a range value, a horizontal angle value and a vertical angle value of the respective three-dimensional point,
e. storing the derivative data set, wherein storing the derivative data set comprises storing the Cartesian coordinates as a set of points.

2. The method of claim 1, further comprising processing a further data set by:
a. obtaining at least one first criterion for the further data set by:
    i. using at least one of the three-dimensional points from the first data set to identify a three-dimensional point of the further data set as a seed cell for the further data set,
    ii. growing a region of cells of the preview layer of the further data set including the seed cell for the further data set and adjacent cells of the preview layer cells of the further data set containing data whose values satisfy a continuity criterion, and
    iii. identifying patches of the preview layer of the further data set containing cells of the region of the preview layer of the further data set,
b. obtaining at least one second criterion for the further data set by identifying complete layers of the further data set whose cells contain data representing intensity, range, vertical angle and horizontal angle of points,
c. retrieving data by retrieving values from cells of the region, of the further data set,
d. processing the retrieved data from the further data set to obtain a further derivative data set by:

i. selecting cells of the identified patches of the complete layers of the further data set lying within the region as selected cells of the further data set, and ii. computing Cartesian coordinates of each of the three-dimensional points corresponding to the selected cells of the further data set from a range value, a horizontal angle value and a vertical angle value of the respective three-dimensional point, and e. storing the further derivative data set by storing the Cartesian coordinates as a set of points.

3. A method of processing at least one set of data representing three-dimensional points organized in a data structure wherein, for each set, each three-dimensional point has multiple components, the data is organized in a respective layer per component, each layer is segmented in cells of a two-dimensional grid, wherein the layers comprise complete layers and preview layers, each preview layer having cells containing data from a subset of the cells of a complete layer, the cells are arranged such that the components of a given point are contained in corresponding cells of the multiple layers, the cells are grouped in patches by layer, and the patches are arranged such that the components of an array of points is represented by corresponding patches of multiple layers, the method comprising:

a. obtaining the at least one first criterion comprises selecting a preview layer of each of multiple data sets, b. obtaining the at least one second criterion comprises identifying complete layers of the multiple data sets whose cells contain data representing position and intensity of points, c. retrieving data from cells of patches meeting the at least one first criterion and meeting the at least one second criterion, wherein retrieving data comprises retrieving position and intensity values from cells of preview layers of the multiple data sets, d. processing the retrieved data to obtain a derivative data set by, for each data set, applying at least one continuity criterion to segment the object, and creating a derived preview layer with cells having object labels, and e. storing the derivative data set by storing the derived preview layers.

4. Apparatus comprising a processor and a storage element with instructions that enable the processor to perform a method according to claim 1.

5. A computer program comprising a set of instructions adapted to enable a processor to perform a method according to claim 1.

6. A computer program product comprising a tangible medium on which is embodied a set of instructions adapted to enable a processor to perform a method according to claim 1.

* * * * *